US012312163B2

(12) United States Patent
Luinstra

(10) Patent No.: US 12,312,163 B2
(45) Date of Patent: May 27, 2025

(54) REFUSE DISTRIBUTION AND COMPACTION DEVICES AND METHODS

(71) Applicant: MR. FILL HOLDING B.V., Culemborg (NL)

(72) Inventor: Jacob Joost Luinstra, Culemborg (NL)

(73) Assignee: MR. FILL HOLDING B.V., Culemborg (NL)

( * ) Notice: Subject to any disclaimer, the term of this patent is extended or adjusted under 35 U.S.C. 154(b) by 688 days.

(21) Appl. No.: 17/628,035

(22) PCT Filed: Jul. 9, 2020

(86) PCT No.: PCT/EP2020/069328
§ 371 (c)(1),
(2) Date: Jan. 18, 2022

(87) PCT Pub. No.: WO2021/013555
PCT Pub. Date: Jan. 28, 2021

(65) Prior Publication Data

US 2022/0267087 A1 Aug. 25, 2022

(30) Foreign Application Priority Data

Jul. 19, 2019 (NL) ...................................... 2023535
Jul. 19, 2019 (NL) ...................................... 2023538

(51) Int. Cl.
*B65F 1/14* (2006.01)

(52) U.S. Cl.
CPC .......... *B65F 1/1405* (2013.01); *B65F 1/1431* (2013.01); *B65F 2210/168* (2013.01)

(58) Field of Classification Search
CPC . B65F 1/1405; B65F 1/1431; B65F 2210/168
(Continued)

(56) References Cited

U.S. PATENT DOCUMENTS 3,220,577 A 11/1965 Laverne
6,588,330 B1 7/2003 Importico

FOREIGN PATENT DOCUMENTS

CH 564 467 A5 7/1975
DE 44 13 034 A1 10/1995
(Continued)

OTHER PUBLICATIONS

Dutch Search Report, issued in Priority Application No. 2023535, dated Apr. 3, 2020.
(Continued)

*Primary Examiner* — Jacob S. Scott
*Assistant Examiner* — Michael E Butler
(74) *Attorney, Agent, or Firm* — Birch, Stewart, Kolasch & Birch, LLP

(57) ABSTRACT

A top loading refuse distributing and compacting device for mounting above or in the top of a refuse collection container is operable to receive, compact and distribute refuse collected with the container. The device includes a pivotal handling member, which is pivotal between a leftward and rightward guiding position, in which left and right opposed inclined surfaces of the handling member alternatingly guide refuse into the right and left side of the container such as to distribute it evenly over said sides, while with the other surface compacting refuse already present in the container. The handling member includes a weight sensor. The device may be operated based on the signals of weight sensor and preferably other sensors, for instance to indicate a living organism being received. The handling member may be one single unit, combining the functions of weighing, distributing and compacting.

19 Claims, 24 Drawing Sheets

(58) Field of Classification Search
USPC .......................................................... 700/213
See application file for complete search history.

(56) References Cited

FOREIGN PATENT DOCUMENTS

| | | | | |
|---|---|---|---|---|
| EP | 0 893 368 | A1 | | 1/1999 |
| EP | 1 508 535 | A1 | | 2/2005 |
| EP | 1 916 202 | A1 | | 4/2008 |
| EP | 2 514 586 | A1 | | 10/2012 |
| EP | 2 664 449 | A2 | | 11/2013 |
| EP | 3 265 303 | A1 | | 1/2018 |
| EP | 3 296 095 | A1 | | 3/2018 |
| EP | 3 434 620 | A1 | | 1/2019 |
| NL | 2008505 | C | | 9/2013 |
| NL | 2017956 | B1 | | 6/2018 |
| WO | WO 98/42596 | A1 | | 10/1998 |
| WO | WO 2016/140573 | A1 | | 9/2016 |
| WO | WO-2017130084 | A1 | * | 8/2017 |

OTHER PUBLICATIONS

Dutch Search Report, issued in Priority Application No. 2023538, dated Apr. 9, 2020.
International Search Report, issued in PCT/EP2020/069328, dated Oct. 2, 2020.
Written Opinion of the International Searching Authority, issued in PCT/EP2020/069328, dated Oct. 2, 2020.

* cited by examiner

REFUSE DISTRIBUTION AND COMPACTION DEVICES AND METHODS

FIELD OF THE INVENTION

The present invention relates to the field of collection of refuse wherein refuse is collected in a collection container. The present invention pertains in particular to the collection of domestic refuse, e.g. in refuse bags, plastic domestic refuse, etc.

In the field, it is known to provide a subterranean refuse collection system with a container that is housed in a subterranean pit and can be lifted therefrom for discharge of collected refuse. Above the ground the system includes a refuse introduction housing, e.g. a column, having an introduction opening allowing a user to introduce refuse therein, e.g. domestic refuse. In known embodiments a refuse introduction device is provided in said housing, e.g. a drum type introduction device. This for example allows to control the use of the system, e.g. a user first has to identify himself in some electronic manner. It also may allow to control the dimension of the refuse that is introduced, e.g. limited to the size of a common domestic refuse bag, e.g. a 60 litre bag.

Such a collection system can work well to store a large amount of waste between emptying while ensuring the waste already collected is not subject to environmental forces or access by, for example, birds or other animals which may get into the waste and spread it elsewhere.

In known refuse collection systems top loading refuse compacting devices are integrated which are mounted above or in the top of the refuse collection container. These compacting devices are operable to receive refuse, e.g. a domestic refuse bag, that has been dropped into the device via the refuse introduction housing and to compact the refuse that has been collected within the container. Examples of such top loading refuse compacting devices are shown in EP2664449, NL2008505, U.S. Pat. No. 6,588,330, CH564467, EP1916202, EP2514586, EP1508535 and EP3296095.

In known refuse collection systems, refuse handling devices are integrated which are mounted above or in top of the refuse collection container. These refuse handling devices generally comprise a frame, a handling member that is mounted to the frame to pivot about a pivot axis, and a drive assembly operably connected to the handling member to pivot the handling member. The refuse handling device is operable to receive refuse, e.g. a domestic refuse bag, that has been dropped into the refuse collection container via the refuse collection housing and to use the handling member to distribute and/or compact refuse in the refuse collection container. An example of such a refuse collection system and refuse handling device are shown in WO2016/140573A1.

WO2016/140573 discloses a top loading refuse distributing and compacting device that is adapted to be mounted above or in the top of a refuse collection container, which corresponds to the preamble of claim 1. This device is operable to receive refuse, e.g. a domestic refuse bag, that has dropped into the device and to distribute said refuse over said container as well as to compact refuse collected with said container. Upper and lower pivotal compaction members both have opposed compaction faces, which upon alternating rotation of the compaction member to leftward and rightward positions with respect to the entry opening assume leftward and rightward inclinations to together form a chute that guides the refuse to the left and right side of the container, respectively. While assuming the leftward and rightward positions, the refuse is compacted at the left and right side, respectively.

OBJECT OF THE INVENTION

The known refuse collection systems and distribution and/or compacting devices are considered to be not fully satisfactory.

Firstly, while the dimension of the refuse that is introduced may be controlled through the refuse introduction device, with the known systems and devices, containers may after continued introduction of refuse end up being too heavy to lift for waste collection vehicles. Furthermore, with the known systems and devices, restrictions and recording, e.g. in connection to modules, e.g. registering refuse quantities, any exceeding thereof, and e.g. related cost implications per user, on introduced refuse cannot be correlated to the weight of the refuse. Restrictions thereto may therefore not be controllable.

In a first aspect thereof, it is therefore an object of the current invention to improve the control of the loading of the container, and to at least reduce, preferably prevent, overloading of the container.

SUMMARY OF THE INVENTION

According to the first aspect thereof, the invention provides a provide a top loading refuse distributing and compacting device is capable of providing an indication of the weight of refuse received in the container.

The first aspect of the invention provides a top loading refuse distributing and compacting device that is adapted to be mounted above or in the top of a refuse collection container. The device is operable to receive refuse, e.g. a domestic refuse bag, that has dropped into the device, and to distribute said refuse over said refuse collection container as well as to compact refuse collected with said container. The device defines an entry opening at a top thereof for entry of refuse dropped into the device, e.g. via an overhead refuse insertion housing, and defines an outlet at a bottom thereof allowing refuse to drop into the refuse collection container underneath.

The device comprises a frame adapted to be mounted above or in the top of the refuse collection container, optionally having one or more walls, e.g. opposed walls, and optionally, one or more head walls. The frame optionally comprises a duct integrated with said frame, said duct comprising the walls, if present.

The device further comprises a refuse handling assembly, which comprises a pivotal handling member that is pivotally mounted to the frame about a horizontal pivot axis. This horizontal pivot axis extends beneath said entry opening. The pivotal handling member has a distribution and compaction part, comprising a left surface and a right surface, and has a receiving part, comprising a top surface. The top surface extends parallel to and remote from said pivot axis, and adjoins the left and right surfaces of the distribution and compaction part at respective opposed sides thereof.

The device further comprises a drive assembly operably connected to said refuse handling assembly and at least including one drive motor.

The refuse handling assembly is selectively movable by the drive assembly between and into a receiving position, a leftward guiding position and a rightward guiding position.

The drive assembly is configured to move the refuse handling assembly into the receiving position by pivoting the handling member around said pivot axis such that the top surface of the receiving part extends substantially underneath the entry opening, preferably substantially horizontally, such that refuse that is dropped into the device through the entry opening is received by the top surface and thereby supported on the handling member.

The drive assembly is configured to move the refuse handling assembly from the receiving position into the leftward guiding position by pivoting the handling member to the right—seen in direction of the pivot axis—around said pivot axis such that the left surface of the distribution and compaction part assumes a leftward inclination relative to an imaginary vertical plane above and parallel to the horizontal pivot axis.

The drive assembly is configured to move the refuse handling assembly from the receiving position into the rightward guiding position by pivoting the handling member to the left—seen in direction of the pivot axis—around said pivot axis such that the right surface of the distribution and compaction part assumes a rightward inclination relative to the imaginary vertical plane above and parallel to the horizontal pivot axis.

In the leftward guiding position, the left surface of the distribution and compaction part upwardly faces the entry opening, forming an inclined chute that guides received refuse towards a left-hand side of the outlet.

In said rightward guiding position, the right surface of the distribution and compaction part upwardly faces the entry opening, forming an inclined chute that guides received refuse towards a right-hand side of the outlet.

The drive assembly is configured to compact refuse, if the collection container has been sufficiently filled with refuse, by means of the refuse handling assembly as it is moved by the drive assembly into leftward and rightward compacting positions, e.g. corresponding to said leftward and rightward guiding positions.

The device is characterized in that the pivotal handling member further comprises a weighing unit. This weighing unit operates between the distribution and compaction part and the frame. Preferably, it operates between the distribution and compaction part and the receiving part. Alternatively it operates between the handling member and the frame, e.g. the duct of the frame, if present, e.g. between the distribution and compaction part and the frame. The weighing unit is configured to provide an indication of the weight of an object, e.g. refuse, received on the receiving surface. Thereto the weighing unit comprises one or more weight sensors, which are configured to produce one or more signals indicative of the weight of the received object on the top surface in the receiving position of the refuse handling assembly. EP3434620 provides a weighing unit for a refuse collection system for weighing introduced refuse. The weighing unit is provided to the refuse introduction housing.

By providing the weighing unit to the top loading refuse distributing and compacting device, as according to the invention, the functionalities of weighing, distributing, and compacting the refuse are advantageously combined within one device. Current collection systems can thus be retrofitted with the refuse distributing and compacting device to accomplish the added functionality, without necessitating a separate weighing unit to be installed.

Furthermore, in the preferred case that the weighing unit operates between the distribution and compaction part and the receiving part of the handling member, the functions of weighing, distribution, and compaction are advantageously integrated in a single moving part, which moves only unitary in order to weigh, distribute, and compact the refuse. Furthermore, as the weighing unit is provided between the parts of the handling member, embodiments are possible in which the one or more sensors can generally not come into contact with refuse, e.g. not even with surfaces that are in contact with refuse, e.g. wherein the weighing unit is covered by the walls and/or surfaces of the handling member, e.g. provided underneath the top surface, e.g. completely enclosed within the handling member. This lessens the chance for contamination of the one or more sensors by refuse and/or particles in the surrounding space of the device. The weighing unit being covered by walls and/or surfaces of the handling member furthermore lessens the chance of becoming affected by conditions within the device and/or the container and/or the introduction housing, e.g. air humidity, temperature, and gases emitted by collected refuse present in the collection container.

The frame of the device may comprise one or more head walls, extending around the entry opening of the device, e.g. defining the entry opening in between them. These head walls preferably extend—seen in a top view—substantially outside of the contour of the top surface handling member when the handling assembly is in the receiving position thereof, so as to leave substantially the whole top surface uncovered and as such available for receiving refuse dropped into the device. In an embodiment the one or more head walls serve as transportation elements, configured to be engaged, e.g. by a transportation device, e.g. a lifting device, e.g. a truck mounted crane or a lifting device of a garbage collection vehicle, to be displaced between an external location and a position in or above the top of the container of a refuse handling system, such as to be mounted in that position.

The handling member is configured such that, in the leftward or rightward compacting position, the right or left surface of downwardly engages any refuse already present in the container directly underneath said right or left surface, respectively, such as to compact said already present refuse by means of the refuse handling assembly.

In a simple embodiment, the compacting positions of the refuse handling assembly correspond to the guiding positions thereof. As such, the functions of distributing, weighing, and compacting can be accomplished by moving the refuse handling assembly in three positions only.

In an embodiment, the compacting positions are distinct from the guiding positions. Therein preferably, the left or right surface facing upwards in the leftward and rightward guiding position, respectively, is at a larger angle with the imaginary vertical plane in the leftward and rightward compacting position than in the leftward and rightward guiding position, respectively.

In an embodiment, the drive assembly further comprises a lock mechanism that is configured to releasably lock the refuse handling assembly in the receiving position, and preferably, also in the guiding and compacting positions, and to release it therefrom such as to enable the movement of the refuse handling assembly between and into said positions. The lock mechanism may, for example, be in the simple form of a resistance by the motor to moving it out of the actual position assumed. For example, if the drive motor of the drive assembly is a hydraulic or pneumatic motor, the lock mechanism may be in the form of the closing of one or more hydraulic or pneumatic valves, e.g. when the piston of a hydraulic cylinder is in a certain position inside a cylinder.

In an embodiment, the device comprises one or more sensors, at least including the one or more weight sensors, e.g. only the weight sensors, or e.g. also including one or more other sensors such as one or more presence detection sensors, movement detection sensors, and/or temperature sensors, configured to produce signals indicative of the measurement being taken by the one or more sensors. The signals produced by the sensors may be externally observable.

In an embodiment, the device further comprises a control unit operatively connected to the drive assembly and one or more of the sensors, such as to receive the signals produced by these sensors. The control unit is configured to be based on signals produced by the one or more sensors, operate the drive assembly such that the drive assembly, when refuse is received on the top surface of the receiving part, and the indication of the weight of the received refuse is provided by the weighing unit, moves the refuse assembly from the receiving position into the leftward or rightward guiding position, such as to guide the received refuse towards the outlet, and thereafter optionally, moves the refuse assembly from the leftward or rightward guiding position into the leftward or rightward compacting position, if distinct therefrom, respectively, and thereafter moves the refuse handling assembly from the guiding position or the compacting position, if distinct therefrom, back into the receiving position.

Herein the refuse handling member is preferably moved into the one of the guiding positions and compacting positions after the control unit receives the signals indicative of the weight of the received refuse produced by the weight sensors. Alternatively, the control unit is configured to move the handling member into these guiding positions and compacting positions based on an indication of a signal of another sensor, and/or e.g. after a predetermined time period from the moment the refuse has been received on the top surface, e.g. as detected by one or more presence detection sensors, one or more movement detection sensors, one or more temperature sensors, or the weight sensor(s). The aim of this configuration is that the received refuse remains in one position, namely on the top surface of the handling member being in the receiving position, while the weight measurement is being taken, and that no refuse passes into the container without the weighing unit having provided a weight indication.

In an embodiment, the control unit is furthermore configured to alternatingly, e.g. one on one, two or two, and so on, move the refuse handling assembly in its rightward and leftward guiding position with consequent receiving and handling of refuse. In an embodiment the control unit is furthermore configured to move the refuse handling assembly in its rightward and leftward guiding position based on the weight of the refuse, e.g. to evenly distribute the total weight of the received refuse over the left and right side of the container.

In an embodiment, the control unit is furthermore configured to move the refuse handling assembly in its rightward guiding position, and optionally further into the rightward compacting position, if distinct therefrom, if a sensor, e.g. a presence or movement detection sensor or temperature sensor as described below, detects the continued presence of refuse already present in the container within range of the left surface of the handling member at the left-hand side of the outlet. Furthermore, the control unit is configured to move the assembly in its leftward guiding position and optionally further into the leftward compacting position, if distinct therefrom, if the continued presence of refuse within range of the right surface of the handling member at the right-hand side of the outlet is detected by the same or another sensor. The control unit is configured to distribute refuse received over time substantially evenly over both sides of the container, while compacting the refuse already present in the container substantially evenly at both sides as well. The effect is that refuse present in the container is compactly stored therein, so that a large amount of refuse may be stored within the limited space of the container.

The control unit, if present, may in case the compacting positions are distinct from the guiding positions, be configured to operate the drive assembly such that it moves the handling assembly from the leftward and rightward guiding positions to the leftward and rightward compacting positions, respectively, after guiding received and weighed refuse into the container in the respective guiding position.

In an embodiment, the control unit, if present, is furthermore configured to operate the drive assembly such that it moves the refuse handling assembly from each compacting position back into the receiving position after guiding and optionally compacting, e.g. consequent compacting in a compacting position distinct from the guiding position.

In an embodiment, the control unit, if present, is furthermore configured to operate the drive assembly, e.g. including the lock mechanism, if present, such as to maintain the handling assembly in each guiding position, after moving it to the guiding position, for a predetermined time period and/or until receiving a signal, e.g. from a sensor, e.g. a presence or movement detection sensor, that the guided refuse has moved through the outlet into the container, and is no longer supported by the handling member.

The control unit, if present, may be configured to operate the drive assembly, e.g. including the lock mechanism, if present, such as to maintain the handling assembly in each compacting position, after moving it to the compacting position, for a predetermined time period and/or until receiving a signal, e.g. from a sensor, e.g. a presence or movement detection sensor, or e.g. an external signal, e.g. from a user interface panel of the refuse collection system the device is to be provided to, or e.g. from an introduction device of the system, that refuse is or is to be dropped into the device, and to move the handling assembly into the receiving position directly after the period has ended and/or the signal has been received. Maintaining the compacting position may further facilitate the compacting of the refuse.

In an embodiment comprising the control unit, the control unit is furthermore configured to—based on the signals produced by one or more sensors, at least including the signals of the weight sensors—operate the lock mechanism such that the lock mechanism:

releasably locks the refuse handling assembly in the receiving position while the handling member is supporting received refuse at least from the moment that the refuse is received until the weighing unit provides said indication of the weight of received refuse, and releases the refuse handling assembly after said provision of said indication.

The lock mechanism, advantageously, aims to prevent the refuse handling assembly to undesirably moves, e.g. pivots, e.g. out of the receiving position, while the weight measurement of the refuse is being established. Thereby the refuse may be prevented from shifting over the top surface of the receiving part, and from moving into the container already before the weight measurement is complete.

Preferably, the control unit is also configured to releasably lock the refuse handling assembly in the receiving position whenever the handling member is not supporting any refuse. The effect is that undesired movement, e.g. pivoting, of the handling member upon receiving refuse introduced into the device is prevented, e.g. as a consequence of the impact of the refuse dropping onto the top surface, e.g. off-centre.

Alternatively, the control unit is configured to operate the lock mechanism based on signals produced the sensors such that the lock mechanism:

releases the refuse handling assembly whenever the handling member is not supporting any refuse, and locks the refuse handling assembly in the receiving position immediately after the signals indicate that refuse has been received onto the top surface and/or that refuse has been dropped into the device.

In an embodiment, the pivotal handling member of the refuse handling assembly comprises one or more pivot axles. By means of this or these pivot axle(s) the handling member is pivotally connected to the frame. The pivot axles extend along or parallel to the horizontal pivot axis inside one or more slots, e.g. slots of one or more respective ones of the walls of the frame, such that the movement of the refuse handling assembly between and into the receiving position, the leftward guiding position, the rightward guiding position and the compacting positions, if distinct from the guiding positions, is established by rotation of the pivot axle(s) around the pivot axis. Preferably, one single pivot axle is provided. Providing the pivot axle(s) has the advantageous effect that only one or more of the pivot axle(s) have to be engaged by the drive assembly in order to pivot the entire handling member.

In an embodiment, the drive assembly engages one or more of the pivot axles, e.g. a single pivot axle, such as to impart said rotation of the pivot axles around the horizontal pivot axis and establish said movement of the refuse handling assembly between and into said positions. In an embodiment, the drive assembly engages the pivot axle(s) via a connection member inside which the pivot axle(s) extend.

In an embodiment, the one or more of said slots are complementary to the pivot axle extending therein, each pivot axle being rotatable inside the respective slot such as to establish the rotation of the pivot axles around the pivot axis. Preferably, these slots each comprise a rotary bearing to facilitate the rotation of the pivot axles around the pivot axis.

In an embodiment, the frame of the device comprises opposed walls, namely a front and rear wall, having the one or more slots, namely opposed front and rear slots aligned along the horizontal pivot axis, inside each of which a respective front and rear end of the one or more pivot axles, extends and rotates, preferably inside a rotary bearing provided inside each slot.

In a particular embodiment, the frame of the device comprises one rear wall with a rear one of the slots. The rear slot preferably comprises a rear rotary bearing, inside which a rear end of the pivot axle rotates. The device comprises a front mounting structure, preferably comprising a front bearing, the mounting structure being configured to be mounted to the container, e.g. a front wall thereof.

The drive assembly is, preferably, mounted to the front or rear side wall, when present, of the frame that has the front or rear slot. Preferably, the drive assembly therein extends at a front or rear side of the front or rear side wall, respectively, and the handling member at the rear or front side thereof, respectively. The pivot axle therein extends through the front or rear side wall, respectively, such as to protrude therefrom at the front or rear side of the side wall, and the drive assembly engages the pivot axle at the front or rear side of the side wall, respectively, e.g. via a connection member arranged at the side of the front or rear wall where the drive assembly is arranged.

In an embodiment, the one or more slots are not comprised by any wall of the frame. Therein the device comprises a front and rear mounting structure, preferably comprising a front and rear bearing, respectively. The mounting structures are configured to be mounted to the container, e.g. front and rear walls thereof.

In an alternative embodiment, one or more of said slots inside which the one or more pivot axles extend, if present, is a circle segment with a continuous spacing to the horizontal pivot axis, each pivot axle being slidable inside the slot it extends in such as to establish the rotation of the pivot axles around the pivot axis.

In an embodiment, one or more of the pivot axles are hollow. If the handling member, e.g. the weighing unit thereof, comprises cabling or wiring, these can be run through the hollow pivot axles and the side walls in the slot of which the pivot axles extend, to an outer side of, or external from, the handling assembly, for the transfer of the signals produced by one or more of the sensors to the control unit or another receiver, and/or for the transfer of power to the one or more of the sensors from a power source outside the handling assembly. These sensors may include the weight sensors. Alternatively, said transfer may be done wireless and/or said sensors may be powered by energy storage units, e.g. batteries.

In an embodiment, the drive assembly comprises a pair of hydraulic cylinders arranged along and to the outside of a side wall of the frame, e.g. the duct, preferably one pair along and to the outside of each side wall. Therein each pair of hydraulic cylinders is jointly connected to the refuse handling assembly via a common connection member that extends through a slot in one of the side walls of the frame, and optionally one or more transmissions. The hydraulic cylinders extend from the common connection member to connectors, e.g. in generally opposed directions to spaced apart connectors, for the cylinders to connect to the frame, e.g. said common connection member being integral with the handling member. For example, the common connection member includes one of the pivot axles, if present, e.g. by a single one of the pivot axles, e.g. the only pivot axle, and e.g. a connection member inside which the pivot axle extends and via which the drive assembly engages the pivot axle(s). For example, the drive assembly may be embodied and connected to the handling member as disclosed in EP3265303.

In an embodiment, the drive assembly is embodied as according to the fourth and/or fifth aspect of the invention, and comprises:

a first hydraulic actuator including a first cylinder and a first rod moveable within and extending from said first cylinder;

a second hydraulic actuator including a second cylinder and a second rod moveable within and extending from said second cylinder.

Therein the first and second cylinder are mounted to each other to be moveable as a unit. The first and second rod extend parallel to each other in opposite directions from the unit. The first and second rod extending from the unit are connected to the frame of the refuse handling device or are to be connected to the refuse collection container. The connection member, e.g. inside which the pivot axle(s) extend(s), is rotatable about a rotation axis in a first rotational direction and in a second rotational direction opposite to the first rotational direction. The unit is connected to the connection member using a first pulling member, which is configured to cause the connection member to rotate in the first rotational direction upon movement of the unit in a first direction, and a second pulling member, which is configured to cause the connection member to rotate in the second rotational direction upon movement of the unit in a second direction opposite to the first direction.

In an alternative embodiment, at least one of the pivot axles is interconnected with the drive motor of the drive assembly, e.g. a drive axle thereof, or a transmission to its driving parts. When interconnecting with a drive axle of the drive motor, the interconnection is such that the movement of the refuse handling assembly between and into said positions is established by rotation of the drive axle between and into corresponding positions of the drive axle. Therein the control unit, when present, is furthermore being operatively connected to the drive motor such as to control rotation of the drive axle between and into said corresponding positions of the drive axle. In an embodiment comprising the lock mechanism, the lock mechanism is configured to releasably lock the drive axle of the drive motor of the drive assembly in a position corresponding to the receiving position of the refuse handling assembly so as to lock the refuse handling assembly in the receiving position, and to release the drive axle from the position corresponding to the receiving position such as to enable the movement of the refuse handling assembly between and into the rightward guiding position, the leftward guiding position and the receiving position.

In an embodiment, the one or more weight sensors of the weighing unit comprise one or more strain gauge force transducers and/or one or more piezoelectric force transducers, which connect the distribution and compaction part of the handling member with the receiving part thereof.

In an embodiment, the weighing unit comprises a load cell. In an embodiment, the weighing unit further comprises one or more end stops, mounted between the compaction and distribution part and the receiving part of the handling assembly, configured to limit a downwards movement of the top surface of the receiving part caused by the weight of received refuse with respect to the compaction and distribution part. The effect is that the load on the load cell may be limited, for instance to prevent damage thereto due to undue overloading and or asymmetric loading.

In an embodiment, the weighing unit further comprises a frame, to which the weight sensors and/or the end stops are mounted. The frame is mounted to the compaction and distribution part, whereas the sensors and/or end stops are mounted to the frame in between the frame and the receiving part of the handling member.

In an embodiment, the weight sensors of the weighing unit provide the signals indicative of the weight of received object, e.g. refuse, continuously over time at least as long as refuse is being supported on the top surface of the handling member in the receiving position of the refuse handling assembly. If present, therein, the control unit operates the drive assembly such that the refuse handling assembly remains in the receiving position for at least as long as the signals fluctuate over time to an extent that exceeds a predetermined range. This fluctuating may e.g. occur directly after being received on the top surface due to the dropping of the refuse onto the top surface, due to shifting and/or sliding of different parts of refuse with respect to one another and/or due to initial stabilizing movements of the received refuse to reach equilibrium on the top surface. The drive assembly is furthermore operated by the control unit such that the drive assembly moves the refuse handling assembly to one of the guiding positions only after said fluctuating has stopped or remained within said predetermined range for a predetermined time period. This configuration aims to promote accurate weight measurements to be taken, such that the signals produced accurately represent the actual weight of the received refuse being supported by the handling member.

Furthermore, in an embodiment comprising both the control unit and the lock mechanism, the control unit is also configured to operate the lock mechanism such that the lock mechanism:

- locks the refuse handling assembly in the receiving position for at least as long as the signals produced by the weight sensors fluctuate over time to an extent that exceeds the predetermined range, and
- releases the refuse handling assembly only after said fluctuating has stopped or remained within said predetermined range for said predetermined time period.

The control unit therein operates the drive assembly such that the drive assembly moves the refuse handling assembly to one of the guiding positions and optionally the compacting positions after said releasing of the refuse handling assembly. By locking the assembly in the receiving position while establishing the measurement, the handling member may be prevented from undesiredly moving sideways, e.g. out of the receiving position, such as to prevent relative movements of the received refuse over the top surface and to prevent the received refuse from undesirably sliding into the container via one of the sides already before an accurate measurement has been taken.

An embodiment comprises one or more presence detection sensors, configured to detect whether or not an object, e.g. refuse, is supported on the top surface of the receiving part of the handling member and to produce one or more signals indicative of the received object being supported on said top surface or not. Therein the one or more of the signals based on which the control unit, when present, operates the drive assembly and/or the lock mechanism are said signals produced by the presence detection sensors. The presence detection sensors may e.g. be in the form of photoelectric, inductive or capacitive proximity, and/or ultrasonic sensors.

An embodiment comprises one or more movement detection sensors, configured to detect movement of a received object, e.g. refuse, and to produce one or more signals indicative of movement of the received object. Therein the one or more of the signals based on which the control unit, when present, operates the drive assembly and/or the lock mechanism are said signals produced by the movement detection sensors. The movement detection sensors may e.g. be in the form of microwave, ultrasonic, passive infrared, and/or tomographic motion detectors, but also video cameras are envisaged.

An embodiment comprises one or more non-probing temperature sensors, e.g. infrared sensors, configured to indicate the temperature of a received object, and to produce one or more signals indicative of the temperature of the received object. Therein the one or more of the signals based on which the control unit, when present, operates the drive assembly and/or the lock mechanism are said signals produced by the movement detection sensors.

In a preferred embodiment, the control unit is furthermore configured to register in a memory an indication of the total weight of refuse actually present into the container, by adding up the weight of actually received and guided refuse as indicated by the signals of the weight sensors to the already registered indication of the total weight every time the handling member guides received and weighed refuse through the outlet into the container. Preferably, this indication is externally observable, e.g. via a user interface and/or via communication to external devices, e.g. managed by operators of a garbage collection service. Preferably, the control unit is configured to take remedial action if the registered indication of the total weight exceeds a predetermined value, e.g. the maximum weight that a garbage collection device can handle when discharging the container. This remedial action may include to produce a warning signal that is observable externally from the device, e.g. by determined operators and/or users of the device. Advantageously, this configuration enables to prevent that the container gets too heavy to handle for a garbage collection device, and to indicate, e.g. to operators of the garbage collection service and/or users of the device, that the container needs to be emptied, e.g. earlier than expected.

In an embodiment, the registered indication is set to zero after the container has been emptied, e.g. in response to a signal produced externally, e.g. produced by sensors of the container or by an input signal from an external source, e.g. an operator device or a control switch. This way, the registered indication may always represent the weight of the currently present refuse in the container, excluding the weight of already discharged refuse. Previous values of registered indications of the total weights may also be stored in the memory, e.g. summed up, e.g. for use as a parameter in determining the remaining lifetime and/or if maintenance is necessary.

In an embodiment, the opposed left and right surfaces of the handling member are, seen in direction of the pivot axis, diverging towards the receiving surface in a direction away from said pivot axis, e.g. said left and right surfaces being planar surfaces that are arranged in a V, e.g. said surfaces including an angle between 40° and 100°, e.g. 50°. In an embodiment, the distance between the horizontal pivot axis and the receiving surface is between 40 and 80 centimetres.

In an embodiment, in said leftward guiding position the left surface of the distribution and compaction part of the handling member that is upwardly facing the entry opening has an angle relative to the imaginary vertical plane above and parallel to the pivot axis of between 25° and 80°, and wherein in said rightward guiding position the right surface that is upwardly facing the entry opening has an angle relative to said imaginary vertical plane of between 25° and 80°.

In an embodiment, in the leftward and rightward guiding positions the receiving surface of the receiving part of the handling member extends in vertical projection below one or more of the head walls and substantially outside of the contour of the entry opening. In an embodiment, in the receiving position the top surface of the receiving part of the handling member extends vertical projection below substantially the whole receiving opening, and the guiding surfaces extend substantially below one or more of the head walls and substantially outside of the contour of the entry opening. The effect is that inside the contour of the receiving opening, no space is present in the horizontal plane for introduced refuse to end up but the top surface of the receiving part of the handling member. Thereby, it may be prevented that refuse is not, or only partly supported by the top surface, interfering with the weight measurement.

In an embodiment, the top surface is shaped to be bent, e.g. slightly, around the horizontal pivot axis. For example, when seen in the direction of the horizontal pivot axis, the top surface forms a circle segment with a constant radius relative to the horizontal pivot axis. The effect is that the top surface can remain close to the entry opening in the receiving position, as upon pivoting the handling member the distance to the surface may remain substantially the same while still extending underneath the entry opening during this pivoting. Furthermore, in this same view the angle between the guiding surfaces and the top surface is reduced, which may promote the shifting of the left and right surfaces underneath the supported refuse while pivoting the handling member to move the refuse handling assembly from the receiving position into either of the guiding positions and compacting positions.

In an embodiment, the top ends of the left and right guiding surface comprise a laterally, e.g. perpendicular, extending shoulder defined by a protruding edge that adjoins the lateral outer end of the top surface. This shoulder facilitates the compacting of refuse already present in the container, as it latches laterally behind the refuse such as to reduce refuse moving laterally, e.g. sliding along the left or right surface, while it engages the refuse during compacting thereof as a consequence of the downward force on the refuse.

The first aspect of the invention furthermore provides a refuse collection system comprising:

a collection container, a top loading refuse distributing and compacting device that is configured to be mounted above or in the top of the refuse collection container and which device is operable to receive refuse, e.g. a domestic refuse bag, that has dropped into the device and to distribute said refuse over said container as well as to compact refuse collected with said container. Therein, the device may accord to any of to the embodiments herein described.

In an embodiment, the system is a subterranean refuse collection system comprising:

a pit in the ground, e.g. a concrete pit, wherein the collection container is adapted to be arranged in the pit and to be lifted from the pit for discharge of refuse such as to empty the container. Therein the top loading refuse distributing and compacting device is mounted in the top of the refuse collection container.

In an embodiment the system further comprises a refuse introduction housing having an introduction opening allowing a user to introduce refuse therein, e.g. provided with an introduction device, e.g. a drum type introduction device, so that the refuse drops into the top loading refuse distributing and compacting device, e.g. in the duct thereof, if present.

In an embodiment, wherein the control unit registers an indication of the total weight of the refuse actually present in the container, the control unit is configured to operate the closure element such as to lock the closure element if the indication of the total weight of refuse actually present into the container exceeds a predetermined value. Through this configuration it may be prevented that the container becomes heavier than desired, e.g. heavier than a garbage collection vehicle can handle when discharging the container.

In another or the same embodiment, the control unit is configured to operate the closure element such as to lock the closure element if the signals produced by the weight sensors indicate a weight of received refuse that exceeds a predetermined value.

Other embodiments are envisaged in which the control unit does the same if signals produced by the same or other sensors indicate uncommon values, e.g. if one or more temperature sensors indicate an uncommonly low or high temperature, or if one or more movement detection sensors indicate an uncommon movement pattern of the received refuse.

Other optional features of the system are discussed below.

The first aspect of the invention furthermore provides a method for handling refuse introduced in a refuse collection system comprising a collection container and a top loading refuse distributing and compacting device that is mounted above or in the top of the refuse collection container. This device is operable to receive refuse, e.g. a domestic refuse bag, that has dropped into the device and to distribute said refuse over said container as well as to compact refuse collected with said container. The device therein, preferably, accords to the device according to the first aspect of the invention.

The device comprises a pivotal handling member with a top surface, a right surface, and an opposed left surface.

The method comprises the following steps.

- receiving introduced refuse on the top surface of the device, such that it is supported on the device,
- weighing the received refuse being supported on the device,
- pivoting the handling member to the left or right side underneath the refuse such that said right or left surface shifts underneath the refuse such that the refuse is supported thereby, and said right or left surface assumes a downward inclination towards the container,
- maintaining the right or left surface under a downward inclination such that the refuse slides downwards over said right or left surface towards and into the container, and such that respectively the left or right surface downwardly engages any refuse already present in the container directly underneath said left or right surface, such as to compact said already present refuse,
- optionally, pivoting the handling member such as to increase said downward inclination, such that respectively the left or right surface downwardly engages any refuse already present in the container directly underneath the left or right surface, such as to compact said already present refuse, e.g. further compacts said already present refuse.

A second source of dissatisfaction of prior art systems and devices is that with the current systems and devices, living organisms that accidentally fall into the system and/or device may pass into the container unhindered, so as to end up on or between the collected refuse, e.g. deep inside the ground, which is difficult to access or escape from.

In a second aspect thereof, it is therefore an object of the present invention to provide a top loading refuse distributing and compacting device which is capable of reducing the risk of a living organism that fell into the system and/or device to pass into the collection container.

The second aspect thereto provides a top loading refuse distributing and compacting device that is adapted to be mounted above or in the top of a refuse collection container, which is capable of recognizing a living organism dropping in the system and/or device before it could pass into the collection container. Thereto, the refuse handling assembly comprises one or more sensors, configured to produce one or more signals indicative of a living organism being supported on said top surface.

Alike in the first aspect, the device according to the second aspect is also operable to receive refuse, e.g. a domestic refuse bag, that has dropped into the device, and to distribute said refuse over said refuse collection container as well as to compact refuse collected with said container. The device defines an entry opening at a top thereof for entry of refuse dropped into the device, e.g. via an overhead refuse insertion housing, and defines an outlet at a bottom thereof allowing refuse to drop into the refuse collection container underneath.

Alike in the first aspect, also this device comprises a frame adapted to be mounted above or in the top of the refuse collection container, optionally having one or more walls, e.g. opposed walls, and optionally, one or more head walls. The frame optionally comprises a duct integrated with said frame, said duct comprising the walls, if present.

Alike in the first aspect, also this device further comprises a refuse handling assembly, which comprises a pivotal handling member that is pivotally mounted to the frame about a horizontal pivot axis. This horizontal pivot axis extends beneath said entry opening. The pivotal handling member has a distribution and compaction part, comprising a left surface and a right surface, and has a receiving part, comprising a top surface. The top surface extends parallel to and remote from said pivot axis, and adjoins the left and right surfaces of the distribution and compaction part at respective opposed sides thereof.

Alike in the first aspect, also this device further comprises a drive assembly operably connected to said refuse handling assembly and at least including one drive motor.

Alike in the first aspect, the refuse handling assembly is selectively movable by the drive assembly between and into a receiving position, a leftward guiding position and a rightward guiding position.

Alike in the first aspect, the drive assembly is configured to move the refuse handling assembly into the receiving position by pivoting the handling member around said pivot axis such that the top surface of the receiving part extends substantially underneath the entry opening, preferably substantially horizontally, such that refuse that is dropped into the device through the entry opening is received by the top surface and thereby supported on the handling member.

Alike in the first aspect, the drive assembly is configured to move the refuse handling assembly from the receiving position into the leftward guiding position by pivoting the handling member to the right—seen in direction of the pivot axis—around said pivot axis such that the left surface of the distribution and compaction part assumes a leftward inclination relative to an imaginary vertical plane above and parallel to the horizontal pivot axis.

Alike in the first aspect, the drive assembly is configured to move the refuse handling assembly from the receiving position into the rightward guiding position by pivoting the handling member to the left—seen in direction of the pivot axis—around said pivot axis such that the right surface of the distribution and compaction part assumes a rightward inclination relative to the imaginary vertical plane above and parallel to the horizontal pivot axis.

Alike in the first aspect, in the leftward guiding position, the left surface of the distribution and compaction part upwardly faces the entry opening, forming an inclined chute that guides received refuse towards a left-hand side of the outlet.

Alike in the first aspect, in said rightward guiding position, the right surface of the distribution and compaction part upwardly faces the entry opening, forming an inclined chute that guides received refuse towards a right-hand side of the outlet.

Alike in the first aspect, the drive assembly is configured to compact refuse, if the collection container has been sufficiently filled with refuse, by means of the refuse handling assembly as it is moved by the drive assembly into leftward and rightward compacting positions, e.g. corresponding to said leftward and rightward guiding positions.

By providing the one or more sensors to the top loading refuse distributing and compacting device, the living organism can be recognized already prior to passing any load into the container. This enables remedial actions preventing that the living organism passes into the collection container to consequently be taken.

Furthermore, thereby the functionalities of detection of a living organism, distributing, and compacting the refuse are advantageously combined within one device. Current collection systems can thus be retrofitted with the refuse distributing and compacting device, without necessitating a separate weighing unit to be installed.

In embodiments, the sensors are located inside or on the handling member, so that the functions of detection of a living organism, distribution, and compaction are advantageously integrated in a single moving part, which moves only unitary in order to establish said detection and distribution and compaction of the refuse. The sensors may be provided between the parts of the handling member, so that they can generally not come into contact with refuse, e.g. not even with surfaces that are in contact with refuse, e.g. wherein the sensors are covered by the walls and/or surfaces of the handling member, e.g. provided underneath the top surface, e.g. completely enclosed within the handling member. This lessens the chance for contamination of the sensors by refuse and/or particles in the surrounding space of the device. The sensors being covered by walls and/or surfaces of the handling member, e.g. completely enclosed within the handling member, furthermore lessens the chance of becoming affected by conditions within the device and/or the container and/or the introduction housing, e.g. air humidity, temperature, and gases emitted by collected refuse present in the collection container.

Alternatively, the sensors could be located elsewhere in or on the distribution and compaction device, e.g. provided to the frame, e.g. the duct of the frame, if present.

The signals produced by the sensors being indicative of a living organism being supported on said top surface, may be recognized manually, e.g. by human interpretation of these signals. Therein the signals are observable externally from the device. This enables an observer to initiate remedial actions.

Preferably, the signals being indicative of a living organism being supported on said top surface, is recognized automatically by means of a control unit, which is operatively connected to the sensors such as to receive the signals produced thereby, and configured to interpret the signals such as to detect the presence of a living organism.

Therein interpretation of the signals may be observable externally from the device, e.g. to enable an observer to initiate remedial actions.

Preferably, the control unit is configured to initiate remedial actions when the presence of a living organism on the handling member is recognized thereby.

In an embodiment, the control unit operates the drive assembly such that the drive assembly:

- does not move the refuse handling assembly out of the receiving position, e.g. locks the refuse handling assembly in the receiving position by means of the lock mechanism, if present, if the signals produced by the sensors indicate, e.g. after interpretation of the signals by the control unit, that a living organism is supported by the handling member, and
- moves the refuse handling assembly to one of the guiding positions and compacting positions, if distinct therefrom, after said signals no longer indicate that a living organism is supported by the handling member, e.g. no longer indicate this for a predetermined time period, and/or
- moves the refuse handling assembly to one of the guiding positions and compacting positions, if distinct therefrom, after receiving an external, e.g. remedial signal, e.g. an input signal from an external source, e.g. an operator device or a control switch, that the living organism is no longer supported by the handling member.

In an embodiment, the control unit is furthermore configured to operate a lock mechanism of the drive assembly of the device, as has been discussed in more detail in relation to the first aspect. This lock mechanism is configured to releasably lock the refuse handling assembly in the receiving position, and to release it therefrom such as to enable the movement of the refuse handling assembly between and into the leftward and rightward guiding positions and leftward and rightward compacting positions, if distinct therefrom. The control unit operates the lock mechanism such that the lock mechanism:

- releasably locks the refuse handling assembly in the receiving position if the signals produced by the sensors indicate, e.g. after interpretation of the signals by the control unit, that a living organism is supported by the handling member, and
- releases the refuse handling assembly after the signals no longer indicate that a living organism is supported by the handling member, e.g. no longer indicate this for a predetermined time period, and/or
- releases the refuse handling assembly after receiving an external, e.g. remedial signal that the living organism is no longer supported by the handling member.

In an embodiment, the sensors comprise one or more presence detection sensors, configured to detect whether or not an object is supported on the top surface of the receiving part of the handling member and to produce one or more signals indicative of the received refuse being supported on said top surface or not.

In an embodiment, the sensors comprise one or more movement detection sensors, configured to detect movement of a received object, and to produce one or more signals indicative of movement of the received object.

In an embodiment, the sensors comprise one or more temperature sensors, configured to indicate the temperature of a received object, and to produce one or more signals indicative of the temperature of the received object.

In an embodiment, the sensors comprise one or more weight sensors configured to produce one or more signals indicative of the weight of the received object on the top surface in the receiving position of the refuse handling assembly. These weight sensors may e.g. comprise one or more strain gauge force transducers and/or one or more piezoelectric force transducers. The weight sensors may be embodied by a load cell.

In a particularly compact embodiment, the sensors consist only of said one or more weight sensors. Therein, the embodiment preferably also accords to the first aspect of the invention. In this embodiment advantageously provides weighing, distribution, compaction, and recognition of living organisms by means of the handling member only.

In an embodiment, the control unit is configured to interpret the signals produced by the sensors such as to determine if a living organism is being supported by the handling member, by the ability to recognize signals produced by sensors after refuse has been received onto the top surface not being typically caused by the dropping of the refuse onto the top surface and shifting and sliding of different parts of refuse with respect to one another and/or initial stabilizing movements of the received refuse to reach equilibrium on the top surface, and/or other typical signal characteristics for non-living refuse, and/or the ability to recognize signals produced by sensors being characteristic for living organisms, e.g. animals and human beings. These abilities may be based on one or more of:

- when interpreting signals of weight sensors, the indicated weight and/or the frequency, pattern, magnitude, and/or duration of fluctuations of the signals over time, and/or
- when interpreting signals of presence detection sensors, detected size and/or any variations of the signals over time, and/or
- when interpreting signals of movement detection sensors, the duration, magnitudes and directions of detected movements, and/or
- when interpreting signals of temperature sensors, the indicated temperature and/or a deviation of the commonly encountered temperature of refuse.

In an embodiment, the control unit is furthermore configured to, if the signals produced by the sensors indicate that a living organism is supported by the handling member, produce a warning signal that is observable externally from the device, e.g. by emergency services, passers-by and/or determined operators of the device.

In the embodiment wherein the sensors comprise one or more weight sensors configured to produce one or more signals indicative of the weight of the received object on the top surface in the receiving position of the refuse handling assembly, the indication of the weight may in itself enable a recognition of a living organism being supported on the handling member. For instance, if the signals indicate an relatively high weight, e.g. abnormally high in relation to the weight commonly encountered when receiving refuse, of the received object, for instance, 20 kg or more—which approximately corresponds to the average weight of a child of 5 years old, this may be interpreted as an indication that a living organism is supported on the handling member.

The weight sensors may provide the signals indicative of the weight of received refuse continuously over a certain time period, at least as long as a received object is being supported on the top surface of the handling member in the receiving position of the refuse handling assembly. Therein the signals may fluctuate over time, e.g. directly after being received on the top surface due to the dropping of the refuse onto the top surface, due to shifting and/or sliding of different parts of refuse with respect to one another and/or due to initial stabilizing movements of the received refuse to reach equilibrium on the top surface. The fluctuations in the produced signals being provided over a time period, may enable a recognition of a living organism being supported on the handling member. Therein the fluctuations indicate a living organism being supported on the handling member if the fluctuations deviate from those commonly encountered when only non-living matter is supported on the handling member. For example, if these are not being typically caused by the dropping of the refuse onto the top surface and shifting and sliding of different parts of refuse with respect to one another and/or initial stabilizing movements of the received refuse to reach equilibrium on the top surface, and/or other typical signal characteristics for non-living refuse. Also, it enables to recognize fluctuations of signals being characteristic for living organisms. For instance, when a living organism is supported, the fluctuations may prolong for a (much) longer time, or the magnitude may diminish over time to a less extent. In general, the recognition may for instance be based on the factors frequency, pattern, magnitude, and/or duration of fluctuations of the signals over time. Also, the average indicated weight may be a factor, e.g. on itself or combined with the other factors of the fluctuations.

In an embodiment comprising the control unit, the control unit operates the drive assembly such that the refuse handling assembly remains in the receiving position, e.g. is locked in the receiving position by the lock mechanism, if present, for at least as long as the signals fluctuate over time to an extent that exceeds a predetermined range. The operation of the drive unit is furthermore such that the drive assembly moves the refuse handling assembly to one of the guiding positions only after said fluctuating has stopped or remained within said predetermined range for a predetermined time period. The purpose is to provide the weight indication more accurately.

In an embodiment comprising said control unit and said lock mechanism, the control unit operates the lock mechanism such that the lock mechanism:

- locks the refuse handling assembly in the receiving position for at least as long as the signals fluctuate over time to an extent that exceeds the predetermined range, and
- releases the refuse handling assembly only after said fluctuating has stopped or remained within said predetermined range for said predetermined time period, and operates the drive assembly such that:
- the drive assembly moves the refuse handling assembly to one of the guiding positions and compacting positions, if distinct therefrom, after said releasing of the refuse handling assembly.

The second aspect of the invention also relates to a refuse collection system comprising a collection container and a top loading refuse distributing and compacting device as described herein.

In an embodiment of the system, wherein the top loading refuse distributing and compacting device comprises a control unit configured to recognize from sensor signals if a living organism is supported by the handling member, and the introduction opening comprises a releasably lockable closure element, this closure element, when locked, prevents a user to introduce refuse into the refuse introduction housing. Therein the control unit is furthermore configured to operate the closure element such as to lock said closure element if the signals produced by the sensors indicate that a living organism is supported by the handling member. Through this configuration it may be prevented that refuse can be introduced into the device, on top of the living organism, while the living organism is being supported by the handling member.

The second aspect of the invention furthermore provides a method for handling an object, e.g. refuse, introduced in a refuse collection system comprising a collection container and a top loading refuse distributing and compacting device that is mounted above or in the top of the refuse collection container. This device is operable to receive the object, e.g. refuse, e.g.

a domestic refuse bag, that has dropped into the device and to distribute said refuse over said container as well as to compact refuse collected with said container. The device therein preferably accords to the device according to the second aspect of the invention.

The device comprises a pivotal handling member with a top surface, a right surface, and an opposed left surface.

The method comprises the following steps.

- receiving the introduced object on the top surface of the device, such that it is supported on the device, automatically sensing static and dynamic characteristics of the object, e.g. physical characteristics and behaviour over time, by means of one or more sensors, and automatically determining if, based on sensed static and dynamic characteristics of the object, a living organism is supported on the device.

If, based on the sensed characteristics, a living organism is found to be supported on the device, the method furthermore comprises the following steps:

automatically initiating remedial actions, at least including maintaining the pivotal handling member in a position with the top surface facing upwards, not pivoting the handling member to the left or right side, optionally, automatically initiating a blocking of any receiving of further objects into the device, e.g. by blocking an introduction opening of the system, optionally, automatically producing a warning signal that is observable externally from the device, e.g. by emergency services, passers-by and/or determined operators of the device.

If, based on the sensed characteristics, no living organism is found to be supported on the device, the method further comprises the steps of:

pivoting the handling member to the left or right side underneath the object such that said right or left surface shifts underneath the object such that the object is supported thereby, and said right or left surface assumes a downward inclination towards the container, and maintaining the right or left surface under a downward inclination such that the object slides downwards over said right or left surface towards and into the container, and such that respectively the left or right surface downwardly engages any refuse already present in the container directly underneath said left or right surface, such as to compact said already present refuse, optionally, pivoting the handling member such as to increase said downward inclination, such that respectively the left or right surface downwardly engages any refuse already present in the container directly underneath the left or right surface, such as to compact said already present refuse, e.g. further compacts said already present refuse.

A third source of dissatisfaction of prior art systems and devices is that the current systems and devices are unsatisfactory in terms of robustness and compactness, employing multiple separate moving parts, e.g. movably interconnected, to perform different functions, including compaction and distribution.

In a third aspect thereof, it is an object of the invention to provide a more robust and/or compact alternative to the current systems and devices.

The third aspect of the present invention therefore provides a top loading refuse distributing and compacting device that is adapted to be mounted above or in the top of a refuse collection container and which device is operable to receive refuse, e.g. a domestic refuse bag, that has dropped into the device and to distribute said refuse over said container as well as to compact refuse collected with said container.

Alike in the first aspect, the device according to the third aspect also defines an entry opening at a top thereof for entry of refuse dropped into the device, e.g. via an overhead refuse insertion housing, and defines an outlet at a bottom thereof allowing refuse to drop into the refuse collection container underneath.

Alike in the first aspect, also this device comprises a frame adapted to be mounted above or in the top of the refuse collection container, optionally having one or more walls, e.g. opposed walls, and optionally, one or more head walls. The frame optionally comprises a duct integrated with said frame, said duct comprising the walls, if present.

Alike in the first aspect, also this device further comprises a refuse handling assembly, which comprises a pivotal handling member that is pivotally mounted to the frame about a horizontal pivot axis. This horizontal pivot axis extends beneath said entry opening. The pivotal handling member has a distribution and compaction part, comprising a left surface and a right surface, and has a receiving part, comprising a top surface. The top surface extends parallel to and remote from said pivot axis, and adjoins the left and right surfaces of the distribution and compaction part at respective opposed sides thereof.

Alike in the first aspect, also this device further comprises a drive assembly operably connected to said refuse handling assembly and at least including one drive motor.

Alike in the first aspect, the refuse handling assembly is selectively movable by the drive assembly between and into a receiving position, a leftward guiding position and a rightward guiding position.

Alike in the first aspect, the drive assembly is configured to move the refuse handling assembly into the receiving position by pivoting the handling member around said pivot axis such that the top surface of the receiving part extends substantially underneath the entry opening, preferably substantially horizontally, such that refuse that is dropped into the device through the entry opening is received by the top surface and thereby supported on the handling member.

Alike in the first aspect, the drive assembly is configured to move the refuse handling assembly from the receiving position into the leftward guiding position by pivoting the handling member to the right—seen in direction of the pivot axis—around said pivot axis such that the left surface of the distribution and compaction part assumes a leftward inclination relative to an imaginary vertical plane above and parallel to the horizontal pivot axis.

Alike in the first aspect, the drive assembly is configured to move the refuse handling assembly from the receiving position into the rightward guiding position by pivoting the handling member to the left—seen in direction of the pivot axis—around said pivot axis such that the right surface of the distribution and compaction part assumes a rightward inclination relative to the imaginary vertical plane above and parallel to the horizontal pivot axis.

Alike in the first aspect, in the leftward guiding position, the left surface of the distribution and compaction part upwardly faces the entry opening, forming an inclined chute that guides received refuse towards a left-hand side of the outlet.

Alike in the first aspect, in said rightward guiding position, the right surface of the distribution and compaction part upwardly faces the entry opening, forming an inclined chute that guides received refuse towards a right-hand side of the outlet.

Alike in the first aspect, the drive assembly is configured to compact refuse, if the collection container has been sufficiently filled with refuse, by means of the refuse handling assembly as it is moved by the drive assembly into leftward and rightward compacting positions, e.g. corresponding to said leftward and rightward guiding positions.

Therein the refuse handling assembly consists of the pivotal handling member only, which moves unitary with respect to the frame in order to distribute and compact received refuse.

Advantageously, the functions of both distribution and compaction are integrated in a single moving part, which moves only unitary in order to distribute and compact the refuse.

A fourth source of dissatisfaction of present systems and devices concern the movability of the refuse handling member. For example, in WO2016/140573 the movability of the refuse handling member is limited, and the four-bar linkage that has been introduced to provide additional rotational movement to compensate this limited movability of the refuse handling member has a relatively complex structure. Furthermore, the drive assembly takes up a lot of space, especially when the handling device is used for compaction and a relatively large compaction force is required. Notwithstanding the above, the compaction force that is applied to the refuse handling member by the drive assembly is variable over the moving range of the refuse handling member.

In a fourth aspect thereof, it is therefore an object of the present invention to provide a refuse handling device that solves at least partially at least one of the abovementioned movability problems. In particular, the present invention aims to provide a refuse handling device that improves the rotational movability of the handling member. Furthermore, in particular, the present invention aims to provide a refuse handling device that reduces the space used for driving the handling member. Furthermore, in particular, the present invention aims to provide a refuse handling device that applies a more constant compaction force over the moving range of the refuse handling member.

According to the fourth aspect of the invention, there is provided a refuse handling device for a refuse collection container, comprising:

- a frame,
- a handling member that is mounted to the frame to pivot about a pivot axis, and
- a drive assembly operably connected to the handling member to pivot the handling member, wherein the handling member is configured to receive refuse, distribute received refuse over the refuse collection container, and/or compact refuse in the refuse collection container, wherein the drive assembly comprises:

a) a first hydraulic actuator including a first cylinder and a first rod moveable within and extending from said first cylinder, b) a second hydraulic actuator including a second cylinder and a second rod moveable within and extending from said second cylinder, and c) a connection member rotatable about a rotation axis in a first rotational direction and in a second rotational direction opposite to the first rotational direction, and connected to the handling member, e.g. via a pivot axle, such that rotation of the connection member causes the handling member to pivot about said pivot axis, characterized in that the first and second cylinder are mounted to each other to be moveable as a unit, in that the first and second rod extend parallel to each other in opposite directions from the unit, in that the first and second rod extending from the unit are connected to the frame of the refuse handling device or are connectable to the refuse collection container, and in that the unit is connected to the connection member using a first pulling member configured to cause the connection member to rotate in the first rotational direction upon movement of the unit in a first direction, and a second pulling member configured to cause the connection member to rotate in the second rotational direction upon movement of the unit in a second direction opposite to the first direction.

An advantage of the refuse handling device according to the fourth aspect of the invention arises from the effect that the rotational moving range of the connection member, which is connected to the handling member, determines the movability of the handling member and not a translational moving range defined by the first and second hydraulic cylinder as disclosed in WO2016/140573. Hence, advantageously, an additional design freedom is introduced to optimize movability of the hydraulic actuators and the refuse handling member.

A further advantage of the refuse handling device according to the fourth aspect of the invention may be that the applied torque to the connection member can be relatively large relative to the small space the drive assembly occupies.

A further advantage of the refuse handling device according to the fourth aspect of the invention may be that the applied torque to the handling member, i.e. the torque which translates via the handling member into the compaction force applied thereby on the refuse is more constant over the entire moving range of the refuse handling member. In other words, the torque applied to the refuse handling member can be made independent of the rotational position of the handling member.

In an embodiment, the first hydraulic actuator comprises a piston connected to the first rod, the piston of the first hydraulic actuator dividing a space inside the first cylinder in a cap side chamber and a rod side chamber, wherein the second hydraulic actuator comprises a piston connected to the second rod, the piston of the second hydraulic actuator dividing a space inside the first cylinder in a cap side chamber and a rod side chamber, wherein the rod side chamber of the first cylinder is hydraulically connected to the rod side chamber of the second cylinder, and wherein the cap side chamber of the first cylinder and the cap side chamber of the second cylinder are connected to a hydraulic pump configured to have a first mode in which hydraulic fluid is pumped from the second cylinder to the first cylinder and a second mode in which hydraulic fluid is pumped from the first cylinder to the second cylinder.

An advantage of this embodiment is that hydraulic fluid is exchanged between the first cylinder and the second cylinder, thereby minimizing the need of a reservoir with hydraulic fluid. Preferably, the first and second hydraulic actuator are similar in dimensions such that when moving the unit a decrease or increase in volume of one of the rod side chambers is equal to a corresponding increase or decrease in volume of the other one of the rod side chambers. Also preferably, the first and second hydraulic actuator are similar in dimensions such that when moving the unit a decrease or increase in volume of one of the cap side chambers is equal to a corresponding increase or decrease in volume of the other one of the cap side chambers.

In an embodiment, the unit of the first and second cylinder and the connection member are arranged next to each other in a plane perpendicular to the rotation axis of the connection member. In an embodiment, the first cylinder, the second cylinder and the connection member are arranged next to each other in said plane. In other words, the first cylinder, second cylinder and the connection member form a stack in said plane.

In an embodiment, the unit of the first and second cylinder is moveable between a first position in which the first rod is maximally retracted and the second rod is maximally extended and a second position in which the first rod is maximally extended and the second rod is maximally retracted. In an embodiment, the unit has an intermediate position substantially halfway the first and second position, and the connection member is arranged such that—seen in a moving direction of the unit—a centre of the unit is substantially aligned with the rotation axis of the connection member when the unit is in the intermediate position.

In an embodiment, the connection member is a cylindrically shaped element, wherein the first pulling element and the second pulling element are configured to be wound in opposite directions on the connection member during movement between the first and second positions. Preferably, the portion of the first and second pulling element that is not wound on the connection member and extends between the connection member and the unit is parallel to the first and second moving direction of the unit.

In an embodiment, the drive assembly is configured such that moving the unit between the first and the second position causes the connection member to rotate 180 degrees about the rotation axis.

In an embodiment, the first and second pulling member are embodied as chain members.

In an embodiment, the connection member defines a plane extending perpendicular to the rotation axis of the connection member, and wherein the first and second pulling member are arranged at opposite sides of said plane.

In an embodiment, the handling member is connected to the connection member such that the pivot axis of the handling member coincides with the rotation axis of the connection member.

In an embodiment, the frame comprises a bearing for the connection member. In an embodiment the connection member is connected to a pivot axle rotating inside the bearing, e.g. the pivot axle partly extending within a bore of the connection member aligned with the bearing. Preferably the pivot axle is connected to the handling member wherein a common connection member of both the drive assembly and the handling assembly comprises the pivot axle and the connection member of the drive assembly, so that the handling member is connected to the connection member via the pivot axle. Preferably the handling member comprises a bore inside which the pivot axle extends, which is aligned with the bore of the connection member of the drive assembly and, if present, the slot within the frame and/or the bearing therein.

In an embodiment, the unit comprises a frame to connect the first and second cylinder to each other. Preferably, the frame comprises a first frame part connecting the bottom side end of the first cylinder to the opposed rod side end of the second cylinder and a second frame part connecting the rod side end of the first cylinder to the opposed bottom side end of the second cylinder. The first and second frame part may be interconnected using connecting beams to form a rigid frame and thus a rigid unit.

The fourth aspect of the invention also relates to a drive assembly configured to drive a refuse handling member of a refuse handling device, comprising a first hydraulic actuator including a first cylinder and a first rod moveable within and extending from said first cylinder, a second hydraulic actuator including a second cylinder and a second rod moveable within and extending from said second cylinder, and a connection member rotatable about a rotation axis in a first rotational direction and in a second rotational direction opposite to the first rotational direction, and connectable to the handling member, e.g. via a pivot axle, such that rotation of the connection member causes the handling member to pivot about said pivot axis. Therein the first and second cylinder are mounted to each other to be moveable as a unit, and the first and second rod extend parallel to each other in opposite directions from the unit. Therein the first and second rod extending from the unit are connectable to a frame or other reference element. The unit is connected to the connection member using a first pulling member configured to cause the connection member to rotate in the first rotational direction upon movement of the unit in a first direction, and a second pulling member configured to cause the connection member to rotate in the second rotational direction upon movement of the unit in a second direction opposite to the first direction.

Hence, the connection member is configured to be connected to the refuse handling member such as to transfer a rotational movement of the connection member about the rotation axis to the refuse handling member. The transfer of said movement then causes the refuse handling member to move, e.g. pivot, so that thereby, the drive assembly drives the refuse handling device.

The fourth aspect of the invention further relates to a refuse collection system comprising a refuse collection container and a refuse handling device that is adapted to be mounted above or in a top of the refuse collection container, and which device is operable to receive refuse, e.g. a domestic refuse bag, that has dropped into the device and to distribute said refuse over said container and/or to compact said refuse collected with said container, which device is a refuse handling device according to the fourth aspect of the invention.

In an embodiment, the system is a subterranean refuse collection system further comprising a pit in the ground, e.g. a concrete pit, wherein the refuse collection container is adapted to be arranged in the pit and to be lifted from the pit for discharge of refuse.

In an embodiment, the refuse collection system yet also comprises a refuse introduction housing having an introduction opening allowing a user to introduce refuse therein, and wherein the refuse handling device is arranged below the refuse introduction housing to receive refuse from the refuse introduction housing that is introduced through the introduction opening.

The fourth aspect also relates to a method for collection of refuse, e.g. domestic refuse, wherein use is made of a refuse handling device according to the fourth aspect.

According to a fifth aspect of the invention, there is provided a drive assembly for a refuse handling device. This refuse handling device comprises firstly a first hydraulic actuator including a first cylinder and a first rod, wherein the first cylinder includes a bottom side end and a rod side end opposite the bottom side end, and wherein the first rod is moveable within and extending from said first cylinder at the rod side end thereof. The device comprises secondly a second hydraulic actuator including a second cylinder and a second rod, wherein the second cylinder includes a bottom side end and a rod side end opposite the bottom side end, and wherein the second rod is moveable within and extending from said second cylinder at the rod side end thereof. The device comprises thirdly a connection member. Therein, the first and second cylinder are mounted together such that the bottom side end of the first cylinder is arranged at or near the rod side end of the second cylinder and such that the rod side end of the first cylinder is arranged at or near the bottom side end of the second cylinder. The first and second cylinder are moveable as a unit between a first position, in which the first rod is maximally retracted and the second rod is maximally extended, and a second position, in which the first rod is maximally extended and the second rod is maximally retracted, wherein the connection member is rotatable about a rotation axis in a first rotational direction and in a second rotational direction opposite to the first rotational direction. Therein the unit is connected to the connection member using a first pulling member configured to cause the connection member to rotate in the first rotational direction upon movement of the unit in a first direction towards the second position, and a second pulling member configured to cause the connection member to rotate in the second rotational direction upon movement of the unit in a second direction towards the first position.

The fifth aspect of the invention also relates to a refuse handling device comprising a frame, a handling member that is mounted to the frame to pivot about a pivot axis, and a drive assembly operably connected to the handling member to pivot the handling member, wherein the drive assembly is a drive assembly according to the second aspect of the invention, wherein the connection member is connected to the handling member such that rotation of the connection member causes the handling member to pivot about said pivot axis.

The fifth aspect of the invention further relates to a refuse collection container comprising a refuse collection container and a refuse handling device that is adapted to be mounted above or in a top of the refuse collection container, and which device is operable to receive refuse, e.g. a domestic refuse bag, that has dropped into the device and to distribute said refuse over said container and/or to compact said refuse collected with said container, which device is a refuse handling device according to the fifth aspect of the invention.

The fifth aspect of the invention yet also relates to a method for collection of refuse, e.g. domestic refuse, wherein use is made of a refuse handling device according to the second aspect of the invention.

As will be appreciated by the skilled person, features and embodiments described in relation to the fourth aspect of the invention may readily be combined with the drive assembly, refuse handling device, refuse collection system, and method, respectively, according to the fifth aspect of the invention and will not be unduly repeated here.

Although the drive assemblies according to the fourth and fifth aspect of the invention have been described as being suitable for a refuse handling device, such a drive assembly can of course also used for other applications, especially when such other application also requires to improve the movability of a rotating or pivoting element, and/or requires to reduce the dimensions while maintaining sufficient torque or increasing the available torque in the same space, and/or requires to apply a more constant force over a moving range of a rotating or pivoting element.

The first, second, third, fourth, and fifth aspect of the invention furthermore each provide a refuse collection system, comprising a collection container with a bottom and perpendicularly thereto extending one or more adjoined side walls, and a top loading refuse distributing and compacting device that is configured to be mounted above or in the top of the refuse collection container and which device is operable to receive refuse, e.g. a domestic refuse bag, that has dropped into the device and to distribute said refuse over said container as well as to compact refuse collected with said container. Therein, the device is according to any of the aspects the invention.

In an embodiment, according to any aspect of the invention, the device is separate from the container, wherein the device is mountable above or in the top of the container by mounting of the frame to the container.

In an embodiment, the device is integrated with the container. For instance, one or more side and/or head walls of the frame may coincide with one or more side and/or head walls of the container. That is, the frame may comprise one or more side walls extending inside the container, surrounded by the side walls of the container, and one or more side walls formed by one or more of the container side walls. The pivot axle of the handling assembly, when present, may therein extend through aligned and opposed slots of opposed side walls of the frame and/or the container, for instance, two side walls of the frame, one side wall of the frame and one of the container, or two side walls of the container.

In an embodiment, the system is a subterranean refuse collection system comprising a pit in the ground, e.g. a concrete pit, wherein the collection container is adapted to be arranged in the pit and to be lifted from the pit for discharge of refuse such as to empty the container. In an embodiment the top loading refuse distributing and compacting device is mounted in the top of the refuse collection container.

In an embodiment, the system further comprises a refuse introduction housing having an introduction opening allowing a user to introduce refuse therein, e.g. provided with an introduction device, e.g. a drum type introduction device, so that the refuse drops into the top loading refuse distributing and compacting device, e.g. the duct thereof, if present. The refuse introduction housing preferably comprises a user interface panel, operable by users of the system. This interface panel may e.g. be connected to a security mechanism of the system, e.g. operating a closure device covering the introduction opening, in that the closure device is only openable or opened after receiving a signal to that effect from the interface panel, e.g. produced after a user has identified himself by means of the interface panel. The interface panel may also be connected to the control unit of the device, for instance to operate the handling assembly in response to signals from the interface panel, e.g. to move the handling assembly to the receiving position when the signal indicates that refuse is to be dropped into the container, e.g. after a user has identified himself by means of the interface panel. The refuse introduction housing may also comprise sensors connected to or connectable to the control unit, if present, e.g. presence and/or movement detection sensors, producing a signal indicating that refuse is or is to be dropped into the compacting and distributing device, for the purpose of said operation of the handling assembly.

The first, second, third, fourth, and fifth aspect of the invention each yet also relate to a method for collection of refuse, e.g. domestic refuse, wherein use is made of a refuse handling device according to the fourth aspect of the invention.

The first, second, third, fourth, and fifth aspect of the invention furthermore each provide a method for handling refuse introduced in a top loading refuse distributing and compacting device, e.g. in a refuse collection system comprising a collection container and the top loading refuse distributing and compacting device. Therein the device is configured to be mounted above or in the top of the refuse collection container, e.g. mounted above or in the top of the refuse container in the refuse collection system. Therein the device is operable to receive refuse, e.g. a domestic refuse bag, that has dropped into the device and to distribute said refuse over said container as well as to compact refuse collected with said container. Therein, the system may accord to any of the aspects the invention.

It is emphasized here that features and embodiments described in relation to the different aspects described herein, may be combined by the skilled person to obtain the effects and advantages thereof in combination.

The invention will now be described in a non-limiting way by reference to the accompanying drawings.

BRIEF DESCRIPTION OF THE DRAWINGS

In the drawings, like parts are indicated using like reference symbols, and wherein.

DETAILED DESCRIPTION OF EMBODIMENTS

Figure 1A:
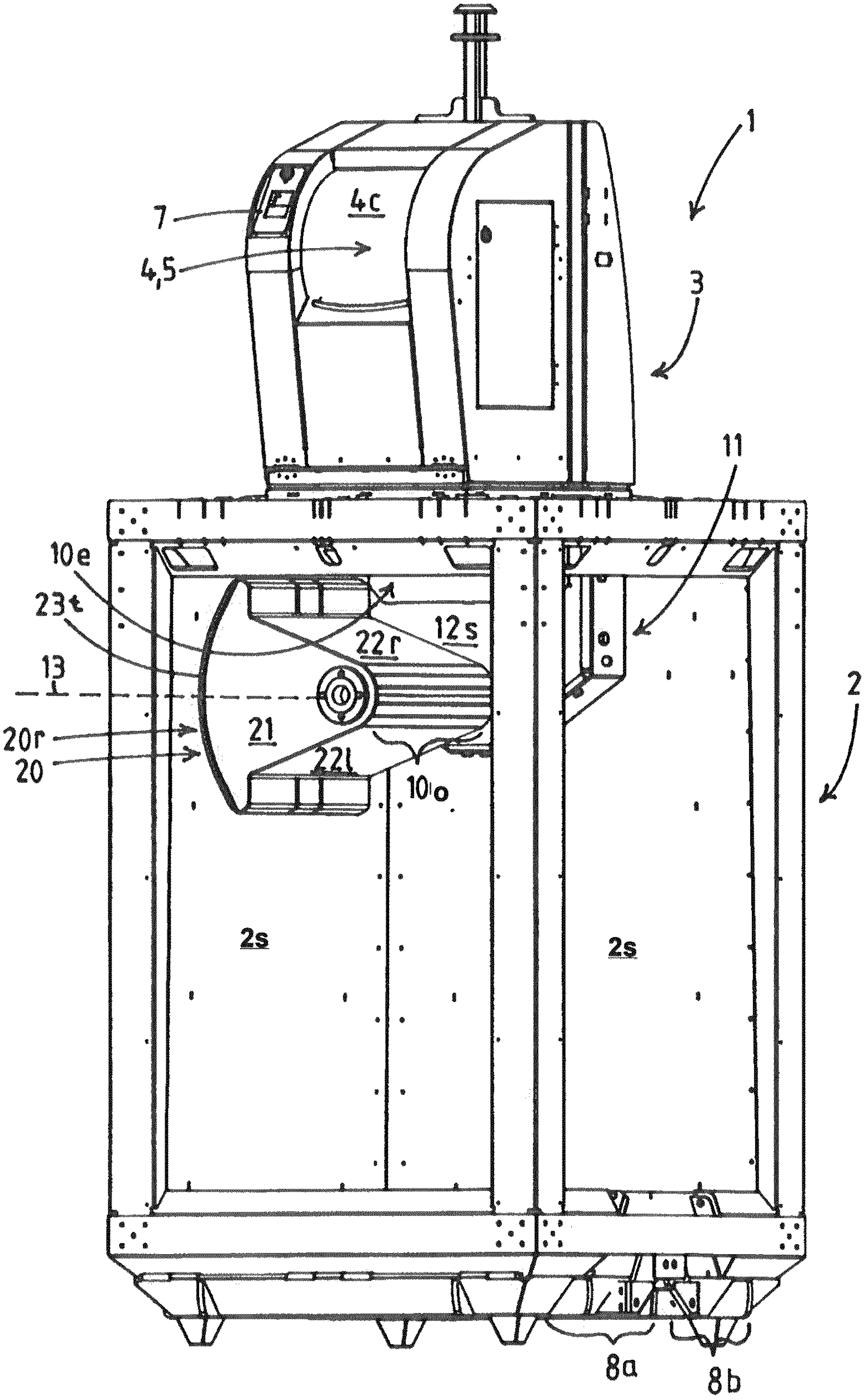
FIG. 1*a* shows in a perspective view a refuse collection system according to the invention, wherein a first embodiment of the device according to the invention is mounted in the top of a refuse collection container, wherein the refuse handling assembly is in the rightward guiding position thereof.

Referring firstly to FIGS. 1 and 2, an embodiment of a top loading refuse distributing and compacting device 10 according to the invention is shown being mounted in the top of a subterranean refuse collection container 2 of a refuse collection system 1. In the figures the front and right side wall of the container 2 have been removed, such as to enable the view of the inside of the container 2. The refuse collection system 1 further comprises an overhead or above ground refuse introduction housing 3 and a refuse handling device 10.

The overhead refuse introduction housing 3 has an introduction opening 4 allowing a user to introduce refuse therein. Here, the housing is provided with an introduction device 5, namely a drum type introduction device, so that the refuse drops into a duct of the overhead refuse introduction housing 3 to guide the refuse towards the refuse handling device 10. The overhead introduction housing 3 is depicted here to one side of the container 2, but it is also known and possible to have the overhead introduction housing 3 centrally above the container 2.

FIG. 1 shows that the introduction opening 4 comprises a releasably lockable closure element 4*c*, which when locked prevents a user to introduce refuse into the refuse introduction housing. A user interface panel 7 is provided to the introduction housing 3 next to the introduction opening 4. The closure element 4*c* only opens after a user has identified himself at the user interface panel 7.

As will be appreciated by the skilled person, the depicted container 2 may be arranged in a pit in the ground, e.g. a concrete pit, as is known in the art. The refuse container 2 is adapted to be arranged in the pit and to be lifted from the pit for discharge of refuse such as to empty the container 2.

It is visible in FIGS. 1 and 2 that the container thereto comprises a openable bottom with a front and rear pivotal bottom element 8*a*, 8*b*.

As shown in FIGS. 1 and 2, the system 1 comprises a refuse introduction housing 3 having an introduction opening 4 allowing a user to introduce refuse therein.

Figure 1B:
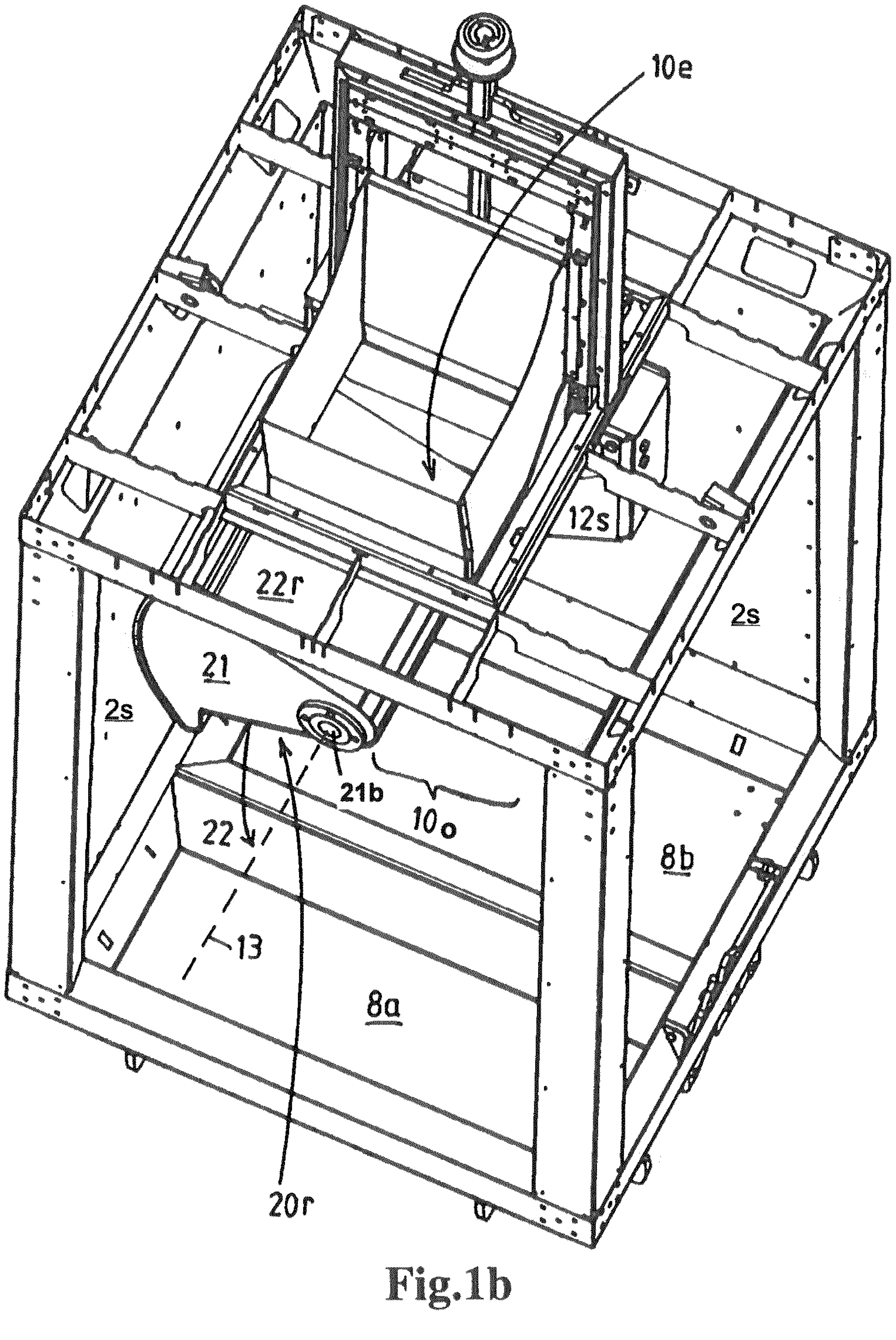
FIG. 1*b* shows in another perspective view the same system, with the refuse handling assembly in the same position.
Figure 1C:
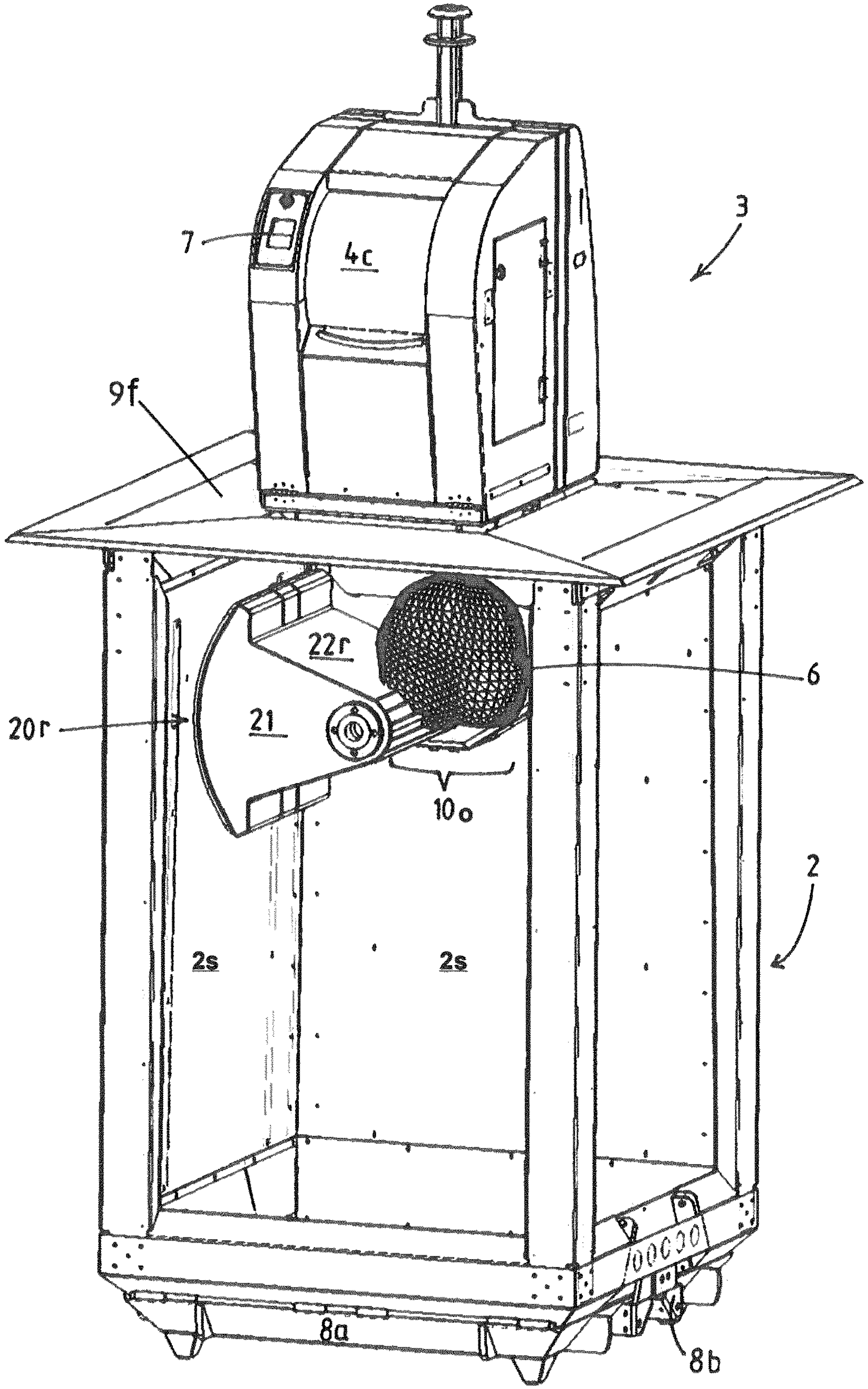
FIG. 1*c* shows in a perspective view the same system, with the refuse handling assembly in the same position, wherein a refuse bag slides from the right surface of the assembly into the container.

The device 10 is operable to receive refuse 6, e.g. a domestic refuse bag 6 as is depicted in FIG. 1*c*, that has dropped into the device 10 and to distribute said refuse over said refuse collection container 2 as well as to compact refuse collected with said container 2. Because the refuse handling device 10 is used for both distributing and compacting refuse in the container 2, the refuse handling device 10 may alternatively be referred to as a top loading refuse distributing and compacting device.

The figures show several embodiments of the device 10. FIGS. 3, 7, 8 and 11 depict a first embodiment, and FIGS. 4 and 9 a second embodiment. The system 1 shown in FIGS. 1, 2, comprises the first embodiment. However, in the system 1 the first embodiment is replaceable by the second embodiment to obtain another system 1 according to the invention.

In both embodiments, but shown in FIGS. 1 and 2 for the system 1 comprising the device 10 according to the first embodiment, the device 10 has an entry opening 10*e* at a top thereof for entry of refuse dropped into the device, via overhead refuse insertion housing 3, and has an outlet 10*o* at a bottom thereof allowing refuse to drop into the refuse collection container 2 underneath.

In both embodiments the device 10 comprises firstly a frame 11 adapted to be mounted above or in the top of refuse collection container 2 of the system. The frame 11 comprises a rear wall 12*s*.

The frame is e.g. bolted or otherwise releasably secured, e.g. to horizontal girders 9*a* and 9*b* in the top of the container 2. For example, as shown here, said girders 9*a*, 9*b* form a support structure for the housing 3 and/or a floor panel 9*f* on which user of the system 1 can stand and walk.

The refuse handling device 10 may be retrofitted into an existing refuse collection system 1 in which case the frame 11 may be separately from a frame of the container 2, and the frame 11 and/or other components of the refuse handling device 10 are mounted to the frame or other components of the container 2. Additionally, or alternatively, the frame 11 may be have been part of a transport frame comprising portions that are only used during transport and which are removed before or after retrofitting of the refuse handling device 10 into the refuse collection system.

Instead of being retrofitted into an existing refuse collection system, the refuse handling device 10 may also be an integral part of the refuse collection system in which case the frame 11 may be integrated with or be part of the frame of the container 2.

Applying to both of the above described situations, it may be preferred that the entire refuse handling device 10 or parts thereof are exchangeable or at least releasable, e.g. for maintenance or repair operations.

In both embodiments the device 10 secondly comprises a refuse handling assembly 20, and thirdly a motorized drive assembly 40 which is operably connected to the refuse handling assembly 20. This drive assembly 40 is mounted to the rear wall 12*s* at the rear side thereof, as is visible from FIGS. 7 and 8.

In both embodiments the refuse handling assembly 20 comprises a pivotal handling member 21, that is mounted to the frame 11, namely to the rear wall 12*s* thereof at the front side thereof, to pivot about a horizontal pivot axis 13 in order to allow the handling member 21 to distribute and/or compact refuse in the refuse collection container 2. This horizontal pivot axis 13 extends between the rear wall 12*s* and the front wall of the container (not shown), beneath the entry opening 10*e*, and intersecting said sidewalls perpendicular thereto.

The pivotal handling member 21 has a distribution and compaction part 22 and a receiving part 23. The distribution and compaction part 22 comprises a left surface 221 and a right surface 22*r*. The receiving part 23 comprises a top surface 23*t* extends parallel to and remote from said pivot axis 13, and adjoins the left and right surfaces 221, 22*r* of the distribution and compaction part 22 at respective opposed sides thereof. Here, the top surface 23*t*, the first refuse engaging surface 22*r* and the second refuse engaging surface 221 are closed surfaces, as is preferred. Further, the handling member 21 comprises a front surface 22*f* and rear surface 22*b*, which are opposite to each other and are also closed thereby resulting in a closed handling member 21. The handling member 21 may be solid, but may also be hollow to minimize the weight of the handling member 21.

The handling member 21 has a shape seen in front and rear view that substantially resembles a circular sector with the top surface 23*t* corresponding to the arc of the circular sector and the left and right surfaces 22*r*, 221 corresponding to the radii of the circular sector.

Figure 2A:
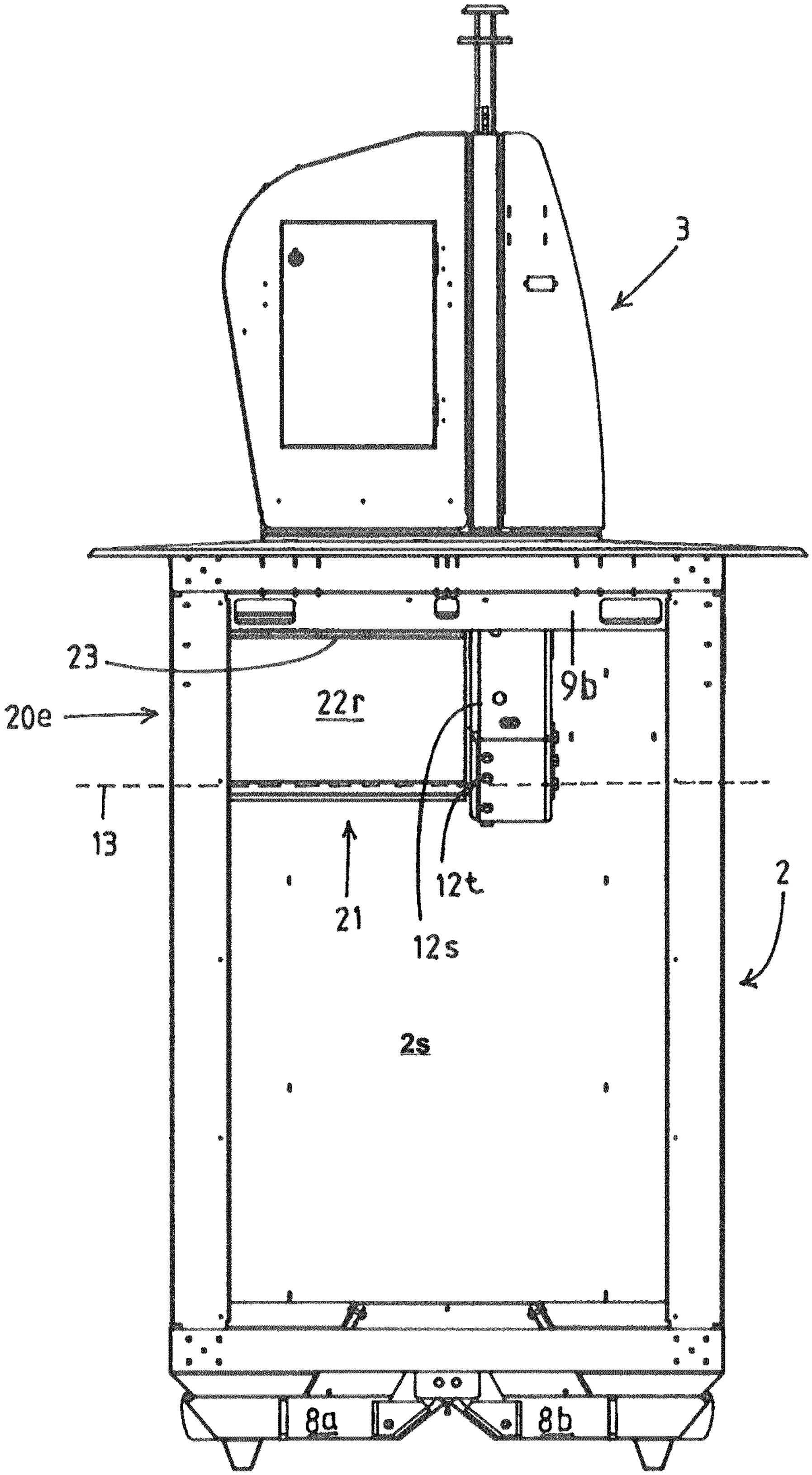
FIG. 2*a* shows in a side view the refuse collection system of FIG. 1, wherein the refuse handling assembly is in the receiving position thereof.
Figure 2B:
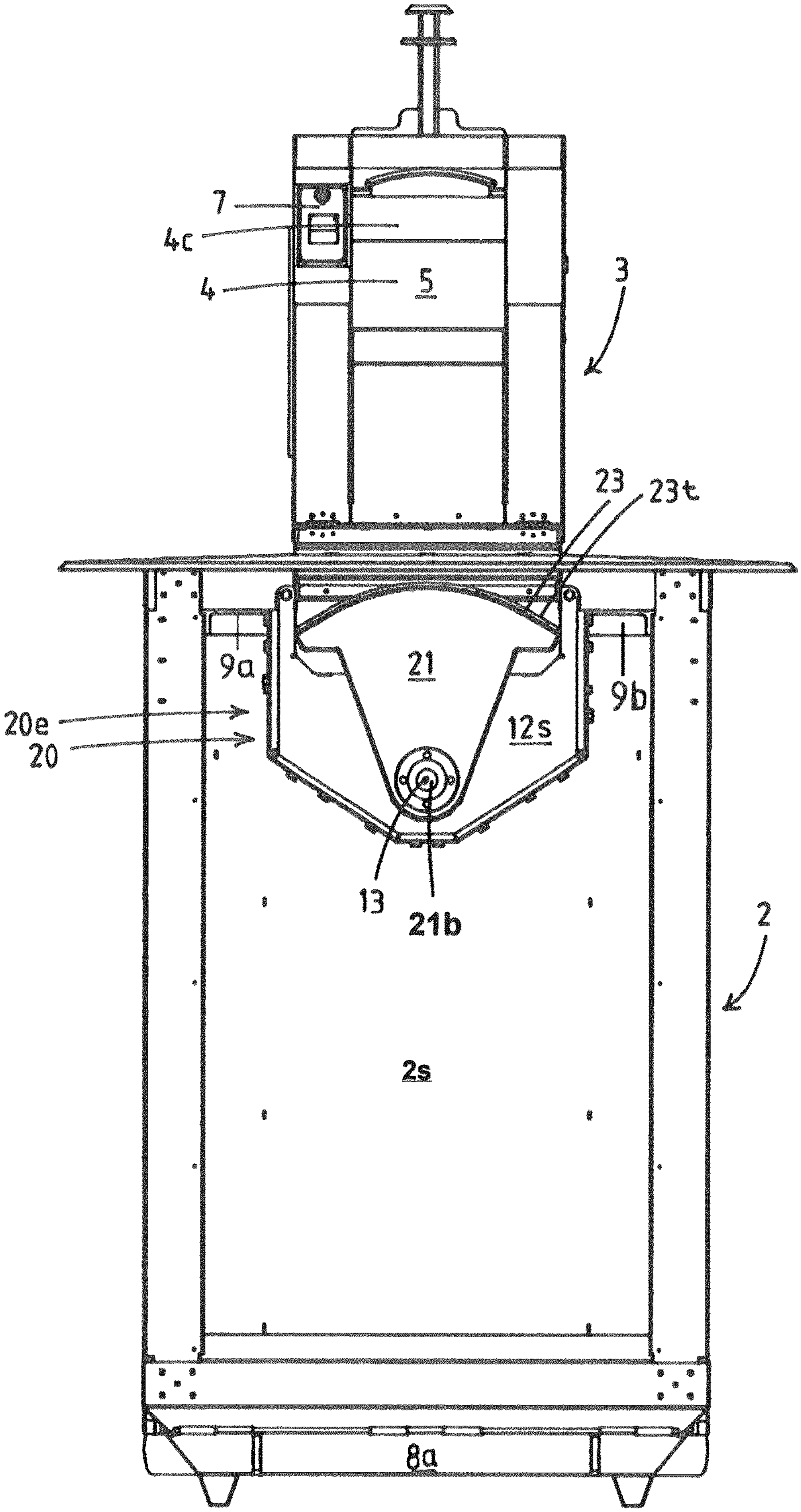
FIG. 2*b* shows in a side view the system of FIG. 1, the refuse handling assembly being in the receiving position thereof.
Figure 2C:
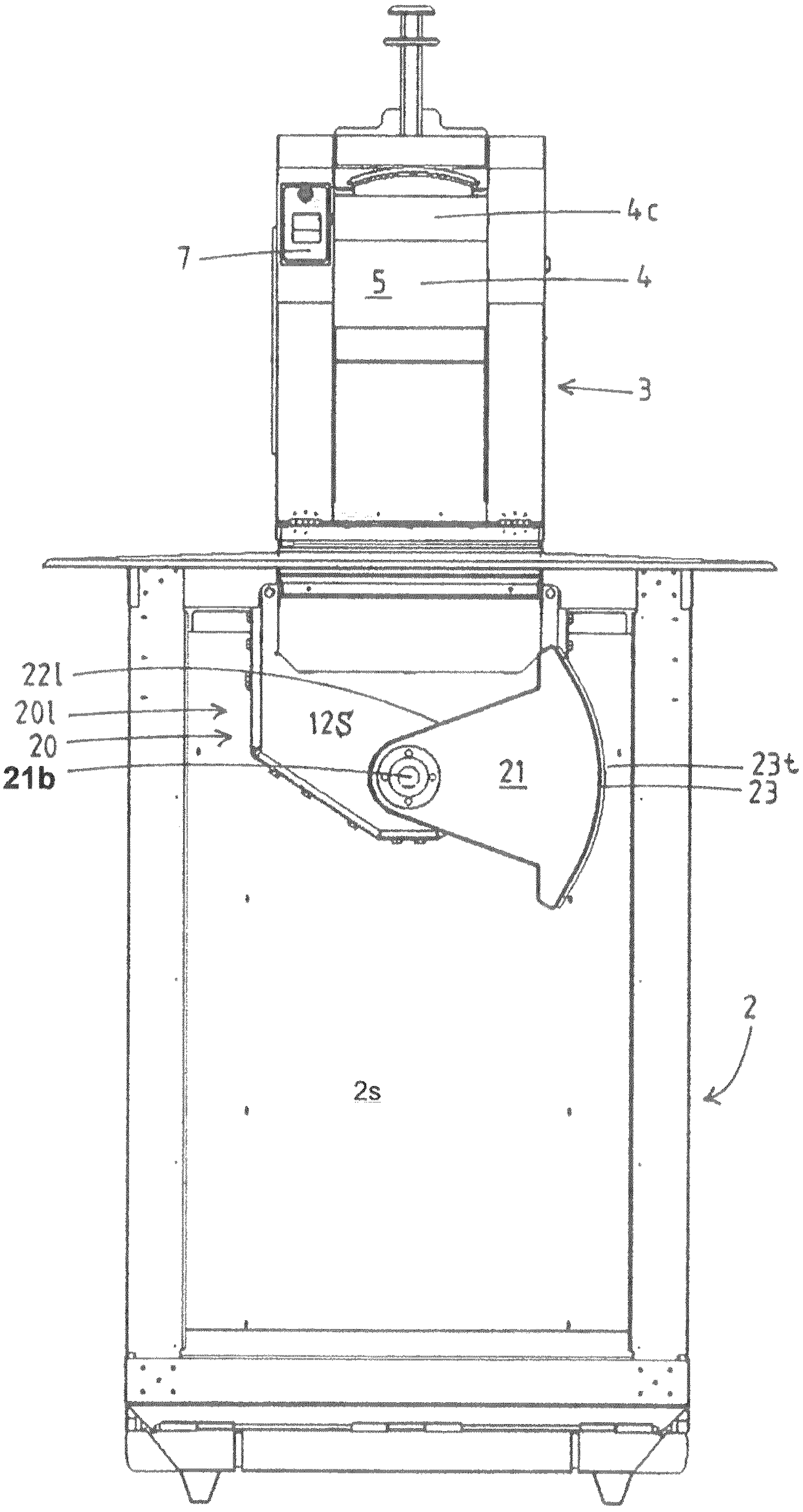
FIG. 2*c* shows in a front view a refuse collection system of FIG. 1, wherein the refuse handling assembly is in the leftward guiding position thereof.

The refuse handling assembly 20 is selectively movable by the drive assembly 40 between and into a receiving position 20*e*, shown in FIGS. 1 and 2*a*, a leftward guiding position 201, shown in FIG. 2*b*, and a rightward guiding position 20*r*, shown in FIG. 2*c*. The drive assembly 40 of the first embodiment of the device 10 is best visible in FIGS. 7 and 8, and the drive assembly 40 of the second embodiment of the device 10 in FIG. 9.

Figure 11:
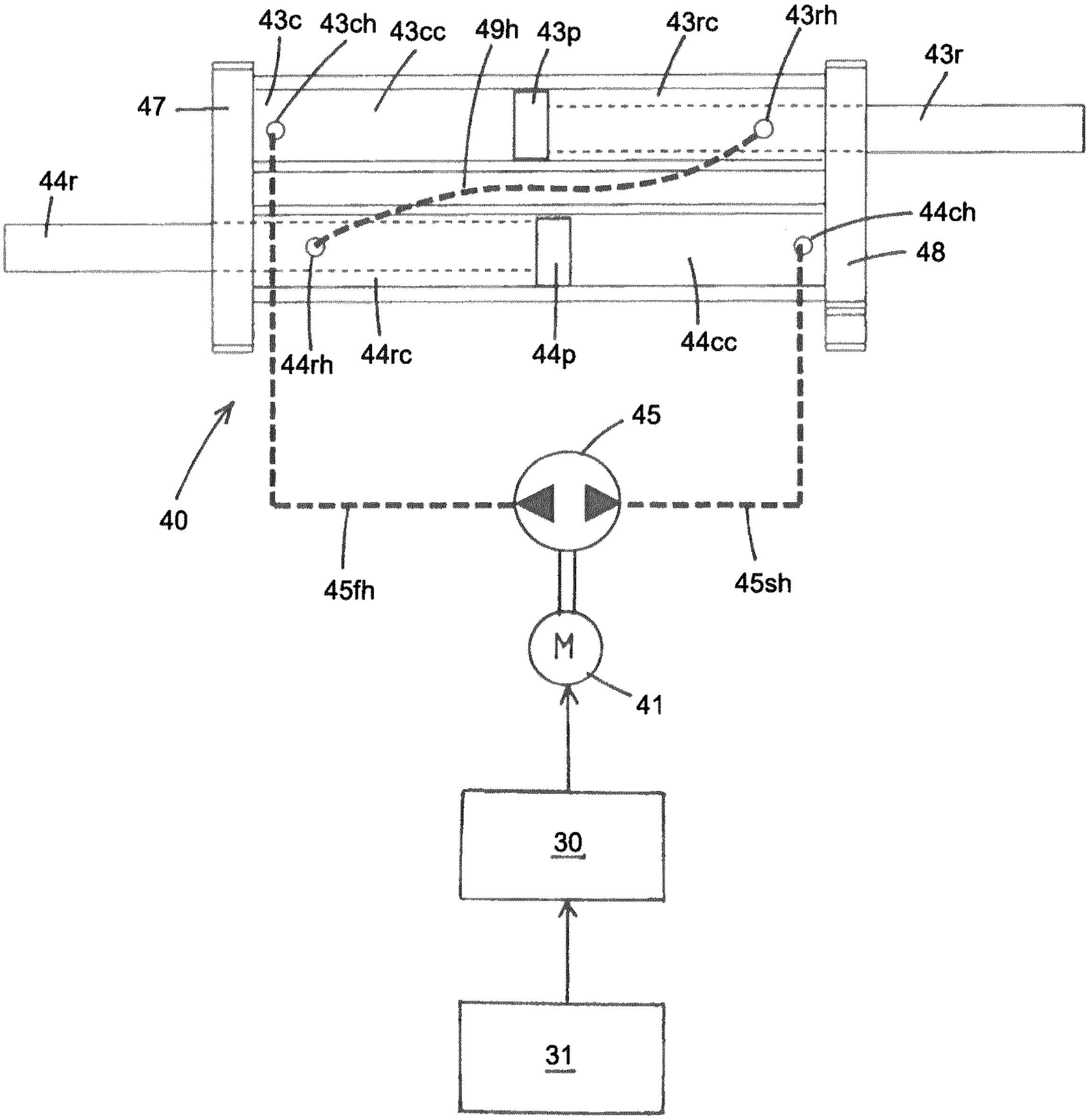

The drive assembly 40 is operably connected to the handling member 21 to pivot the handling member 21 about the pivot axis 13. In FIGS. 1-6, the drive assembly 40 is not visible as it is hidden in a housing part 14 of the frame 11. FIGS. 7 and 8 depict a first embodiment of the refuse handling device 10 in isolation, and FIG. 9 depicts a second embodiment of the device 10 in isolation, omitting in these figures a rear wall 14*b* of the housing 14 to show the interior of the housing 14 including the drive assembly 40. The use of the housing part 14, which main function is to support and cover the drive assembly 40, has the advantage that the drive assembly 40 is sufficiently protected and for instance operation thereof cannot be interfered with by the presence of refuse as refuse is not able to reach the drive assembly 40, not even in case the refuse is compacted by the refuse handling device 10. FIG. 11 depicts a hydraulic scheme of the drive assembly 40.

Figure 7A:
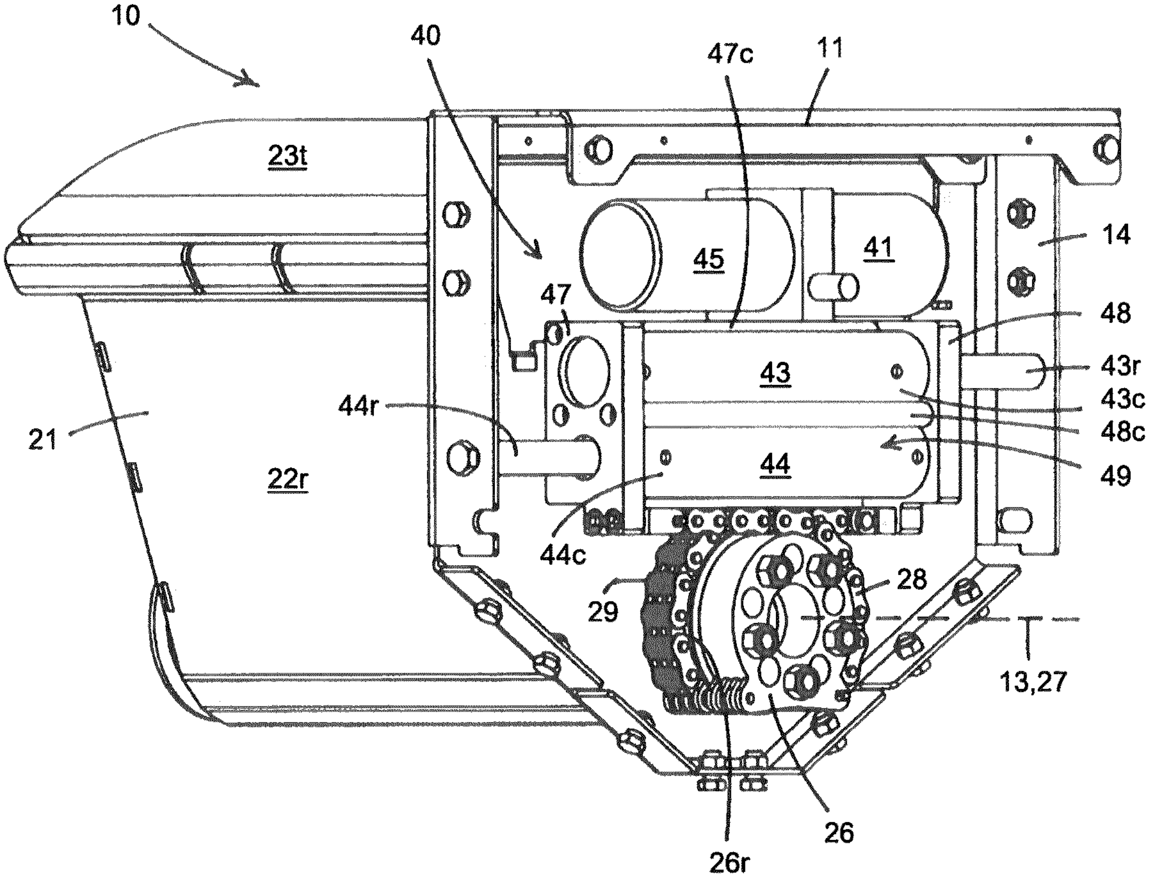
FIG. 7*a* shows in a perspective view the handling assembly, the rear wall of the frame and the drive assembly of a device according to the invention, wherein the refuse handling assembly is in the receiving position thereof.

The drive assembly 40 is configured to move the refuse handling assembly 20 into the receiving position 20*e* of FIG. 7*a*, also shown in FIGS. 2*a-b*, 3, 4*b*,5, 8*a*, and 9*a* by pivoting the handling member 21 around said pivot axis 13 such that the top surface 23*t* of the receiving part extends substantially underneath the entry opening 12*e*, preferably substantially horizontally, such that refuse that is dropped into the duct 12 through the entry opening 12*e* is received by the top surface 23*t* and thereby supported on the handling member 21.

The drive assembly 40 is furthermore configured to move the refuse handling assembly 20 from the receiving position 20*e* into the leftward guiding position 201 of FIGS. 2*c,e*, 7*b*, 8*c*, and 9*c*. Thereto it pivots the handling member 21 to the right—seen in direction along the pivot axis 13 from the handling member 21 towards the drive assembly 40—around said pivot axis 13 such that the left surface 221 of the distribution and compaction part 22 assumes a leftward inclination θ1 relative to an imaginary vertical plane above and parallel to the horizontal pivot axis 13. In the leftward guiding position 201, the left surface 221 of the distribution and compaction part 22 upwardly faces the entry opening 12e, forming an inclined chute that guides received refuse 6 towards a left-hand side of the outlet 12o.

Figure 2D:
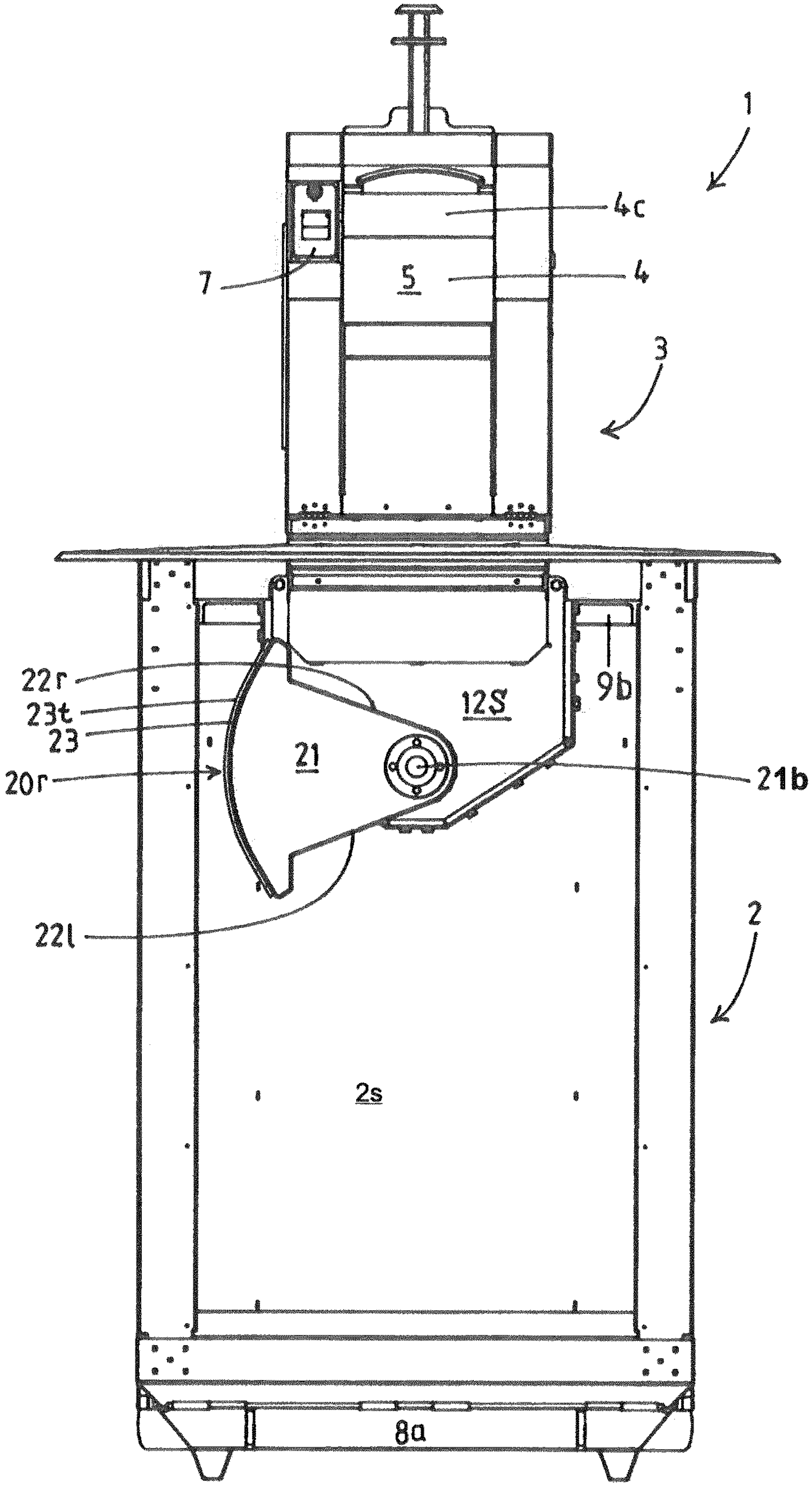
FIG. 2*d* shows in a front view a refuse collection system of FIG. 1, wherein the refuse handling assembly is in the rightward guiding position thereof.
Figure 2E:
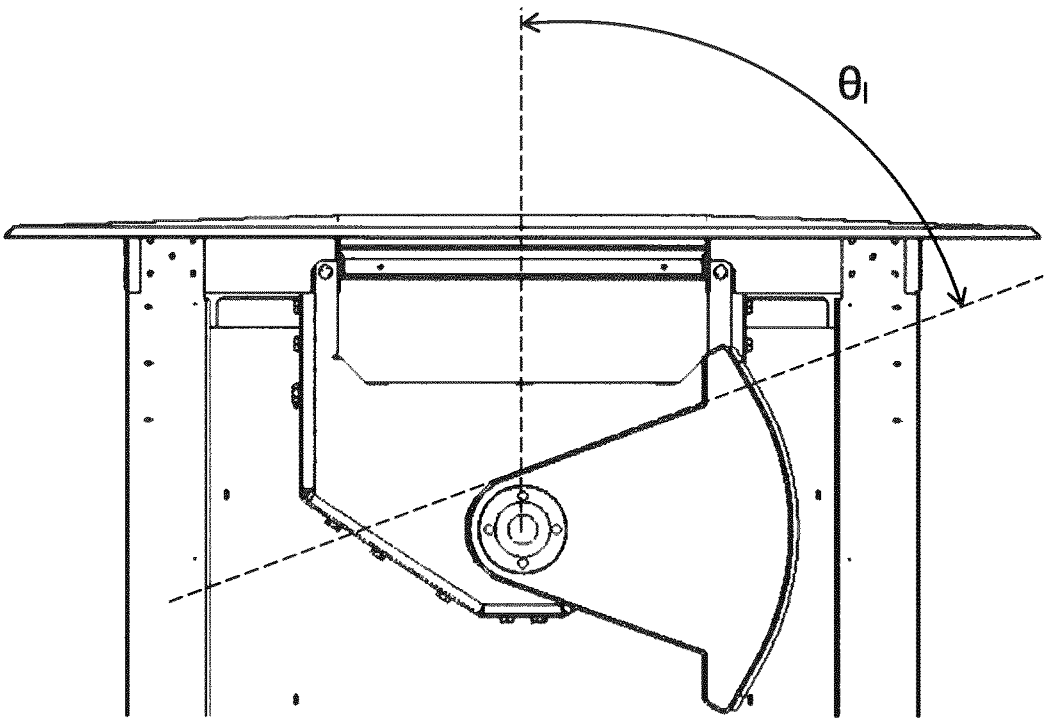
FIG. 2*e* shows in a front view a part of the refuse collection system, wherein the refuse handling assembly is in the leftward guiding position thereof.
Figure 2F:
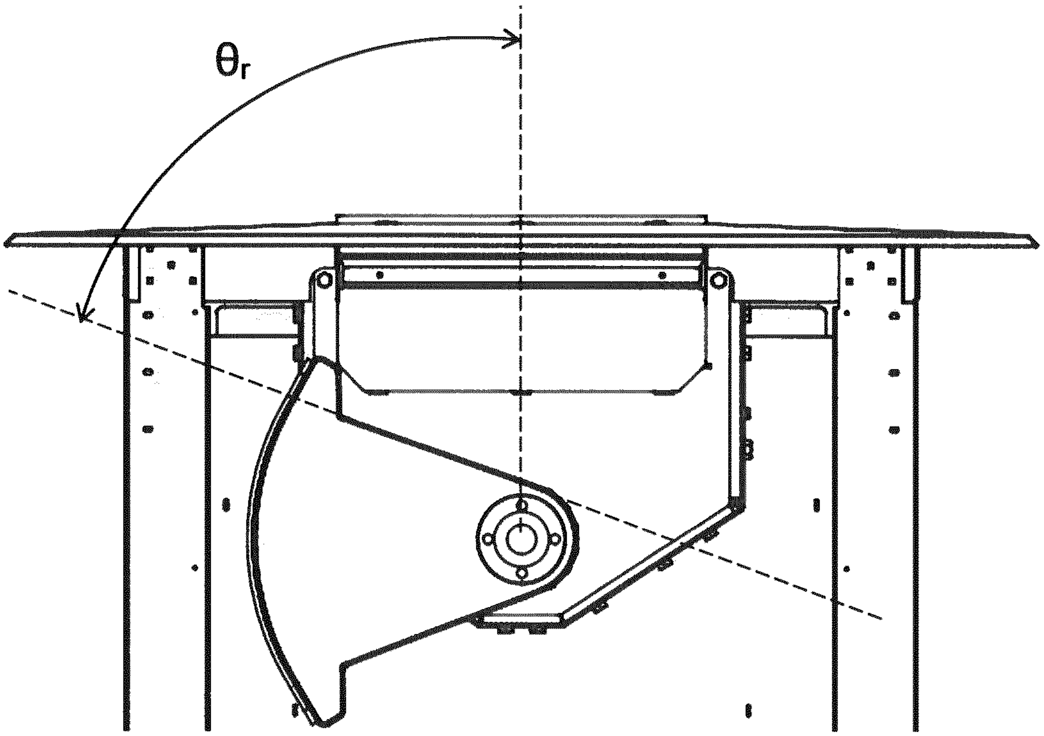
FIG. 2*f* shows in a front view a part of the refuse collection system of FIG. 1, wherein the refuse handling assembly is in the rightward guiding position thereof.

The drive assembly 40 is furthermore configured to move the refuse handling assembly 20 from the receiving position 20e into the rightward guiding position 20r of FIGS. 1b-c, 2d,f, 4a, and 8b. Thereto it pivots the handling member 21 to the left—seen in direction of the pivot axis 13 from the handling member 21 towards the drive assembly 40—around said pivot axis 13 such that the right surface 22r of the distribution and compaction part 22 assumes a rightward inclination Or relative to the imaginary vertical plane above and parallel to the horizontal pivot axis 13. In the rightward guiding position the right surface 22r of the distribution and compaction part 22 upwardly faces the entry opening 12e, forming an inclined chute that guides received refuse 6 towards a right-hand side of the outlet 12o.

As can be envisaged from the figures, in particular from FIGS. 1 and 2, the drive assembly 40 is configured to compact refuse, if the collection container 2 has been sufficiently filled with refuse, that is, up to the level of the right surface 22r in the leftward guiding position 201 of FIG. 2b, and of the left surface 221 in the rightward guiding position 20r of FIG. 2c, by means of the refuse handling assembly 20 as it is moved by the drive assembly 40 into these guiding positions 221, 22r. The left and right guiding positions 221, 22r correspond to left and right compacting positions, respectively.

Now referring to FIGS. 7, 8, 9 and 11, the drive assembly 40 comprises a first hydraulic actuator 43, a second hydraulic actuator 44, a first frame part 47, a second frame part 48, a first pulling member 28, a second pulling member 29, a connection member 26, a hydraulic pump 45 and a motor 41.

In both embodiments of the device 10 the first hydraulic actuator 43 comprises a first cylinder 43c and a first rod 43r moveable within and extending from the first cylinder 43c. The second hydraulic actuator 44 comprises a second cylinder 44c and a second rod 44r moveable within and extending from the second cylinder 44c. The movability of the first and second rod 43r, 44r is to be interpreted as a relative movement with respect to the corresponding first and second cylinder 43c, 44c.

The first frame part 47 and the second frame part 48 may be interconnected using connecting beams 47c, 48c as indicated in FIG. 7a thereby allowing to increase the rigidity and/or stiffness of the unit 49. In both embodiments the first cylinder 43c and the second cylinder 44c are mounted to each other to moveable as a unit 49.

In both embodiments the first frame part 47 connects a bottom side end of the first cylinder 43c to a rod side end of the second cylinder 44c while the second frame part 48 connects a bottom side end of the second cylinder 44c to a rod side end of the first cylinder 43c. As a result thereof, the first and second cylinder 43c, 44c are arranged parallel to each other with the first and second rod 43r, 44r also extending parallel to each other in opposite directions from the unit 49.

The first and second rod 43r, 44r are connected to the frame 11, i.e. the housing part 14, of the refuse handling device 10. However, in an alternative embodiment, the first and second rod are connected to a frame of the refuse collection container. In anyway, the first and second rod 43r, 44r form a stationary part of the drive assembly allowing the unit 28 to be the moveable part of the drive assembly 40.

In the first embodiment, the unit 49 is formed by the first and second cylinders 43c, 44c, the first frame part 47, the second frame part 48, the hydraulic pump 45 and the motor 41, see FIGS. 7 and 8. An advantage of providing the hydraulic pump 45 and the motor 41 as part of the unit 49 is that all hydraulic components move together on the unit 49 and power needs to be provided to the motor 41 only.

In the second embodiment the unit 49 is formed by the first and second cylinders 43c, 44c, the first frame part 47, the second frame part 48, see FIG. 9. The hydraulic pump 45 and the motor 41 are fixed to the housing 14 via fixation 49d. The unit 49 thus moves relative to the motor 41 and the hydraulic pump 45. A horizontal guiding rod 49g is provided which extends horizontally through the frame members 47, 48. An advantage of the motor 41 and the hydraulic pump 45 not being part of the unit 49, the unit 49 being movable relative to the motor 41 and the hydraulic pump 45 is that the number of moving parts is reduced, facilitating the robustness of the drive assembly 40. Furthermore, excluding the motor 41 and the pump 45 from the unit results in the mass of the moveable unit 49 that moves back and forth being reduced, improving mechanical stability and robustness, and reducing the dynamic load on the frame.

In both embodiments the connection member 26 is rotatable about a rotation axis 27 in a first rotational direction 27f and in a second rotational direction 27s opposite to the first rotational direction 27f, see FIGS. 7, 8 and 9. The rotation axis 27 in both embodiments coincides with the pivot axis 13 of the handling member 21 as the connection member 26 is directly mounted to the handling member 21.

The connection member 26 is in both embodiments a cylindrically shaped element having a central bore 26b extending through the element along rotation axis 27 and aligned with the slot 12t in the frame 11. The central bore 26b is able to receive a pivot axle 15. The first embodiment is shown without such pivot axle 15, and the second with a pivot axle 15 being inserted into the bore 26b to rotatably connect the connection member 26 to the frame 11. The bore 26b and the pivot axle 15 is the same in both embodiments. The pivot axle 15 is also connectable or connected to, or integrated with, the handling member 21 such as to interconnect the drive assembly 40 with the handling member 21, so that the handling member 21 rotates with the connection member 26 between its positions. In both embodiments the handling member 21 also comprises a bore 21b aligned with the bore 26b of the drive assembly and with the slot 12t and the bearing. The pivot axle 15 is to extend through both bores 21b, 26b and the bearing. The pivot axle and the connection member 26 together form a common connection member of the drive assembly 40 and the handling assembly 20. For the second embodiment, it is visible that the pivot axle 15 is also supported in a bearing in a recess in the rear surface 14b of the housing part 14, see FIG. 9.

In both embodiments the connection member 26 is connected to the first frame part 47 via the first pulling member 28 in such a way that the connection member 26 is caused to rotate in the first rotational direction 27f upon movement of the unit 49 in a first direction as will be explained below in more detail. The connection member 26 is further connected to the second frame part 48 via the second pulling member 29 in such a way that the connection member 26 is caused to rotate in the second rotational direction 27s upon movement of the unit 49 in a second direction as will be explained below in more detail.

FIG. 8 and FIG. 9 respectively depict the refuse handling device 10 according to the first and second embodiment in rear view with the handling member 21 in different positions caused by the drive assembly 40, which positions correspond to the positions of the handling member 21 as depicted in the respective FIGS. 2*a*-*b*, 2*d* and 2*c*. It is explicitly noted here that FIGS. 2*a*-*d* are front views of the refuse collection system and thus also front views of the refuse handling device 10 while the FIGS. 8 and 9 are rear views of the refuse handling device 10.

Figure 7B:
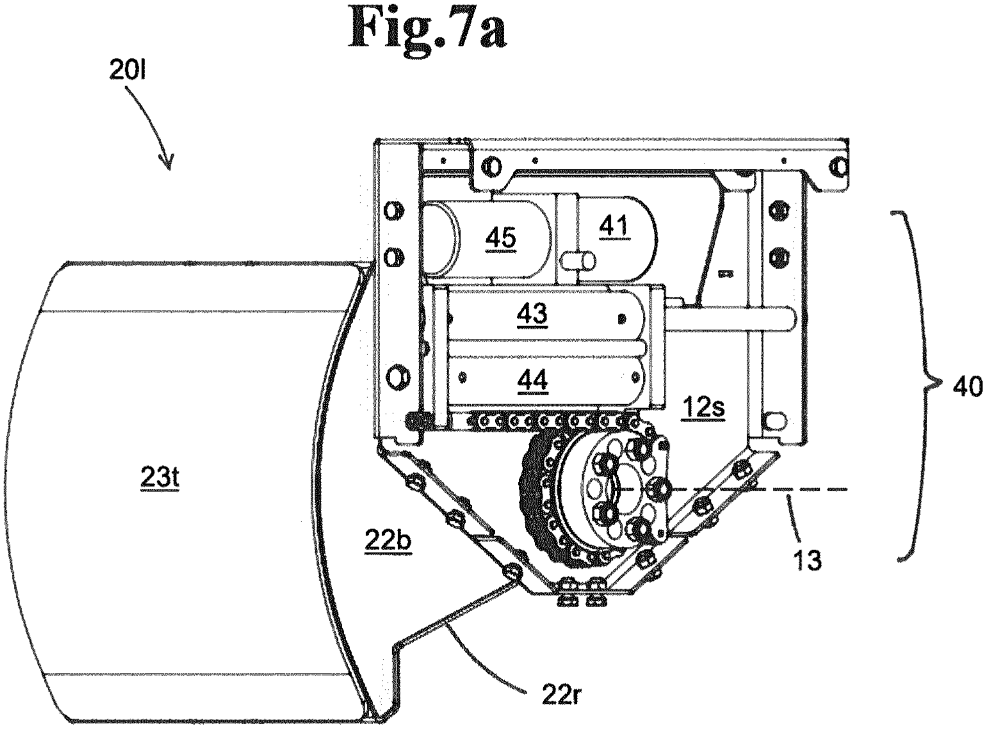
FIG. 7*b* shows in a perspective view the same parts, wherein the refuse handling assembly is in the leftward guiding position thereof.
Figure 8A:
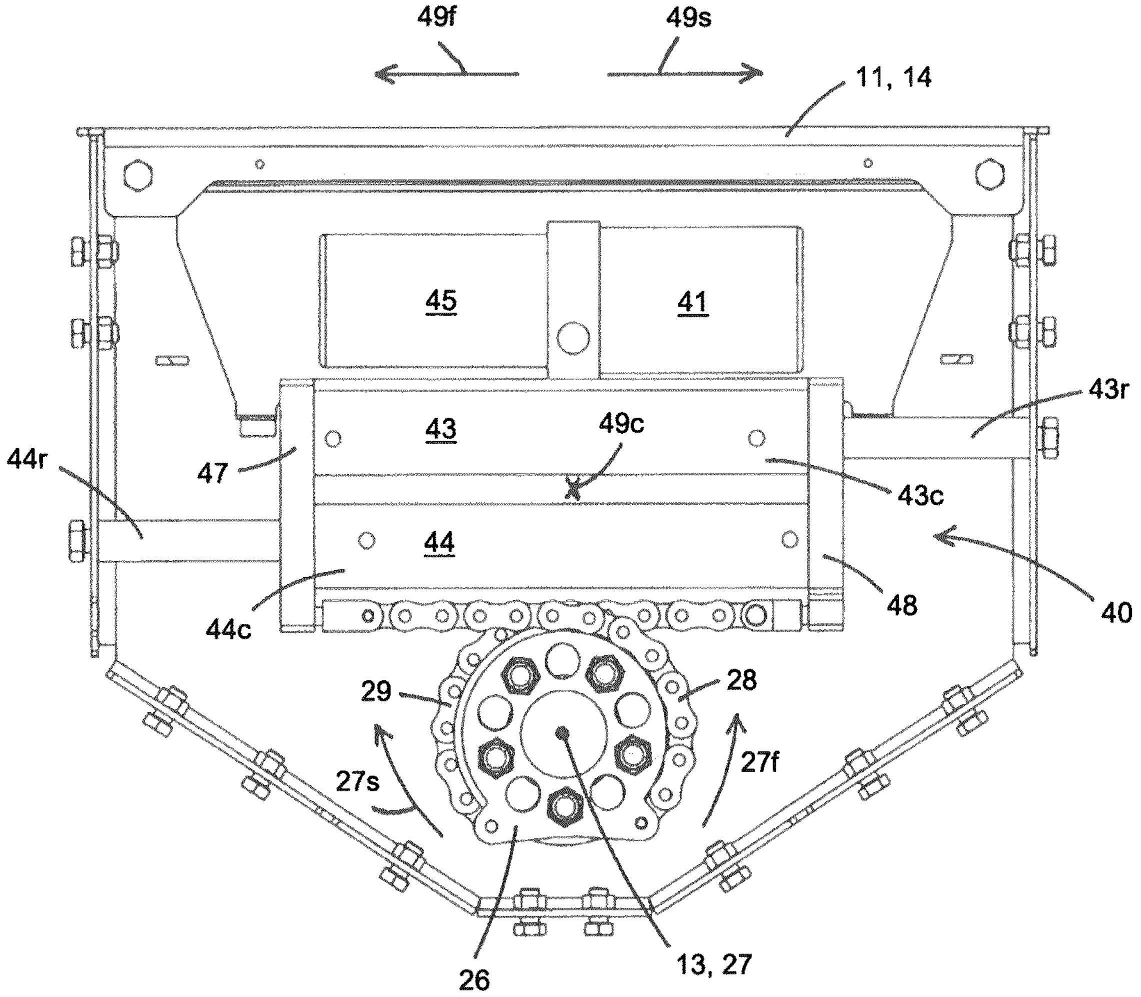
FIG. 8*a* shows in a rear view the same parts, wherein the refuse handling assembly is in the receiving position thereof.
Figure 8B:
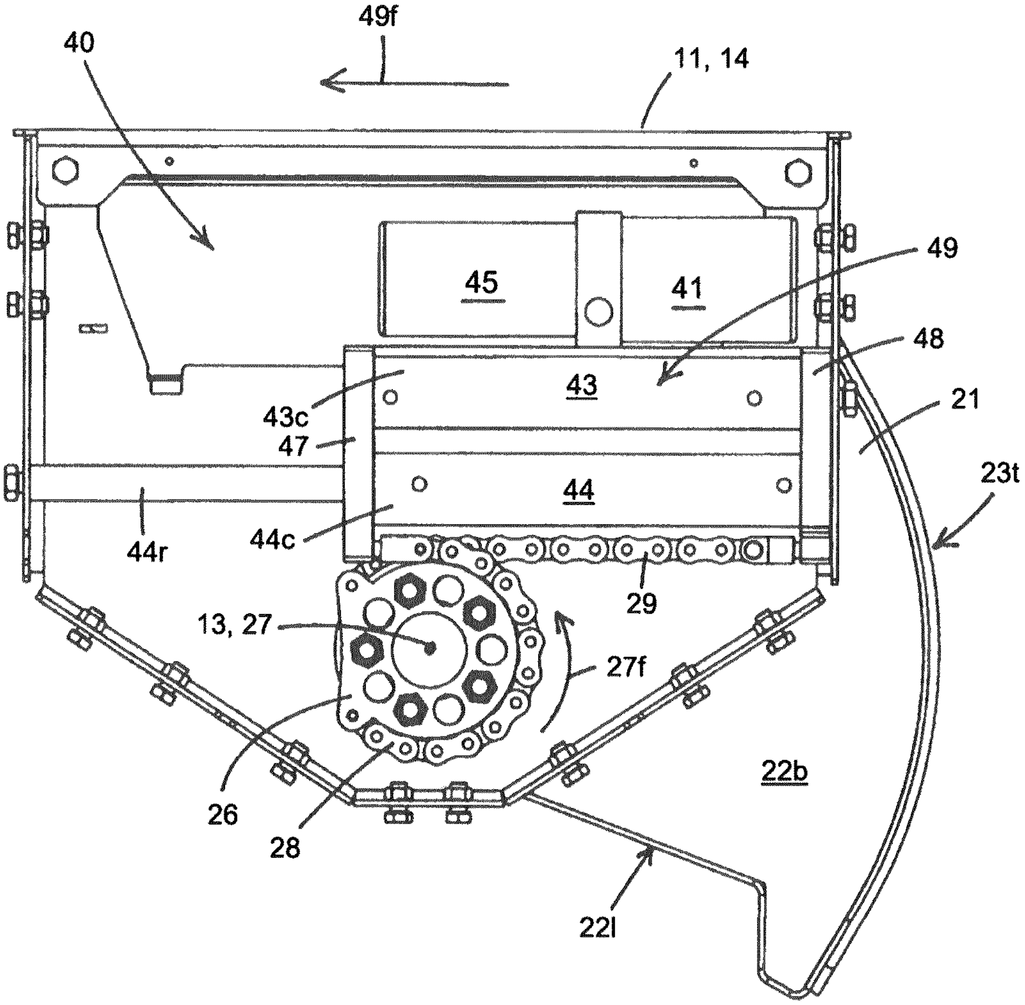
FIG. 8*b* shows in a rear view the same parts, wherein the refuse handling assembly is in the rightward guiding position thereof.
Figure 8C:
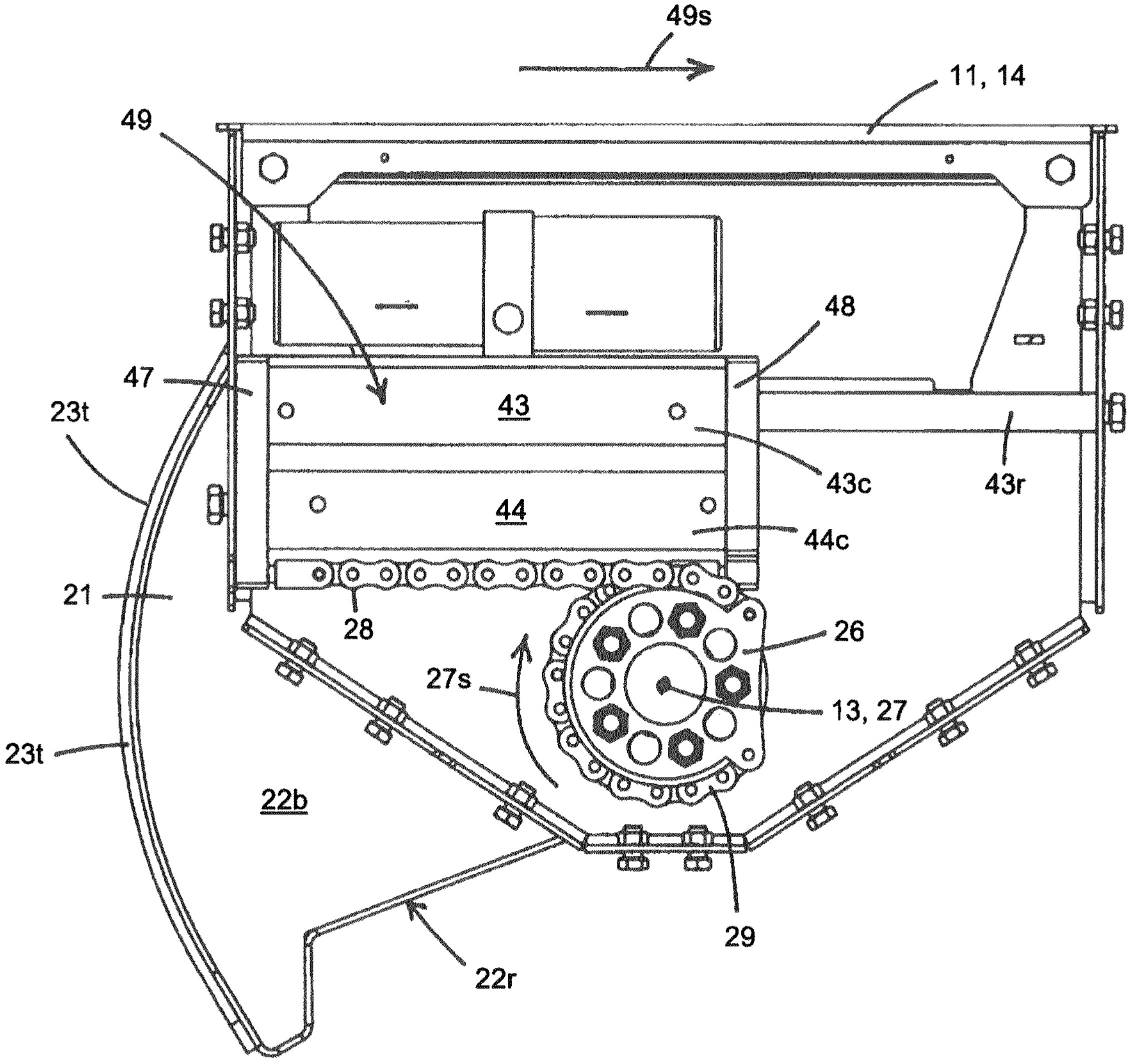
FIG. 8*c* shows in a rear view the same parts, wherein the refuse handling assembly is in the leftward guiding position thereof.
Figure 9A:
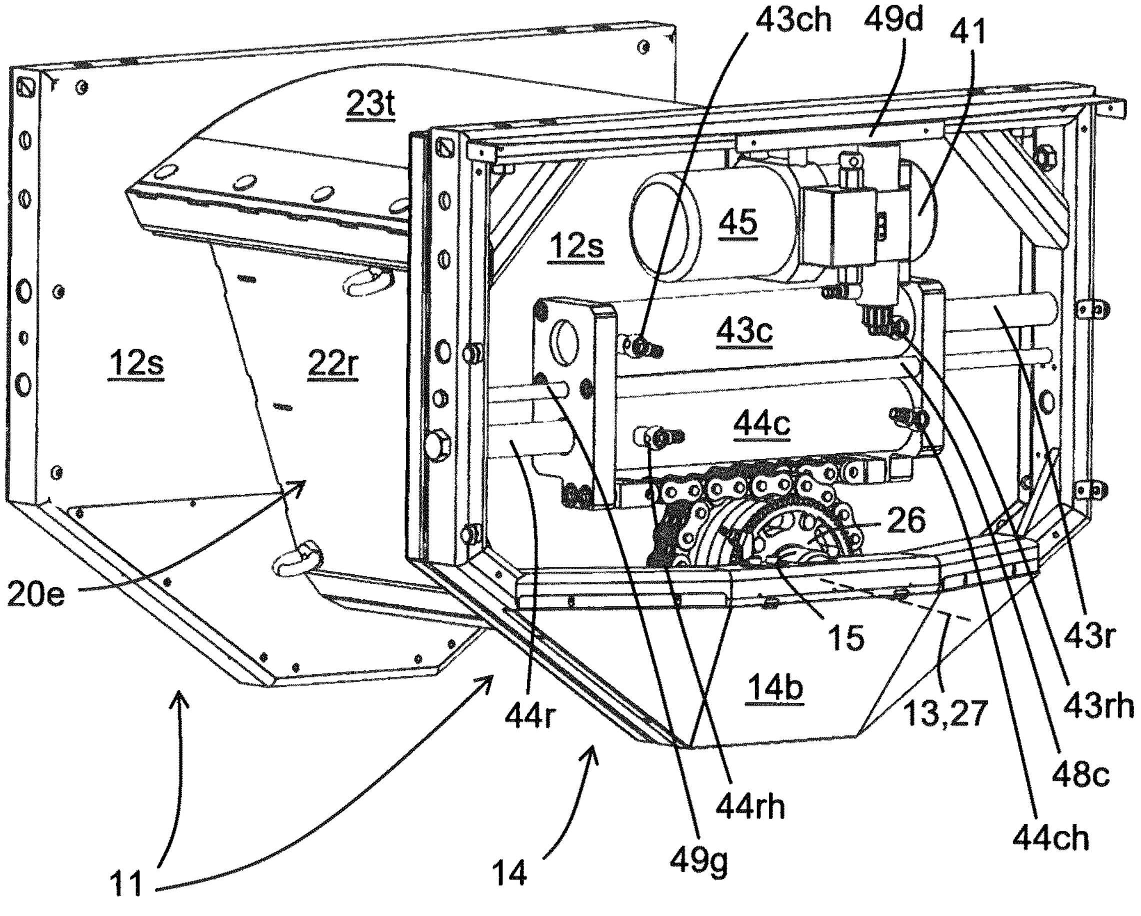
FIG. 9*a* shows in a rear view a second embodiment of the device, wherein the refuse handling assembly is in the receiving position thereof.
Figure 9B:
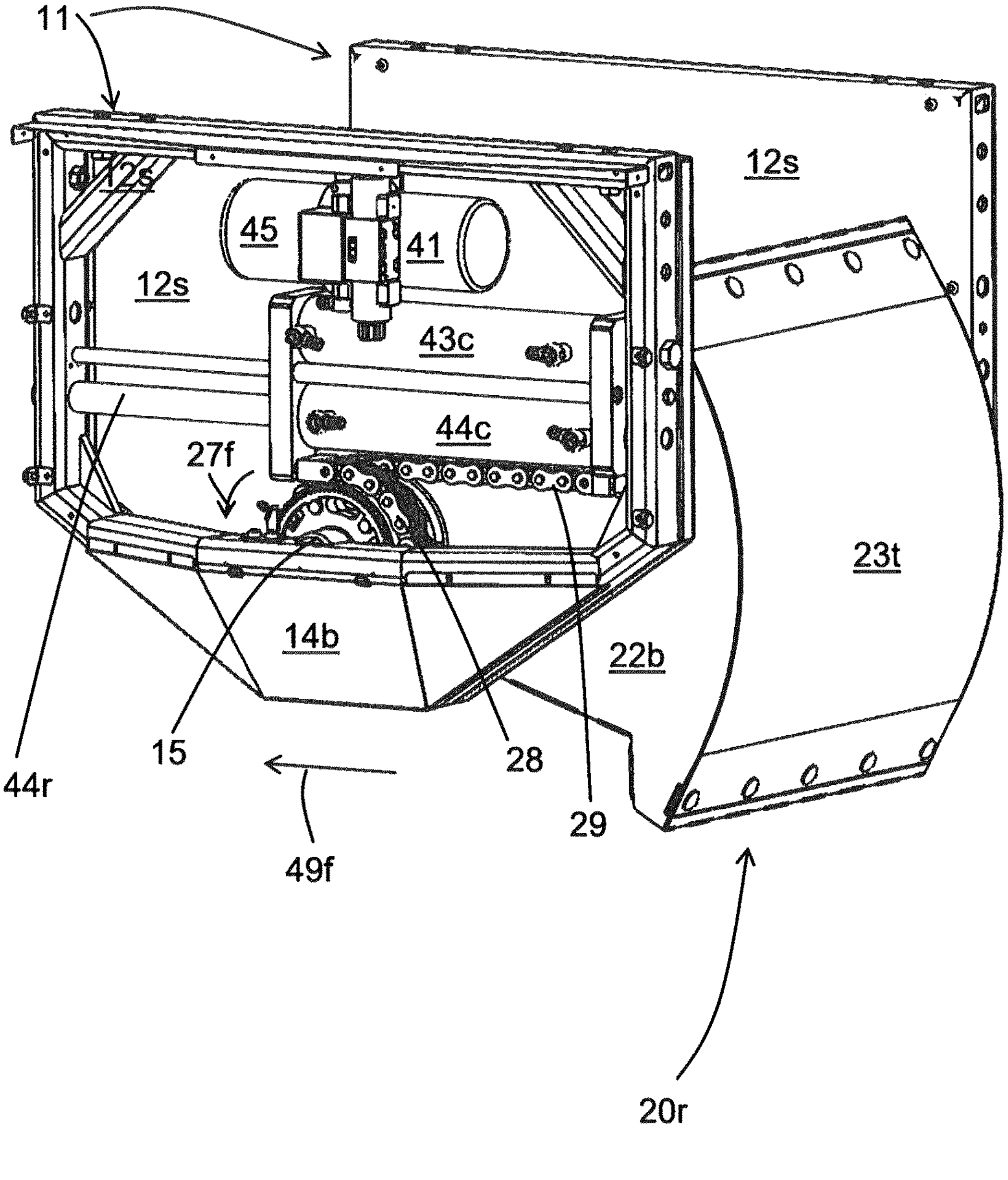
FIG. 9*b* shows in a rear view the second embodiment of the device, wherein the refuse handling assembly is in the rightward guiding position thereof.
Figure 9C:
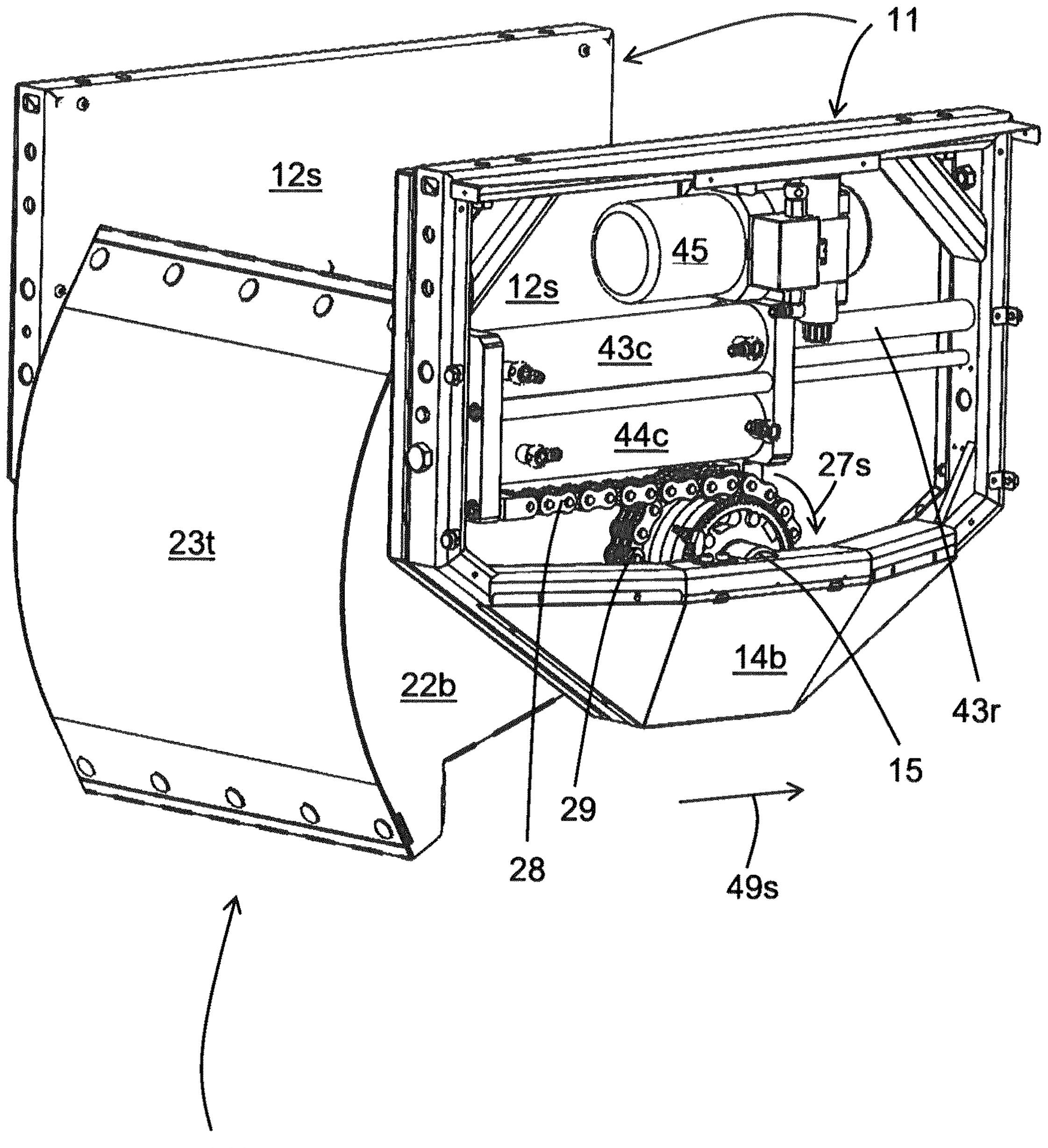
FIG. 9*c* shows in a rear view the second embodiment of the device, wherein the refuse handling assembly is in the leftward guiding position thereof.

FIGS. 8 and 9 depict respectively for the first and second embodiment three respective different positions of the unit 49 relative to the first and second rods 43*r*, 44*r*, and thus relative to the frame 11 of the refuse handling device 10 according to the respective embodiment. In FIGS. 8*b* and 9*b*—and thus also in FIG. 2*d*, though not visible therein—the unit 49 is in a first position in which the first rod 43*r* is maximally retracted and the second rod 44*r* is maximally extended. In FIGS. 7*b*, 8*b* and 9*b*—and thus also in FIG. 2*c*, though not visible therein—the unit 49 is in a second position in which the second rod 44*r* is maximally retracted and the first rod 43*r* is maximally extended. In FIGS. 7*a*, 8*a*, 9*a* and 11—and thus in FIGS. 2*a*-*b*, though not visible therein—the unit 49 is in an intermediate position substantially halfway the first and second position.

The three positions of the unit 49 in FIGS. 8 and 9 also show that the connection member 26 which has a cylindrical shape and is connected to the unit 49 via the first pulling member 28 and the second pulling member 29 is rotated about 180 degrees about the rotation axis 27 when moving between the first and second position.

In the first position, depicted in FIGS. 8*b* and 9*b*, the first pulling member 28 is mainly wound on the connection member while the second pulling member 29 mainly extends parallel to the first and second cylinder 43*c*, 44*c*. In the second position, depicted in FIGS. 8*c* and 9*c*, the second pulling member 29 is mainly wound on the connection member 26 while the first pulling member 28 mainly extends parallel to the first and second cylinder 43*c*, 44*c*. In the intermediate position of FIGS. 7*a*, 8*a*, 9*a* and 11, both the first and second pulling member 28, 29 extend partially parallel to the first and second cylinder 43*c*, 44*c* and are partially wound on the connection member.

The first direction 49*f* of the unit 49 corresponding to the first rotational direction 27*f* of the connection member 26 is indicated in FIGS. 8*b* and 9*b* by an arrow. Hence, moving the unit 49 in the first direction 49*f*, as has been done in FIGS. 8*c*, and 9*c*, corresponds to a movement towards the second position. The second direction 49*s* of the unit 49 corresponding to the second rotational direction 27*s* of the connection member 26 is indicated by an arrow in FIGS. 8*b* and 9*b*. Hence, moving the unit 49 in the second direction 49*s* corresponds to a movement towards the first position.

FIG. 11 depicts a schematic view of the drive assembly 40 only in the intermediate position of FIGS. 8*a* and 9*a*, but additionally showing some interior details which apply to the drive assembly in both embodiments of the device 10 as will be explained below.

The first hydraulic actuator 43 comprises a piston 43*p* connected to the first rod 43*r*, wherein the piston 43*p* divides a space inside the first cylinder 43*c* in a cap side chamber 43*cc* and a rod side chamber 43*rc*. The second hydraulic actuator 44 also comprises a piston 44*p* connected to the second rod 44*r*, wherein the piston 44*p* divides a space inside the second cylinder 44*c* in a cap side chamber 44*cc* and a rod side chamber 44*rc*.

Each chamber 43*cc*, 43*rc*, 44*cc*, 44*rc* has an associated respective hydraulic port 43*ch*, 43*rh*, 44*ch*, 44*rh* allowing fluid communication. In a preferred embodiment, the rod side chamber 43*cc* of the first actuator 43 is in fluid communication with the rod side chamber 44*cc* of the second actuator 44, so that upon movement of the unit 49, hydraulic fluid forced out of one of the rod side chambers due to a decrease in volume of the chamber can flow to the other one of the rod side chambers due to an increase volume of the chamber as indicated by hydraulic line 49*h* between hydraulic ports 43*ch* and 44*ch*. Preferably, the decrease in volume of one rod side chamber is equal to the increase in volume of the other rod side chamber so that no reservoir or only a small reservoir is needed in hydraulic line 49*h*.

The hydraulic pump 45 and the motor 41 configured to drive the hydraulic pump 45 are provided to drive motion of the unit 49 by forcing hydraulic fluid into one of the cap side chambers 43*cc*, 44*cc* and preferably extracting hydraulic fluid from the other one of the cap side chambers. Hence, cap side chambers 43*cc*, 44*cc* are in fluid communication with opposite sides of the hydraulic pump 45 as indicated by hydraulic line 45*fh* between hydraulic port 43*ch* and the pump 45 and hydraulic line 45*sh* between hydraulic port 44*ch* and the pump 45. Preferably, during movement of the unit 49, the decrease in volume of one cap side chamber is equal to the increase in volume of the other cap side chamber so that no reservoir or only a small reservoir is needed.

The pump 45 has a first mode in which hydraulic fluid is pumped from the second cylinder 44*c* to the first cylinder 43*c*, i.e. from the cap side chamber 44*cc* to the cap side chamber 43*cc*, corresponding to movement of the unit 43 in the first direction 49*f*. The pump 45 further has a second mode in which hydraulic fluid is pumped from the first cylinder 43*c* to the second cylinder 44*c*, i.e. from the cap side chamber 43*cc* to the cap side chamber 44*cc*. Driving the motor 41 in one direction or in an opposite direction results in operating the pump 45 in either the first or second mode.

Positioning the unit 49 in the first or second position, and thereby the refuse handling member 21 in the rightward or leftward guiding position 21*r*, 211, respectively, allows to distribute the refuse over the container 2. Correspondingly, positioning the unit 49 in the intermediate position results in positioning of the refuse handling member 21 in the receiving position 21*e*.

When the container 2 is relatively empty, no compaction is required yet. However, as can be envisaged by the skilled person, when the refuse collection container 2 has been sufficiently filled with refuse, that is, at least up to the level of the left surface 221 in the first position, i.e. the level of the right surface 22*r* in the second position, the refuse handling member 21 can be operated by the drive assembly 40 to compact refuse by moving the unit 49 into one of the first and second position and therewith the refuse handling member into one of the rightward or leftward guiding position 21*r*, 21*l*.

Figure 6:
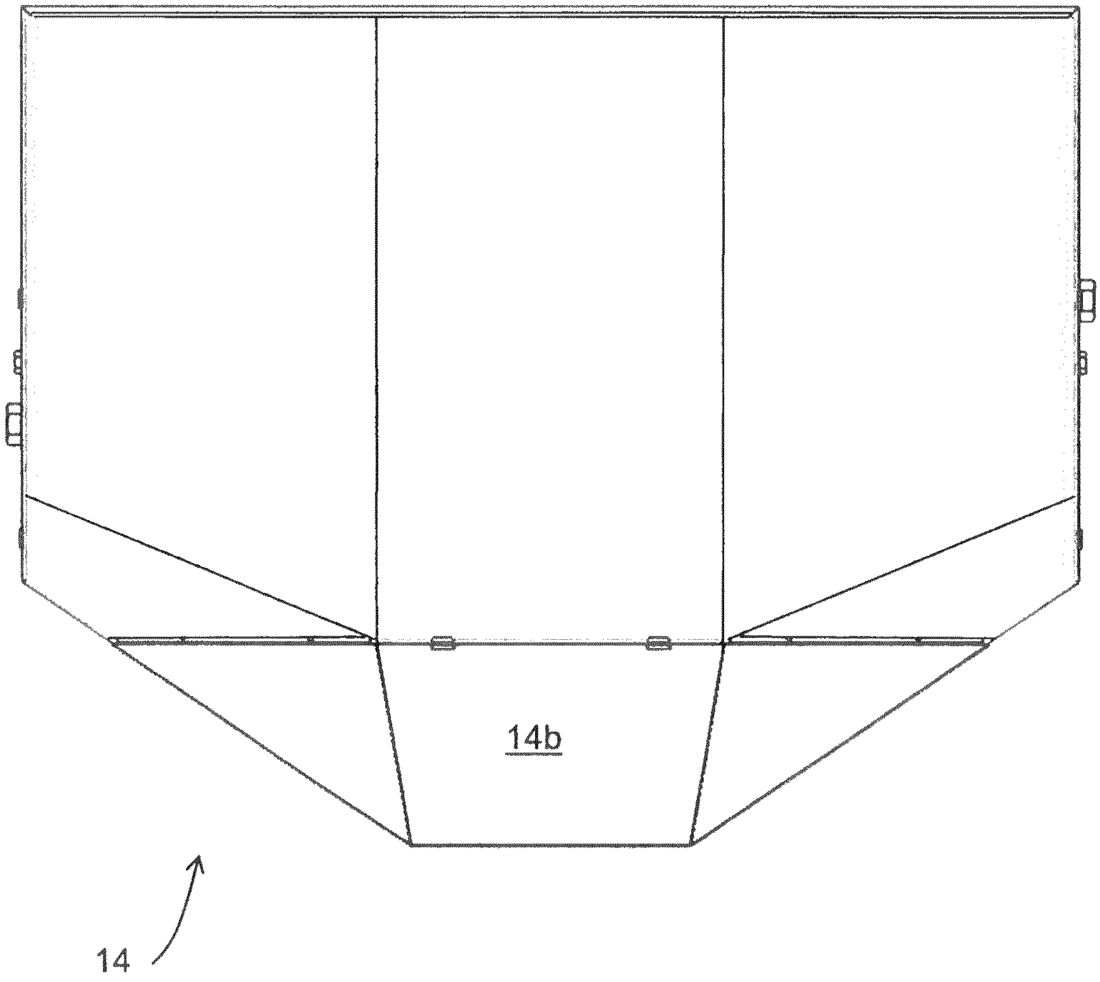
FIG. 6 shows in a rear view the second embodiment of the device according to the invention.

Advantages of the drive assembly 40 as described above may be that the dimensions of the drive assembly 40 in a width direction of the housing part 14 can be relatively small as can be best seen in FIGS. 2 and 6, while at the same time two hydraulic actuators are used allowing to exert a relatively large force in both rotational directions of the connecting member 26, which force is independent of the rotational direction and is independent of the rotational position of the connecting member 26. As a result thereof, the connecting member 26 can be rotated over a relatively large rotational moving range with a relatively large force allowing efficient compacting.

The relatively small dimension in the width direction is obtained by designing and arranging the components of the drive assembly 40 in a convenient manner as will be explained below.

As indicated in FIG. 7*a* but visible for the second embodiment as well, the connection member 26 includes a ridge 26*r* extending over at least a part of an outer circumferential surface of the connection member 26. The ridge 26*r* extends in an imaginary plane that is perpendicular to the rotation axis 27. As can be seen from the figures, the first and second pulling members 28, 29 are arranged at opposite sides of said imaginary plane.

Preferably, as depicted, the unit 49 is in both embodiments arranged next to the connection member 26 in said imaginary plane perpendicular to the rotation axis 27. More preferably, as depicted, the combination of first and second actuator 43, 44 is arranged next to the hydraulic pump 45 and motor 41 in said imaginary plane. Most preferably, as depicted, the first actuator and the second actuator 43, 44 are arranged next to each other in said imaginary plane. As a result thereof, the drive assembly is a stack extending in said imaginary plane, which stack comprises the connection member 26, the second actuator 44, the first actuator 43 and the combination of hydraulic pump 45 and the motor 41. As a result thereof, the dimension in width direction is determined by the component having the largest dimension in width direction, but it also allows to design the drive assembly such that these components all have a similar or equal dimension in width direction.

As indicated in FIG. 8*a*, but applicable to the second embodiment as well, a centre 49*c* of unit 49—seen in moving directions 49*f*, 49*s* of the unit—is, as preferred, aligned with the rotation axis 27 of the connection member 26 when the unit is in the intermediate position.

Although the first and second pulling members 28, 29 are depicted as chain members, it will be clear that other embodiments, including but not limited to band members and cable members are also envisaged.

The pivotal handling member 21 further comprises a weighing unit 24, operating between the distribution and compaction part 22 and the receiving part 23 of the handling member 21, and configured to provide an indication of the weight of an object, e.g. refuse, received on the top surface 23*t*. For the first embodiment, the weighing unit 24 is best visible in FIGS. 3*b-c* and for the second embodiment in FIG. 4*a-b*. The weighing unit 24 comprises a weight sensor 25, embodied as a load cell 25*c*, configured to produce a signal indicative of the weight of the received object 6 on the top surface 23*t* in the receiving position 20*e* of the refuse handling assembly 20.

Figure 3A:
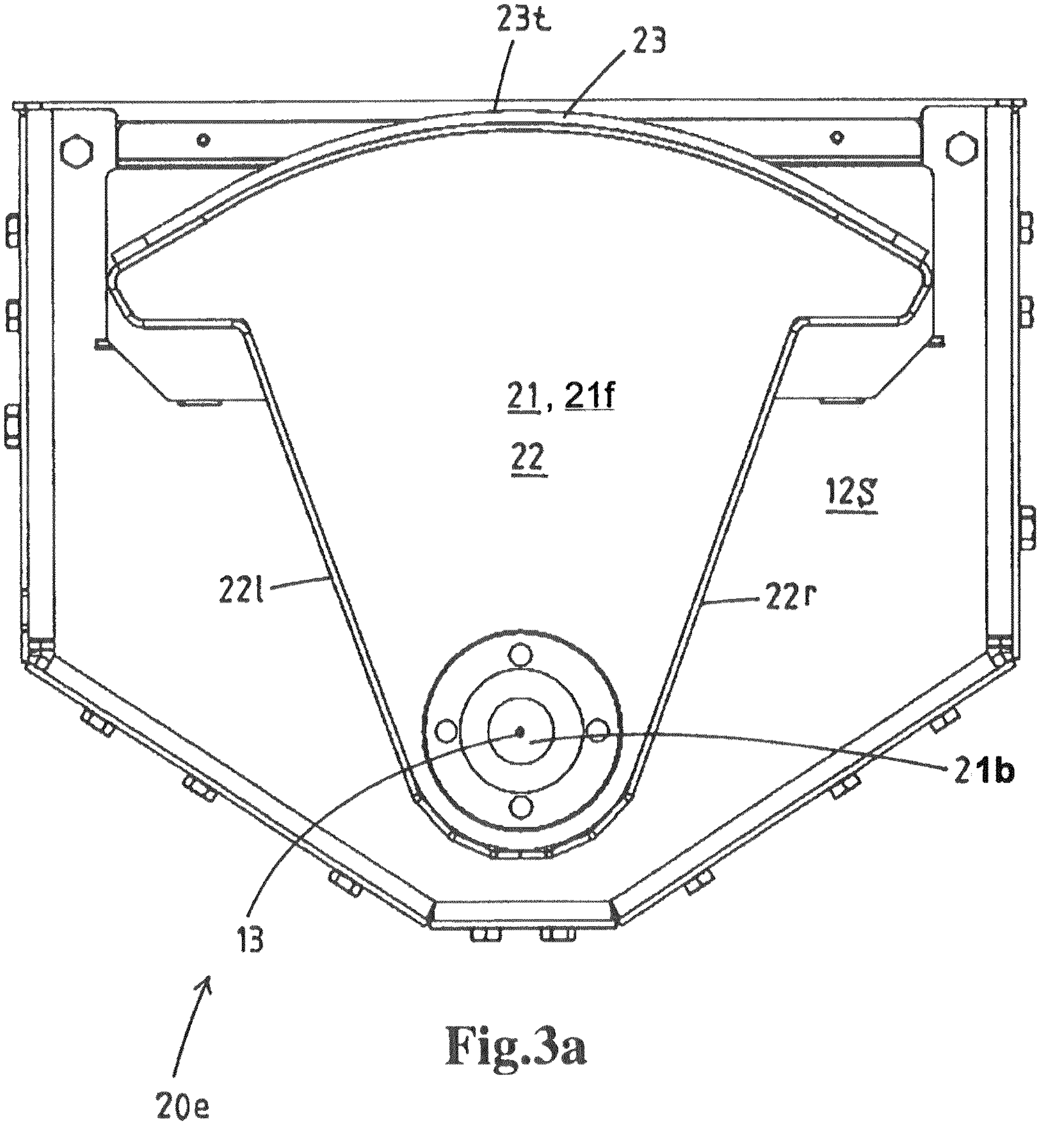
FIG. 3*a* shows in a front view the first embodiment of the device according to the invention, with a front part of the frame being removed, wherein the refuse handling assembly is in the receiving position thereof.
Figure 3B:
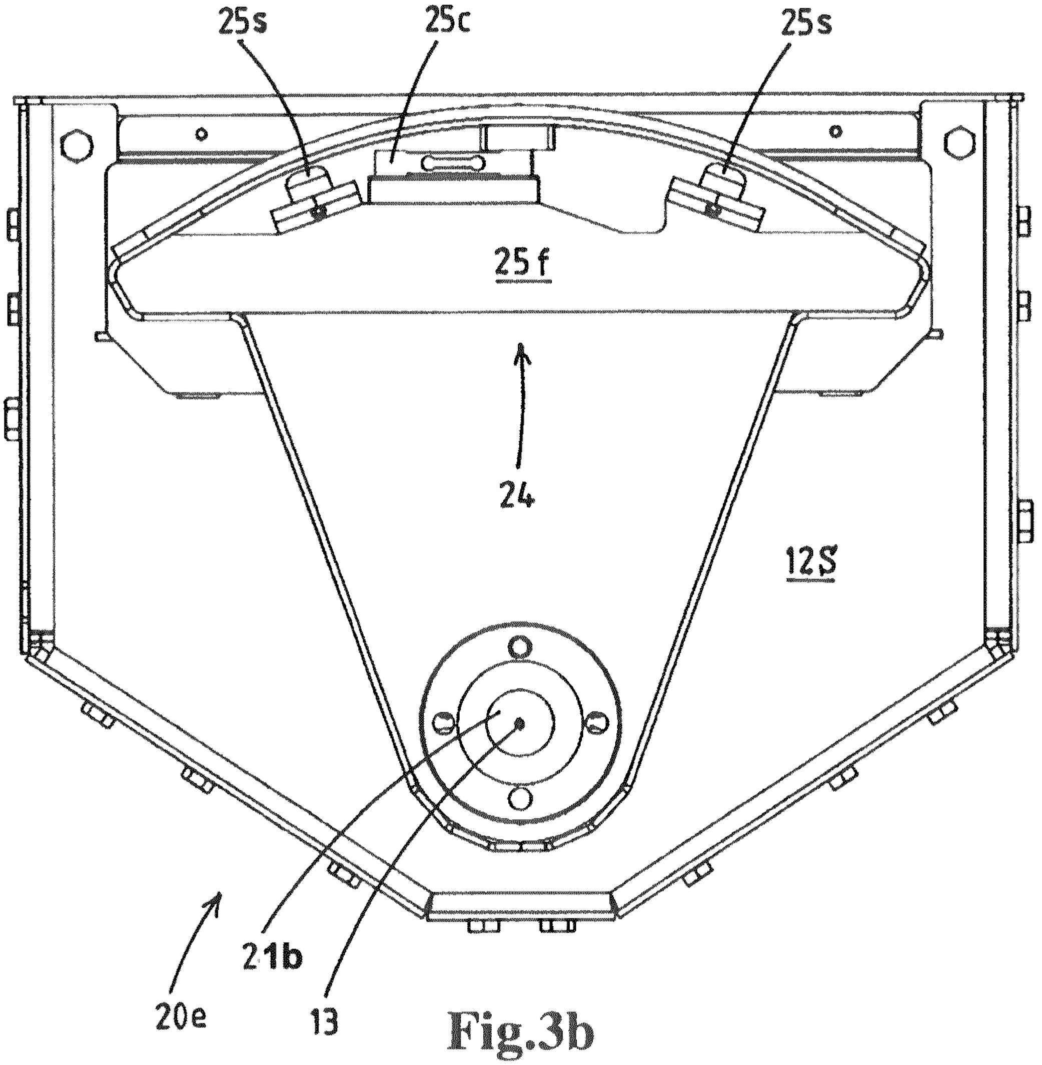
FIG. 3*b* shows in a front view a sideward cross-section of the first embodiment of the device according to the invention, wherein the refuse handling assembly is in the receiving position thereof.
Figure 3C:
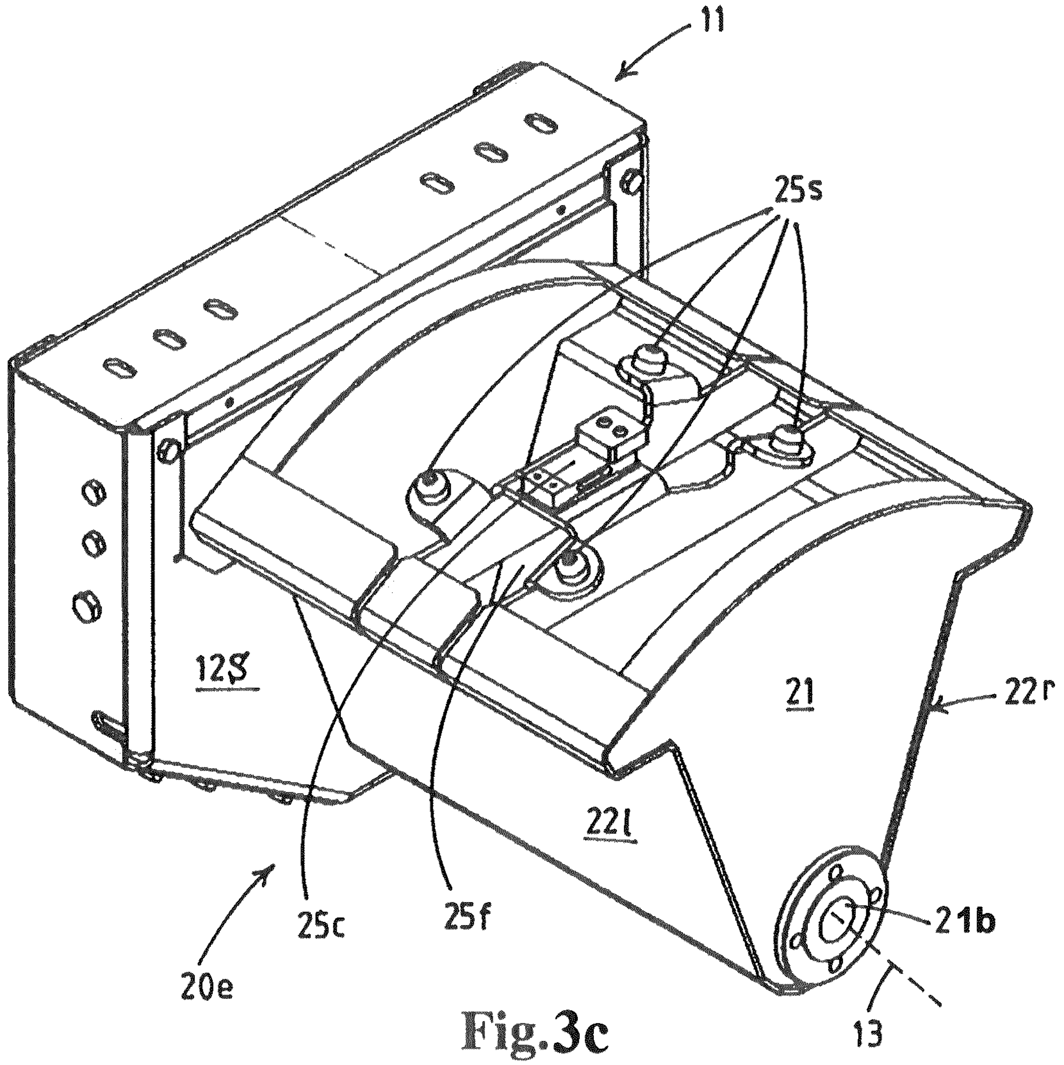
FIG. 3*c* shows in a perspective view the first embodiment of the device according to the invention with a front part of the frame being removed, and the top surface of the receiving part being removed, wherein the refuse handling assembly is in the receiving position thereof.

In the first embodiment, the weighing unit 24 further comprises four end stops 25*s*, mounted between the compaction and distribution part 22 and the receiving part 23 of the handling member 21, configured to limit a downwards movement of the top surface 23*t* of the receiving part 23 caused by the weight of received refuse 6 with respect to the compaction and distribution part 22, see FIGS. 3*b-c*. The weighing unit 24 further comprises a frame 25*f*, to which the load cell 25*c* and the end stops 25*s* are mounted. The frame 25*f* is mounted to the compaction and distribution part 22, whereas the load cell 25*c* and the end stops 25*s* are mounted to the frame 25*f* in between the frame 25*f* and the receiving part 23 of the handling member 21.

Figure 4A:
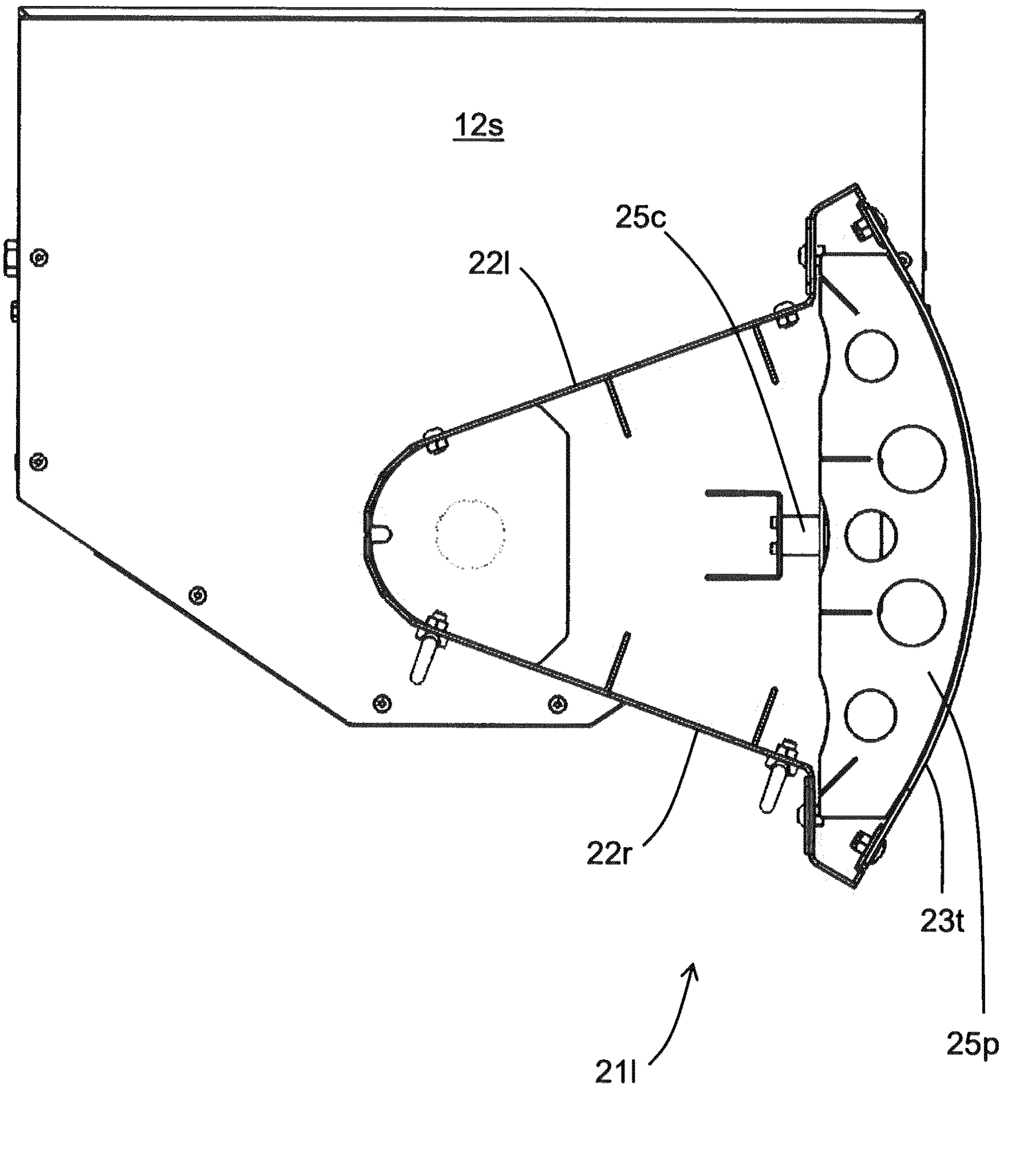
FIG. 4*a* shows in a front view a cross-section of a second embodiment of the device according to the invention, wherein the refuse handling assembly is in the receiving position thereof.
Figure 4B:
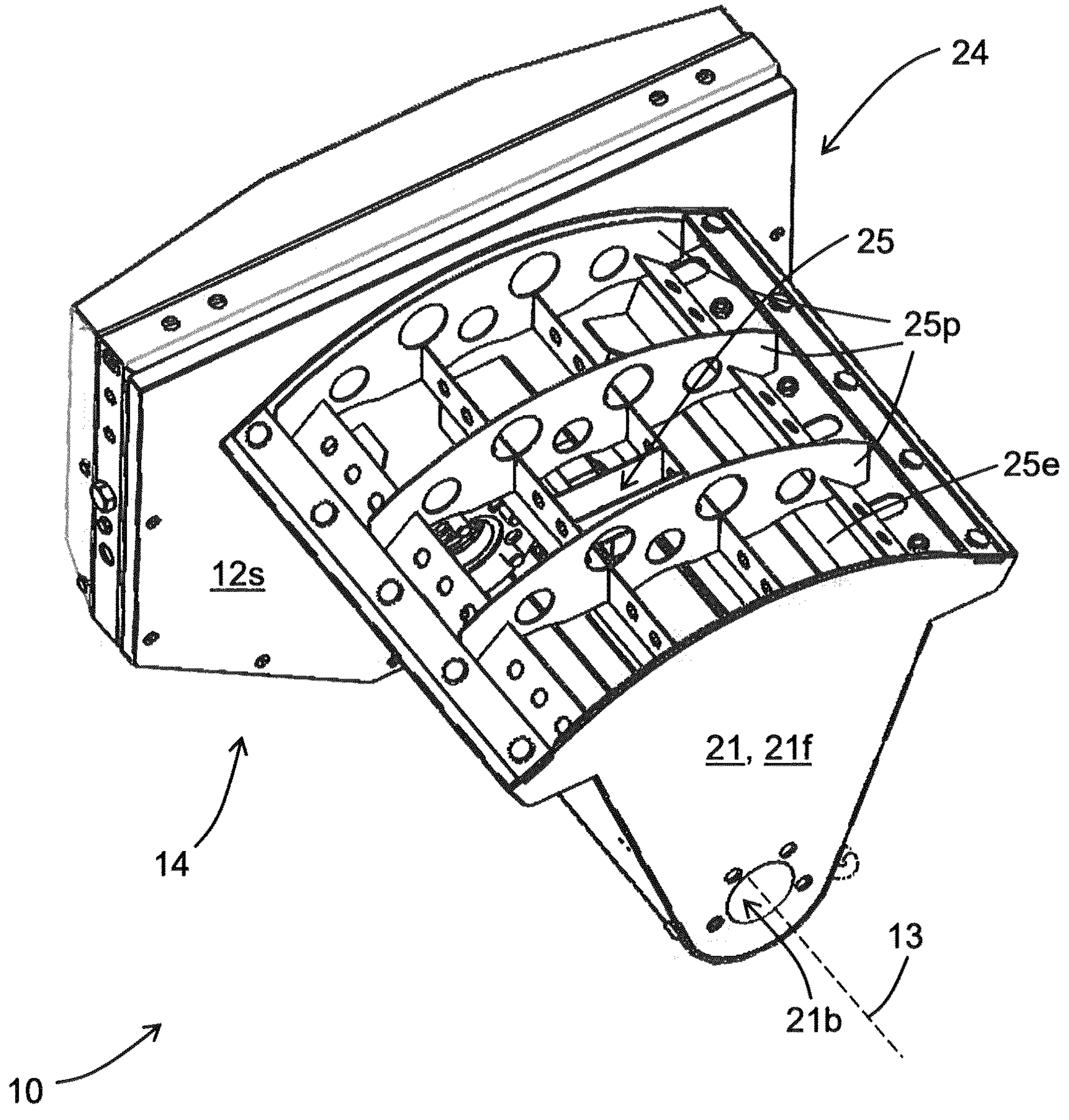
FIG. 4*b* shows in a perspective view the second embodiment of the device according to the invention with a front part of the frame being removed, and the top surface of the receiving part being removed, wherein the refuse handling assembly is in the receiving position thereof.
Figure 5:
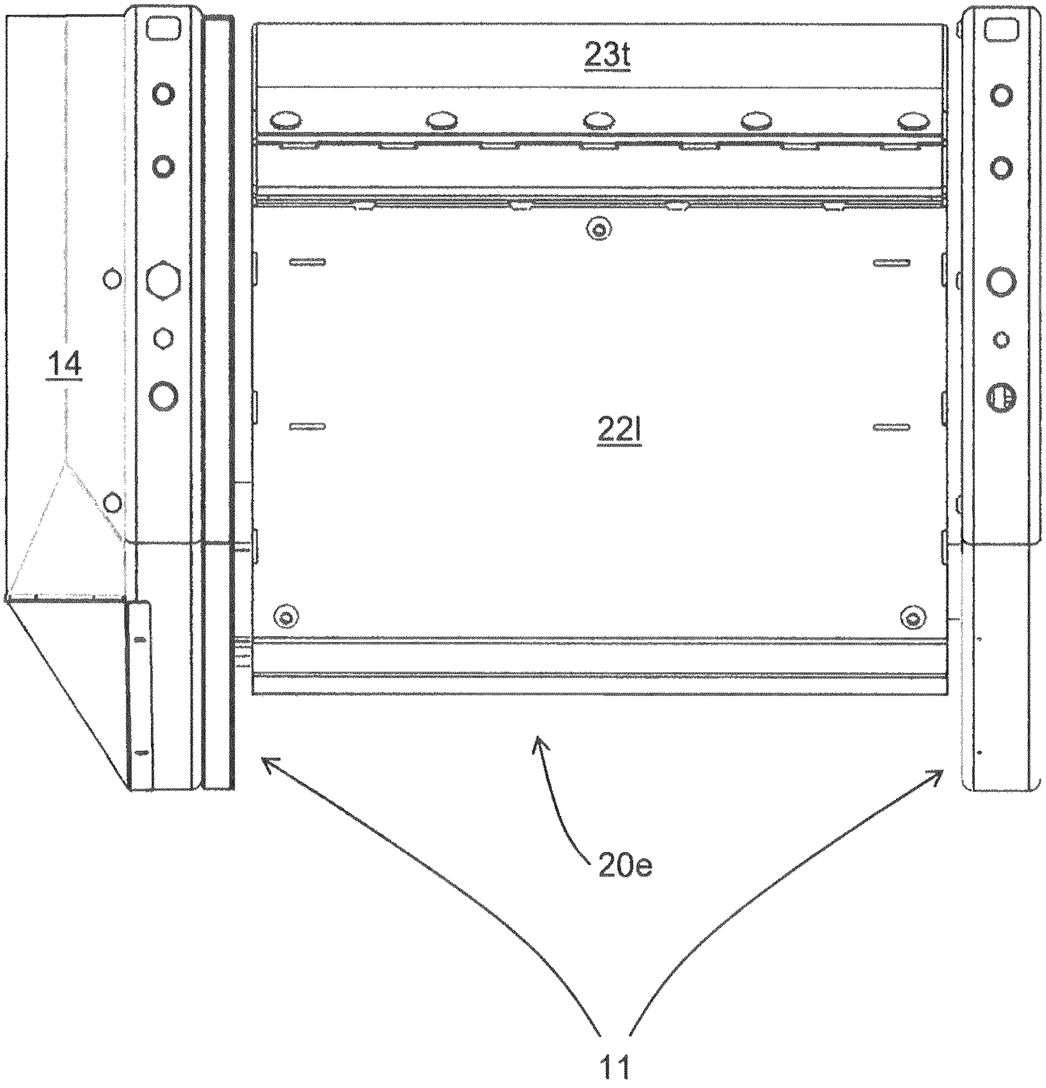
FIG. 5 shows in a left side view the second embodiment of the device according to the invention, wherein the refuse handling assembly is in the receiving position thereof.

In the second embodiment, the frame 25*f* of the weighing unit 24 comprises three transverse, parallel vertical intermediate plates 25*p* onto which the top surface 23*t* of the receiving part rests. The intermediate plates 25*p* transfer the force of the refuse 6 received on the top surface to the load cell 25*c* of the weight sensor 25. Resilient end plates 25*e* serve as end stops to limit the downward movement of the top surface 23*t* and the plates 25*p* caused by the weight of the received object 6. This is best shown in FIGS. 4*a-b*, where FIG. 4*a* is a transverse vertical cross-section directly in front of the frontmost intermediate plate 25*c*, see FIG. 4*b*.

In use, the handling assembly 20 is in the receiving position, prior to the dropping of a refuse bag 6 into the entry opening 10*e* of the device. When a refuse bag is been dropped through the entry opening 10*e* and the duct 12 into the device 10, the bag 6 is received on the top surface 23*t* of the handling member 21, and supported by the handling member 21. After the refuse bag 6 has been weighed by means of the weighing unit 24, the member 21 may be pivoted to the left by the drive assembly 40, so that the handling assembly 20 is in the rightward guiding position 20*r*. During this pivoting, the top surface 23*t* has shifted underneath the refuse bag 6 to the left with respect thereto, while the refuse bag remained in substantially the same position. Thereby the top surface 23*t* moved away from the refuse bag 6 and the right surface 22*r* of the handling member 21 moved toward the refuse bag 6 underneath it, such that the refuse bag 6 crossed the joint between the top surface 23*t* and the right surface 22*r* and moved onto the right surface 22*r*, until the handling assembly 20 was in the rightward guiding position 20*r* and only the right surface supports the refuse bag. Now in the rightward guiding position 20*r*, the right surface 22*r* of the handling member 21 forms an inclined chute, which enabled the refuse bag 6 to slide downwards by gravity.

It is envisaged, that if refuse has already been collected in the container 2 such that the collected refuse is at the level of the guiding surfaces when in the respective guiding positions, the refuse is compacted by the movement of the handling assembly 20 into the guiding positions 201, 20*r* by means of the drive assembly 40. The refuse is compacted at the right side by the movement of the handling assembly 20 into the leftward guiding position of FIG. 2*b*, and the temporary stay in this position, by the right surface 22*r* pressing onto the refuse. The refuse is compacted at the left side by the movement of the handling assembly 20 into the rightward guiding position of FIGS. 2*c* and 8, and the temporary stay in this position, by the left surface 221 pressing onto the refuse.

Figure 10:
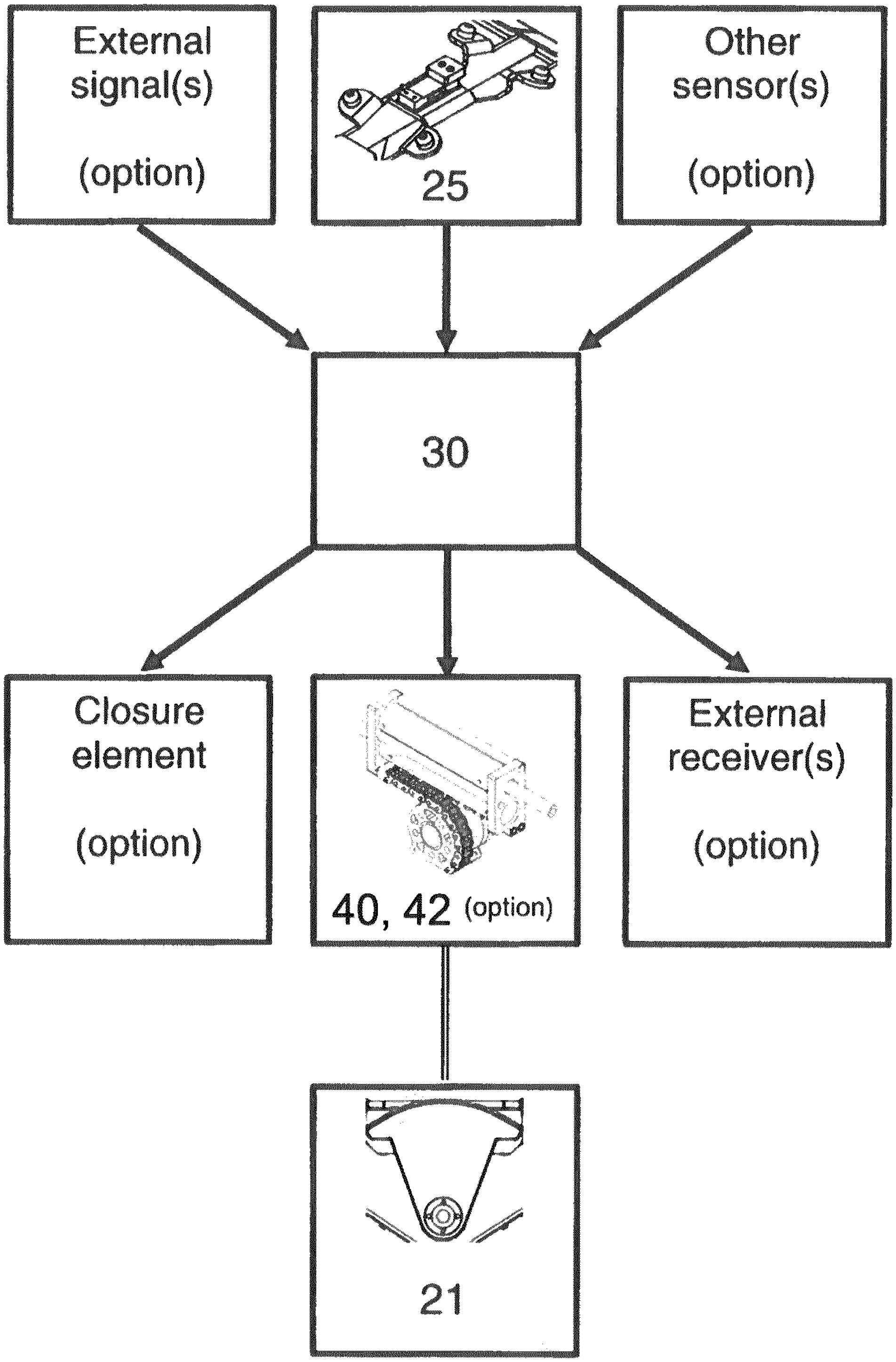
FIG. 10 shows a schematic block diagram of possible intercommunications between a number of parts of the device—the solid lines indicating a transfer of signals, and double lines a mechanical connection, and FIG. 11 schematically depicts a hydraulic scheme of the drive assembly of the device.

As shown schematically in FIGS. 9 and 10, the device 10 according to either of the two embodiments further comprises a control unit 30 operatively connected to the drive assembly 40. This control unit 30 is configured to, based on signals produced by sensors of a sensor system 31 operate the drive assembly 40. In particular the drive the hydraulic pump 45 and/or the motor 41 are controlled by the control unit 30 as depicted in FIG. 10, which control system 30 may be configured to base its control at least partially on signals received from the sensor system 31. The sensor system 31 comprises the weighing unit 24, but other sensors, e.g. level sensors, may be included as well.

In particular, the control unit 30 is configured to operate the drive assembly 40 such that the drive assembly 40, when refuse 6 is received on the top surface 23*t* of the receiving part 23, and the indication of the weight of the received refuse is provided by the weighing unit 24, move the refuse assembly 20 from the receiving position 20*e* of FIGS. 1*a-b*, 2*a*, 5*a*, 6*a-b* and 7*a* into one of the guiding positions 221, 22*r* of FIGS. 2*b* and 2*c* such as to guide the received refuse 6 towards the outlet. It is furthermore configured to, thereafter, move the refuse handling assembly 20 from the one of the guiding positions 221, 22*r* back into the receiving position 20*e*.

Therein the produced signals include the signals produced by the load cell 25*c*. In an embodiment this is the only sensor present—however, as discussed, the provision of other sensors is also envisaged. The control unit 30 is configured to operate the drive assembly 40 such that it moves the refuse handling assembly 20 into a respective guiding position 201, 20*r* only after receiving the signals indicative of the weight of the received refuse 6 produced by the load cell 25*c*.

In both embodiments, the drive assembly 40 comprises a lock mechanism 42 configured to releasably lock the refuse handling member 21 in any position, preferably at least in the intermediate position, and to release it therefrom to enable movement of the refuse handling member 21 to another position. This lock mechanism 42 is also controlled by the control system 30. The lock mechanism 42 is in both embodiments a resistance by the motor 41 to moving it out of the actual position assumed, in the form of the closing of valves, e.g. in the hydraulic ports of the cylinders 43*ch*, 43*rh*, 44*ch*, 44*rh* of the actuators 43, 44 of the drive assembly 40 to hydraulic fluid when the pistons 43*p*, 44*p*, discussed later in relation to FIG. 11, are in positions inside the respective cylinders 43*c*, 44*c* that correspond to the receiving position 20*e*, the leftward guiding position 201, and the rightward guiding position 20*r* of the handling assembly 20, these positions being determined by sensors in communication with the control unit. This valve closure is controlled by the control unit 30 based on the sensor signals.

Thereby, the lock mechanism 42 is configured to releasably lock the refuse handling assembly 20 in the receiving position 20*e*, and to release it therefrom such as to enable the movement of the refuse handling assembly 20 between and into said positions 201, 20*r*.

As illustrated schematically in FIG. 9, the control unit 30 is furthermore configured to, based on the signals produced by the one or more sensors of the sensor system 31, at least including the signals of the load cell 25*c*, operate the lock mechanism 42 such that the lock mechanism 42, firstly, releasably locks the refuse handling assembly 20 in the receiving position 20*e* while the handling member 21 is supporting received refuse 6 at least from the moment that the refuse 6 is received until the weighing unit 24 provides said indication of the weight of received refuse 6, and releases the refuse handling assembly 20 after said provision of said indication. The control unit 30 of FIG. 9 is configured to operate the lock mechanism 42 such that it also releasably locks the refuse handling assembly 20 in the receiving position 20*e* whenever the handling member 21 is not supporting any refuse 6.

The control unit 30 is also configured to, based on the signals of the sensors of the sensor system 31, including level sensors for the refuse stored in the container, lock the handling assembly in any of the guiding positions 201, 20*r* thereof for a set period of time in case the sensors indicate a level of refuse above a certain reference value, in order to facilitate a further compacting of the refuse. The control unit 30 locks the closure element 4*c* while the assembly is being held in a guiding position 201, 20*r* so that no refuse can be thrown into the device 10 while compacting.

By means of the pivot axle (not shown) inserted into the bore 26*b* of connection member 26, the handling member 21 is pivotally connected to the frame 11. The pivot axle extends along the horizontal pivot axis 13 inside a slot 12*t* of the rear wall 12*s*, such that said movement of the refuse handling assembly 20 between and into the leftward guiding position 201, the rightward guiding position 20*r* and the receiving position 20*e* is established by rotation of the connection member 26, with the inserted pivot axle, around the pivot axis 13. The connection member 26, and thereby the pivot axle, is interconnected with said drive motor 41 of the drive assembly 41. The slot 12*t* is complementary to the rear end of the pivot axle extending therein. The pivot axle within connection member 26 is rotatable inside the respective slot 12*t* such as to enable the rotation of the connection member 26 around the pivot axis 13. To facilitate this rotation the slot comprises a rotary bearing. The drive assembly 40 engages the connection member 26 in the way described before, such as to impart said rotation of the pivot axle around the horizontal pivot axis 13 and establish said movement of the refuse handling assembly 20 between and into said positions 20*e*, 201, 20*r*.

As visible in FIGS. 1-6, the device 10 comprises a front mounting structure, comprising a front bearing. This mounting structure comprises a front slot 12*t* with a bearing, inside which a front end of the pivot axle 15 rotates. The mounting structure is configured to be mounted to the front wall of the container by means of bolts, as can best be envisaged from FIG. 1.

The pivot axle 15 is hollow, and the handling member 21, including the weighing unit 24, comprises cabling or wiring which runs through the hollow pivot axle and the rear wall 12*s* in the slot 12*t* of which the pivot axle extends, to the rear side of the rear wall 12*s*, for the transfer of the signals produced by the sensors including the load cell 25*c*, and the control unit 30 or another receiver, and for the transfer of power to the load cell 25*c*.

The load cell 25*c* of the weighing unit 24 of the first embodiment of the device 10 comprises a strain gauge force transducer which connect the distribution and compaction part 22 of the handling member 21 with the receiving part 23 thereof. The load cell 25*c* of the weighing unit 24 provides a signal indicative of the weight of a received object 6, e.g. refuse 6, continuously over time at least as long as the object 6, e.g. refuse 6 is being supported on the top surface 23*t* of the handling member 21 in the receiving position 20*e* of the refuse handling assembly 20.

Referring now additionally to FIG. 9, the control unit 30 of the device 10 according to any of the two embodiments operates the drive assembly 40 such that the refuse handling assembly 20 remains in the receiving position 20*e* for at least as long as the signals fluctuate over time to an extent that exceeds a predetermined range. The fluctuating e.g. occurs directly after being received on the top surface 23*t* in the way shown in FIG. 6*b*, due to the dropping of the object 6 onto the top surface 23*t*, due to shifting and/or sliding of different parts of the object 6 with respect to one another and/or due to initial stabilizing movements of the received object 6 to reach equilibrium on the top surface 23*t*. Furthermore the control unit 30 operates the drive assembly 40 such that the drive assembly 40 moves the refuse handling assembly 20 to one of the guiding positions 201, 20*r* only after said fluctuating has stopped or remained within said predetermined range for a predetermined time period.

In addition the control unit 30 operates the lock mechanism 42 such that the lock mechanism locks the refuse handling assembly 20 in the receiving position 20*e* for at least as long as the signals fluctuate over time to an extent that exceeds the predetermined range, and releases the refuse handling assembly 20 only after said fluctuating has stopped or remained within said predetermined range for said predetermined time period. It operates the drive assembly 40 such that the drive assembly 40 moves the refuse handling assembly 20 to one of the guiding positions 201, 20*r* after said releasing of the refuse handling assembly 20.

The control unit 30 operates the drive assembly 40 such that the drive assembly 40 does not move the refuse handling assembly 20 from the receiving position 20*e* if the signals produced by the sensors indicate, after interpretation of the signals by the control unit 30, that a living organism is supported by the handling member 21. The operation of the drive assembly 40 is furthermore such that it moves the refuse handling assembly 20 to one of the guiding positions 201, 20*r* only after said signals no longer indicate that a living organism is supported by the handling member 21 for a predetermined time period. The drive assembly 40 is operated to releases the refuse handling assembly 20 after receiving an external, e.g. remedial signal, e.g. an input signal from an external source, e.g. an operator device or a control switch, that the living organism is no longer supported by the handling member 21.

The control unit 30 is furthermore configured to operate the lock mechanism 42, when present, such that the lock mechanism 42 releasably locks the refuse handling assembly 20 in the receiving position if the signals produced by the sensors indicate after interpretation of the signals by the control unit 30, that a living organism is supported by the handling member 21. It is operated to release the refuse handling assembly 20 after the signals no longer indicate that a living organism is supported by the handling member 21 for a predetermined time period. Lastly the lock mechanism is operated to release the refuse handling assembly 21 after receiving an external, e.g. remedial signal that the living organism is no longer supported by the handling member 21.

The control unit 30 is configured to interpret the one or more signals produced by the sensors such as to determine if a living organism is being supported by the handling member 21, by the ability to recognize signals produced by sensors after an object 6 has been received onto the top surface 23*t* not being typically caused by the dropping of the object 6 onto the top surface 23*t* and shifting and sliding of different parts of the object 6 with respect to one another and/or initial stabilizing movements of the received object 6 to reach equilibrium on the top surface 23*t*, and/or other typical signal characteristics for non-living refuse, and the ability to recognize signals produced by sensors being characteristic for living organisms, e.g. animals and human beings. This ability is based on the interpretation of the weight, the frequency, pattern, magnitude, and duration of fluctuations of the signals over time indicated by the signal produced by the weight sensor 25.

The control unit 30 is furthermore configured to, if the signals produced by the sensors indicate that a living organism is supported by the handling member 21, produce a warning signal that is observable externally from the device 10, e.g. by emergency services, passers-by and/or determined operators of the device 10.

The control unit 30 is furthermore configured to operate the lock mechanism 42 based on the signals produced by the sensors such that the lock mechanism 42 releases the refuse handling assembly 20 whenever the handling member 21 is not supporting any refuse 6, and locks the refuse handling assembly 20 in the receiving position immediately after the signals indicate that refuse 6 has been received onto the top surface 23*t* and/or that refuse 6 has been dropped into the device 10.

The control unit 30 of FIG. 9 is furthermore configured to operate the closure element 4*c* such as to lock it in a closed position and in an opened position, and to release it. For instance the control unit 30 locks the closure element 4*c* in the closed position in case the signal produced by the sensor 25 indicates that a living organism is supported by the handling member 21, and if the indication of the total weight of refuse actually present into the container exceeds a predetermined value, and if the signals produced by the weight sensors 25 indicate a weight of received refuse that exceeds a predetermined value.

The control unit 30 is furthermore configured to register in a memory an indication of the total weight of refuse 6 actually present into the container 2, by adding up the weight of actually received and guided refuse 6 as indicated by the signals of the weight sensors 25 to the registered indication of the total weight every time the handling member 21 guides received and weighed refuse 6 through the outlet into the container 2.

The registered indication is set to zero after the container 2 has been emptied, e.g. in response to a signal produced externally, e.g. produced by sensors of the container 2 or by an input signal from an external source, e.g. an operator device or a control switch. The registered indication of the total weight is observable externally, e.g. displayed on an interface on the outside of the device or sent to external operator devices.

Referring again to FIGS. 1-6, the opposed left and right surfaces 221, 22*r* of the handling member 21 in both embodiments of the device 10 are, seen in direction of the pivot axis 13, diverging towards the receiving surface 23*t* in a direction away from said pivot axis 13, e.g. said left and right surfaces 221, 22*r* being planar surfaces that are arranged in a V, e.g. said surfaces including an angle between of 50°. The distance between the horizontal pivot axis 13 and the top surface 23*t* is between 40 and 80 centimetres.

In said leftward guiding position 201, the left surface 221 of the distribution and compaction part 22 of the handling member 21 that is upwardly facing the entry opening 12*e* has an angle θl relative to the imaginary vertical plane above and parallel to the pivot axis 13 of 65°, and in said rightward guiding position 20*r* the right surface 22*r* that is upwardly facing the entry opening 12*e* has an angle θr relative to said imaginary vertical plane above of 65°. This is visible in FIGS. 2*b*, 2*c*, 5*b*, 6*c*, 6*d*, 8*b-c* and 9*b-c* and specifically indicated in FIGS. 2*d-e* for the first embodiment of the device 10. However, it can be verified that this applies to the second embodiment of the device 1—as well.

It is visible in the figures that the top ends of the left and right guiding surface 221, 22*r* comprise a laterally, substantially perpendicular, extending shoulder defined by a protruding edge that adjoins the lateral outer end of the top surface 23*t*. From the figures it may be envisaged that this shoulder facilitates the compacting of refuse already present in the container 2, as it latches laterally behind the refuse 6 such as to reduce refuse moving laterally, e.g. sliding along the left or right surface, while it engages the refuse during compacting thereof in the shown position 201, as a consequence of the downward force on the refuse.

It is shown that in the receiving position the top surface 23*t* of the receiving part 23 of the handling member 21 extends in vertical projection below substantially the whole receiving opening 12*e*, and the guiding surfaces 22*l*, 22*r* extend substantially outside of the contour of the entry opening 12*e*.

The invention claimed is:

1. A top loading refuse distributing and compacting device that is adapted to be mounted above or in a top of a refuse collection container, the device being operable to receive refuse, that has dropped into the device and to distribute said refuse over said refuse collection container as well as to compact refuse collected with said container, the device defining an entry opening at a top thereof for entry of refuse dropped into the device, and defining an outlet at a bottom thereof allowing refuse to drop into the refuse collection container underneath, the device comprising:

a frame adapted to be mounted above or in the top of the refuse collection container;

a refuse handling assembly, comprising:

a pivotal handling member, that is pivotally mounted to the frame about a horizontal pivot axis, the horizontal pivot axis extending beneath said entry opening, the pivotal handling member having a distribution and compaction part, comprising a left surface, and a right surface; and a receiving part, comprising a top surface, extending parallel to and remote from said pivot axis, and adjoining the left and right surfaces of the distribution and compaction part at respective opposed sides thereof; and a drive assembly operably connected to said refuse handling assembly and at least including one drive motor, wherein the refuse handling assembly is selectively movable by the drive assembly between and into a receiving position, a leftward guiding position and a rightward guiding position, wherein the drive assembly is configured to move the refuse handling assembly into the receiving position by pivoting the handling member around said pivot axis such that the top surface of the receiving part extends substantially underneath the entry opening, such that refuse that is dropped into the device through the entry opening is received by the top surface and thereby supported on the handling member, wherein the drive assembly is configured to move the refuse handling assembly from the receiving position into the leftward guiding position by pivoting the handling member to the right, seen in direction of the pivot axis, around said pivot axis such that the left surface of the distribution and compaction part assumes a leftward inclination relative to an imaginary vertical plane above and parallel to the horizontal pivot axis, wherein the drive assembly is configured to move the refuse handling assembly from the receiving position into the rightward guiding position by pivoting the handling member to the left, seen in direction of the pivot axis, around said pivot axis such that the right surface of the distribution and compaction part assumes a rightward inclination relative to the imaginary vertical plane above and parallel to the horizontal pivot axis, wherein in said leftward guiding position the left surface of the distribution and compaction part upwardly faces the entry opening, forming an inclined chute that guides received refuse towards a left-hand side of the outlet, wherein in said rightward guiding position the right surface of the distribution and compaction part upwardly faces the entry opening, forming an inclined chute that guides received refuse towards a right-hand side of the outlet, wherein the drive assembly is configured to compact refuse, if the collection container has been sufficiently filled with refuse, by means of the refuse handling assembly as it is moved by the drive assembly into leftward and rightward compacting positions, and wherein the pivotal handling member further comprises a weighing unit, operating between the receiving part of the handling member and the frame, the weighing unit being configured to provide an indication of the weight of an object received on the top surface, said weighing unit comprising one or more weight sensors configured to produce one or more signals indicative of the weight of the received object on the top surface in the receiving position of the refuse handling assembly.

2. The device according to claim 1, further comprising a control unit operatively connected to the drive assembly, and configured to, based on the signals produced by the weight sensors or signals of one or more other sensors of the device, operate the drive assembly such that the drive assembly, when refuse is received on the top surface of the receiving part, and the indication of the weight of the received refuse is provided by the weighing unit:

moves the refuse handling assembly from the receiving position into the left or right guiding position, such as to guide the received refuse towards the outlet, and thereafter moves the refuse handling assembly from the one of the guiding positions or compacting positions, if distinct therefrom, into the receiving position.

3. The device according to claim 1, wherein the pivotal handling member of the refuse handling assembly comprises one or more pivot axles by means of which the handling member is pivotally connected to the frame, the pivot axles extending along or parallel to the horizontal pivot axis inside one or more slots, configured to be mounted to the container, wherein the slots are aligned along the horizontal pivot axis, such that said movement of the refuse handling assembly between and into the receiving position, the leftward guiding position, the rightward guiding position, and the leftward and rightward compacting positions, if distinct from the guiding positions, is established by rotation of the pivot axles around the pivot axis, and wherein the drive assembly engages one or more of the pivot axles such as to impart said rotation of the pivot axle(s) around the horizontal pivot axis and establish said movement of the refuse handling assembly between and into said positions.

4. The device according to claim 1, wherein the drive assembly further comprises a lock mechanism, configured to releasably lock the refuse handling assembly in the receiving position, and to release the refuse handling assembly therefrom such as to enable the movement of the refuse handling assembly between and into said positions.

5. The device according to claim 1, wherein the weight sensors of the weighing unit comprise one or more strain gauge force transducers or one or more piezoelectric force transducers, which connect the distribution and compaction part of the handling member with the receiving part thereof.

6. The device according to claim 5, wherein the one or more weight sensors of the weighing unit are embodied as a load cell, wherein the weighing unit further comprises one or more end stops, mounted between the distribution and compaction part and the receiving part of the handling member, configured to limit a downwards movement of the top surface of the receiving part caused by the weight of received refuse with respect to the distribution and compaction part.

7. The device according to claim 6, wherein the weighing unit further comprises a frame, to which the load cell or the end stops are mounted, said frame being mounted to the distribution and compaction part, whereas the load cell and the end stops are mounted to the frame in between the frame and the receiving part of the handling member.

8. The device according to claim 2, wherein the weight sensors of the weighing unit are configured to provide the signals indicative of the weight of a received object continuously over time at least as long as the object is being supported on the top surface of the handling member in the receiving position of the refuse handling assembly, and wherein the control unit is configured to operate the drive assembly such that the refuse handling assembly remains in the receiving position for at least as long as the signals fluctuate over time to an extent that exceeds a predetermined range, and such that the drive assembly moves the refuse handling assembly to one of the guiding positions and compacting positions only after said fluctuating has stopped or remained within said predetermined range for a predetermined time period.

9. The device according to claim 2, wherein the one or more sensors comprise one or more of:

presence detection sensors, configured to detect whether or not an object is supported on the top surface of the receiving part of the handling member and to produce one or more signals indicative of the received object being supported on said top surface or not;

one or more movement detection sensors, configured to detect movement of a received object, and to produce one or more signals indicative of movement of the received object; and one or more temperature sensors, configured to indicate the temperature of a received object, and to produce one or more signals indicative of the temperature of the received object, wherein the one or more of the signals based on which the control unit operates the drive assembly, are said signals produced by the presence detection, movement detection, or temperature sensors.

10. The device according to claim 2, wherein the control unit is configured to operate the drive assembly such that the drive assembly:

does not move the refuse handling assembly from the receiving position if the signals produced by the sensors indicate that a living organism is supported by the handling member, and moves the refuse handling assembly from the receiving position into one of the guiding positions and compacting positions after said signals no longer indicate that a living organism is supported by the handling member, or moves the refuse handling assembly from the receiving position into one of the guiding positions and compacting positions after receiving an external signal that the living organism is no longer supported by the handling member.

11. The device according to claim 10, wherein the control unit is configured to interpret the one or more signals produced by the sensors such as to determine if a living organism is being supported by the handling member, by the ability to recognize signals produced by sensors after an object has been received onto the top surface not being typically caused by the dropping of the object onto the top surface and shifting and sliding of different parts of the object with respect to one another or initial stabilizing movements of the received object to reach equilibrium on the top surface, or other typical signal characteristics for non-living refuse, or the ability to recognize signals produced by sensors being characteristic for living organisms, said abilities being based on one or more of:

when interpreting signals of weight sensors, the indicated weight or the frequency, pattern, magnitude or duration of fluctuations of the signals over time, or when interpreting signals of presence detection sensors, detected size or any variations of the signals over time, or when interpreting signals of movement detection sensors, the duration, magnitudes and directions of detected movements, when interpreting signals of temperature sensors, the indicated temperature or the deviation thereof with respect to commonly encountered values for non-living refuse.

12. The device according to claim 2, wherein the control unit is furthermore configured to register in a memory an indication of the total weight of refuse actually present into the container, by adding up the weight of actually received and guided refuse as indicated by the signals of the weight sensors to the registered indication of the total weight every time the handling member guides received and weighed refuse through the outlet into the container.

13. The device according to claim 1, wherein the drive assembly comprises:

a first hydraulic actuator including a first cylinder and a first rod moveable within and extending from said first cylinder;

a second hydraulic actuator including a second cylinder and a second rod moveable within and extending from said second cylinder; and a connection member, rotatable about a rotation axis in a first rotational direction and in a second rotational direction opposite to the first rotational direction, and connected to the handling member such that rotation of the connection member causes the handling member to pivot about said pivot axis, wherein the first and second cylinder are mounted to each other to be moveable as a unit, wherein the first and second rod extend parallel to each other in opposite directions from the unit, wherein the first and second rod extending from the unit are connected to the frame of the refuse handling device or are to be connected to the refuse collection container, and wherein the connection member is rotatable about a rotation axis in a first rotational direction and in a second rotational direction opposite to the first rotational direction, and wherein the unit is connected to the connection member using a first pulling member configured to cause the connection member to rotate in the first rotational direction upon movement of the unit in a first direction, and a second pulling member configured to cause the connection member to rotate in the second rotational direction upon movement of the unit in a second direction opposite to the first direction.

14. The device according to claim 1, wherein in the receiving position the top surface of the receiving part of the handling member extends in vertical projection below substantially the whole entry opening, and the guiding surfaces extend substantially outside of the contour of the entry opening, and wherein in the leftward and rightward guiding positions and compacting positions the receiving surface of the receiving part of the handling member extends in vertical projection substantially outside of the contour of the entry opening.

15. A refuse collection system comprising:

a refuse collection container; and the device according to claim 1.

16. The refuse collection system according to claim 15, wherein the system is a subterranean refuse collection system comprising a pit in the ground, wherein the collection container is adapted to be arranged in the pit and to be lifted from the pit for discharge of refuse such as to empty the container, wherein the top loading refuse distributing and compacting device is mounted in the top of the refuse collection container, and wherein the refuse collection system further comprises a refuse introduction housing having an introduction opening allowing a user to introduce refuse therein, so that the refuse drops into the device.

17. The refuse collection system according to claim 16, further comprising a control unit operatively connected to the drive assembly, and configured to, based on the signals produced by the weight sensors or signals of one or more other sensors of the device, operate the drive assembly such that the drive assembly, when refuse is received on the top surface of the receiving part, and the indication of the weight of the received refuse is provided by the weighing unit:

moves the refuse handling assembly from the receiving position into the left or right guiding position, such as to guide the received refuse towards the outlet, and thereafter moves the refuse handling assembly from the one of the guiding positions or compacting positions, if distinct therefrom, into the receiving position, wherein the introduction opening comprises a releasably lockable closure element, which is configured to, when locked, prevent a user to introduce refuse into the refuse introduction housing by extending within the opening such as to close it off to the introduction of refuse, said extension within the opening being releasably maintained by one or more closure actuators in communication with the control unit such as to be operable thereby, wherein the control unit is furthermore configured to operate the closure actuators such as to lock said closure element if:

the control unit is configured to operate the drive assembly such that the drive assembly:

does not move the refuse handling assembly from the receiving position if the signals produced by the sensors indicate that a living organism is supported by the handling member, and moves the refuse handling assembly from the receiving position into one of the guiding positions and compacting positions after said signals no longer indicate that a living organism is supported by the handling member, or moves the refuse handling assembly from the receiving position into one of the guiding positions and compacting positions after receiving an external signal that the living organism is no longer supported by the handling member, if the signals produced by the sensors indicate that a living organism is supported by the handling member, or the control unit is furthermore configured to register in a memory an indication of the total weight of refuse actually present into the container, by adding up the weight of actually received and guided refuse as indicated by the signals of the weight sensors to the registered indication of the total weight every time the handling member guides received and weighed refuse through the outlet into the container, if the indication of the total weight of refuse actually present into the container exceeds a predetermined value, or if the signals produced by the weight sensors indicate a weight of received refuse that exceeds a predetermined value, or if the signals produced by temperature sensors indicate a temperature exceeding a predetermined value.

18. A method for handling refuse introduced in a refuse collection system comprising:

the device according to claim 1, wherein the method comprises the following steps:

receiving introduced refuse on the top surface of the device, such that it is supported on the handling member;

weighing the received refuse being supported on the handling member;

pivoting the handling member to the left or right side underneath the refuse such that said right or left surface, respectively, shifts underneath the refuse such that the refuse is supported thereon, and said right or left surface assumes a downward inclination towards the container; and maintaining the right or left surface under the downward inclination such that the refuse slides downwards over said right or left surface, respectively, towards and into the container, and such that respectively the left or right surface downwardly engages any refuse already present in the container directly underneath said left or right surface, such as to compact said already present refuse.

19. The method according to claim 18, further comprising, after the step of maintaining the right or left surface under the downward inclination, pivoting the handling member such as to increase said downward inclination, such that respectively the left or right surface downwardly engages any refuse already present in the container directly underneath said left or right surface, such as to compact said already present refuse.

* * * * *